(12) United States Patent
Kawada et al.

(10) Patent No.: US 9,128,407 B2
(45) Date of Patent: Sep. 8, 2015

(54) IMAGE FORMING DEVICE AND COMPUTER-READABLE STORAGE MEDIUM

(75) Inventors: Jun Kawada, Kanagawa (JP); Akihiro Mihara, Kanagawa (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 853 days.

(21) Appl. No.: 12/559,549

(22) Filed: Sep. 15, 2009

(65) Prior Publication Data

US 2010/0067049 A1 Mar. 18, 2010

(30) Foreign Application Priority Data

Sep. 17, 2008 (JP) .................................. 2008-238628

(51) Int. Cl.
*G06F 3/12* (2006.01)
*G03G 15/04* (2006.01)
*H04N 1/00* (2006.01)
*H04N 1/32* (2006.01)
*H04N 1/44* (2006.01)

(52) U.S. Cl.
CPC .......... *G03G 15/0409* (2013.01); *G06F 3/1204* (2013.01); *G06F 3/1277* (2013.01); *G06F 3/1285* (2013.01); *H04N 1/0087* (2013.01); *H04N 1/00867* (2013.01); *H04N 1/00883* (2013.01); *H04N 1/00957* (2013.01); *H04N 1/32149* (2013.01); *H04N 1/32561* (2013.01); *H04N 1/444* (2013.01); *H04N 1/4413* (2013.01); *G03G 2215/00932* (2013.01); *G06F 3/1247* (2013.01); *H04N 2201/0094* (2013.01)

(58) Field of Classification Search
USPC ....................................................... 358/1.15
See application file for complete search history.

(56) References Cited

U.S. PATENT DOCUMENTS 7,197,742 B2 3/2007 Arita et al.
7,426,284 B2 9/2008 Ishii (Continued)

FOREIGN PATENT DOCUMENTS

JP 2002-084383 3/2002
JP 2002-236583 8/2002

(Continued)

OTHER PUBLICATIONS

English Translation of JP2008153769 provided by JPO. JP2008153769 was submitted by Applicant as Prior Art on Feb. 8, 2013.*

(Continued)

*Primary Examiner* — Dov Popovici
(74) *Attorney, Agent, or Firm* — IPUSA, PLLC

(57) ABSTRACT

An image forming device includes an embedded information job control part configured to connect software components and control execution of an embedded information job that embeds information into image data or extracts embedded information from image data. The embedded information job control part includes a common part configured to perform a first process that is common to respective kinds of the embedded information job, and a specific part configured to perform a second process that is specific to a kind of the embedded information job. The specific part includes a combination of the software components connected in a predetermined order to perform the second process, the combination corresponding to the kind of the embedded information job.

20 Claims, 41 Drawing Sheets

(56) References Cited

U.S. PATENT DOCUMENTS

2002/0054326 A1    5/2002   Morita
2004/0258276 A1   12/2004   Ishii et al.
2007/0258098 A1   11/2007   Matsushima
2008/0027949 A1*   1/2008   Kawada .......................... 707/10

FOREIGN PATENT DOCUMENTS

| JP | 2002-268907 | 9/2002 |
| JP | 2005-012530 | 1/2005 |
| JP | 2005-192148 | 7/2005 |
| JP | 2006-020258 | 1/2006 |
| JP | 2007-325251 | 12/2007 |
| JP | 2008-153769 | 7/2008 |

OTHER PUBLICATIONS

Japanese Office Action dated Jan. 8, 2013.

* cited by examiner

FIG.4

| FUNCTION | COMBINATION OF FILTERS |
|---|---|
| COPY | READING + (DOCUMENT EDITING +) PRINTING |
| SCAN TO EMAIL | READING + MAIL TRANSMITTING |
| FAX TRANSMIT | READING + FAX TRANSMITTING |
| FAX RECEIVE | FAX RECEIVING + PRINTING |
| DOCUMENT BOX STORE | READING + STORED DOCUMENT REGISTERING |
| DOCUMENT BOX PRINT | STORED DOCUMENT READING + PRINTING |

| ATTRIBUTE ITEM | NEED OF DISPLAY |
|---|---|
| MIXED SIZE | TRUE |
| RESOLUTION | FALSE |
| : | : |

| OUTPUT PERSON DETECTION | FALSIFICATION DETECTION |
|---|---|
| USER1 | USER1 |
| USER2 | USER3 |
| : | : |

FIG.40

| PAGE | DETECTION RESULT |
|---|---|
| 005 | CANNOT BE EXTRACTED |
| 004 | ○ ○ ○ ○ |
| 003 | △ △ △ △ |
| 002 | CANNOT BE EXTRACTED |
| 001 | × × × × |

● DETECTION TIME: 2008/05/13 18:23

● DETECTED JOB ID: 50543

FIG.41

● DETECTION TIME: 2008/05/13 18:23

● DETECTED JOB ID: 50543

| PAGE | DETECTION RESULT |
|------|------------------|
| 005 | FALSIFICATION IS NOT DETECTED |
| 004 | FALSIFICATION IS DETECTED |
| 003 | CANNOT BE DETECTED |
| 002 | FALSIFICATION IS NOT DETECTED |
| 001 | FALSIFICATION IS NOT DETECTED |

IMAGE FORMING DEVICE AND COMPUTER-READABLE STORAGE MEDIUM

BACKGROUND OF THE INVENTION

1. Field of the Invention

This invention relates to an image forming device and a computer-readable storage medium in which software components, each of which is configured to execute a process constituting a part of a job with respect to image data, are connected and the job is performed by the connected software components.

2. Description of the Related Art

An image forming device which utilizes the concept of pipe and filter architecture is disclosed in Japanese Laid-Open Patent Publication No. 2007-325251, and this image forming device incorporates an application which performs a job according to a software component (which is called activity) that is constituted by a set of filters (which are software components. This image forming device makes it possible to facilitate the customization or extension of functions related to image formation.

On the other hand, there is an image forming device of another type among various types of image forming devices. This image forming device is provided with a function that extracts embedded information from image data obtained by scanning a document, and analyzes the information related to the document (for example, detection of falsification of a document, tracing of distribution channels, output person detection, etc.). In the following, this function will be called a marking detecting function. For example, Japanese Laid-Open Patent Publication No. 2006-20258 discloses an image forming device of this type.

A case in which the marking detecting function is carried out using the image forming device disclosed in Japanese Laid-Open Patent Publication No. 2007-325251 will be considered. In this case, information is extracted from an image input by an input filter, analysis processing of the extracted information is performed, and a filter (or "marking detecting filter") which outputs the result of the analysis processing is created.

If falsification detection and output person detection are taken into consideration, the composition includes the information extracting processing, the analysis processing, and the analysis result output processing, which types of processing are different from each other. For this reason, it is necessary to create a marking detecting filter depending on the use of the information embedded in the document image. Therefore, when both the falsification detection function and the output person detection function have to be implemented in an image forming device, it is necessary to create both a marking detecting filter corresponding to the falsification detection function (or a falsification detecting filter) and a marking detecting filter corresponding to the output person detection function (or an output person detecting filter).

Moreover, an activity (software component) must be created for each combination of an input filter and a marking detecting filter. For example, in the case of falsification detection and output person detection, it is necessary to create two separate activities: a falsification detecting activity using the falsification detecting filter and an output person detecting activity using the output person detecting filter.

Such development work is simple for the related art including Japanese Laid-Open Patent Publication No. 2007-325251. However, if the point that there are many common portions in the respective marking detecting filters and the respective activities using each of the marking detecting filters is taken into consideration, it is desirable to further improve the customizability of information processing functions of information embedded in image data.

SUMMARY OF THE INVENTION

In one aspect of the invention, the present disclosure provides an image forming device and a computer-readable storage medium which are able to improve the customizability of the information processing functions of information embedded in image data.

In an embodiment of the invention which solves or reduces one or more of the above-mentioned problems, the present disclosure provides an image forming device in which software components, each configured to execute a process constituting a part of a job with respect to image data, are connected and the job is performed by the connected software components, the image forming device including an embedded information job control part configured to connect software components and control execution of an embedded information job that embeds information into image data or extracts embedded information from image data, the embedded information job control part including: a common part configured to perform a first process that is common to respective kinds of the embedded information job; and a specific part configured to perform a second process that is specific to a kind of the embedded information job, wherein the specific part includes a combination of software components connected in a predetermined order to perform the second process, the combination corresponding to the kind of the embedded information job.

In an embodiment of the invention which solves or reduces one or more of the above-mentioned problems, the present disclosure provides an embedded information job control method which is performed by an image forming device in which software components, each configured to execute a process constituting a part of a job with respect to image data, are connected and the job is performed by the connected software components, the embedded information job control method connecting software components and controlling execution of an embedded information job that embeds information into image data or extracts embedded information from image data, by an embedded information job control part of the image forming device, the embedded information job control method including: performing, by a common part of the embedded information job control part, a first process that is common to respective kinds of the embedded information job; and performing, by a specific part of the embedded information job control part, a second process that is specific to a kind of the embedded information job, wherein the specific part includes a combination of software components connected in a predetermined order to perform the second process, the combination corresponding to the kind of the embedded information job.

In an embodiment of the invention which solves or reduces one or more of the above-mentioned problems, the present disclosure provides a computer-readable storage medium storing a computer-readable program which, when executed by a computer of an image forming device in which software components, each configured to execute a process constituting a part of a job with respect to image data, are connected and the job is performed by the connected software components, causes the computer to perform an embedded information job control method, the embedded information job control method connecting software components and controlling execution of an embedded information job that embeds information into image data or extracts embedded information from image data, by an embedded information job control part of the image forming device, the method including: performing, by a common part of the embedded information job control part, a first process that is common to respective kinds of the embedded information job; and performing, by a specific part of the embedded information job control part, a second process that is specific to a kind of the embedded information job, wherein the specific part includes a combination of software components connected in a predetermined order to perform the second process, the combination corresponding to the kind of the embedded information job.

Other aspects, features and advantages of the present invention will become more apparent from the following detailed description when read in conjunction with the accompanying drawings.

BRIEF DESCRIPTION OF THE DRAWINGS

FIG. 4 is a diagram illustrating the combinations of filters for performing each of functions in the image forming device of this embodiment.

FIG. 40 is a diagram illustrating an example of an output person detection result screen displayed.

FIG. 41 is a diagram illustrating an example of a falsification detection result screen displayed.

DETAILED DESCRIPTION OF THE PREFERRED EMBODIMENTS

A description will be given of embodiments of the invention with reference to the accompanying drawings.

Figure 1:
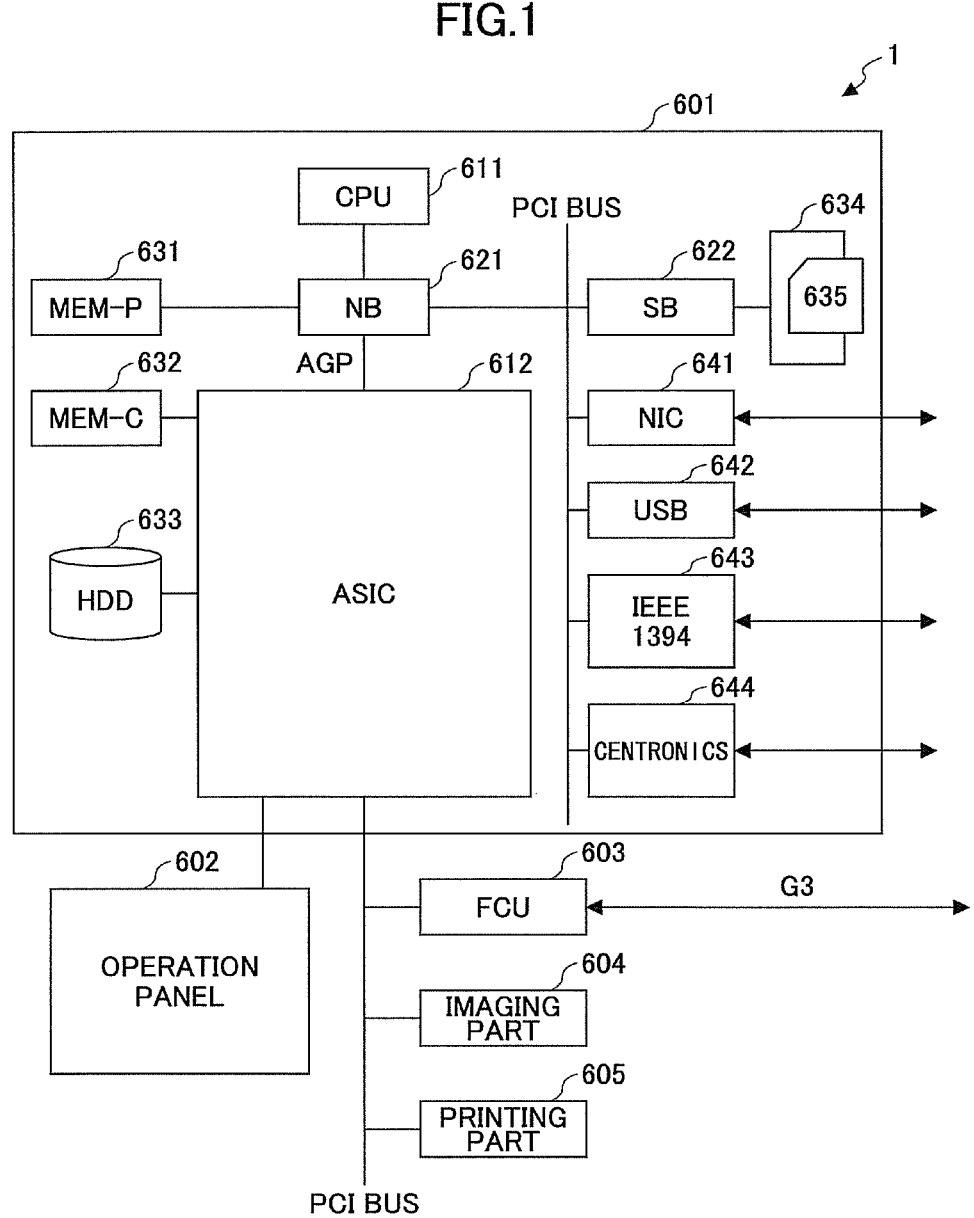
FIG. 1 is a block diagram illustrating the hardware composition of an image forming device (MFP) of an embodiment of the invention.

FIG. 1 is a block diagram illustrating the hardware composition of an image forming device of an embodiment of the invention. Specifically, the hardware composition of a multifunction peripheral (MFP) 1 as a typical example of the image forming device is illustrated in FIG. 1, and this MFP 1 incorporates a plurality of image formation functions, including a printer function, a copy function, a scanner function, and a fax function, in a housing of one device.

The hardware of the MFP 1 includes a controller 601, an operation panel 602, a facsimile control unit (FCU) 603, an imaging part 604, and a printing part 605.

The controller 601 includes a CPU 611, an application-specific IC (ASIC) 612, a north bridge (NB) 621, a south bridge (SB) 622, a memory (MEM-P) 631, a memory (MEM-C) 632, a hard disk drive (HDD) 633, a memory card slot 634, a network interface controller (NIC) 641, a USB device 642, an IEEE 1394 device 643, and a Centronics device 644.

The CPU 611 is a general-purpose information processing IC. The ASIC 612 is a general-purpose image processing IC. The NB 621 is a north bridge of the controller 601. The SB 622 is a south bridge of the controller 601. The MEM-P 631 is a system memory of the MFP 1. The MEN-C 632 is a local memory of the MFP 1. The HDD 633 is a storage device of the MFP 1. The memory card slot 634 is a slot of the MFP 1 for setting a memory card 635. The NIC 641 is a network interface controller for performing network communications according to a MAC (media access control) address. The USB device 642 is an interface device for providing a connection terminal of USB (universal serial bus) specifications. The IEEE 1394 device 643 is an interface device for providing a connection terminal of IEEE 1394 specifications. The Centronics device 644 is an interface device for providing a connection terminal of a Centronics interface. The operation panel 602 is the hardware (operation device) for enabling an operator to input data into the MFP 1, and the hardware (display device) for enabling an operator to receive information output from the MFP 1.

Figure 2:
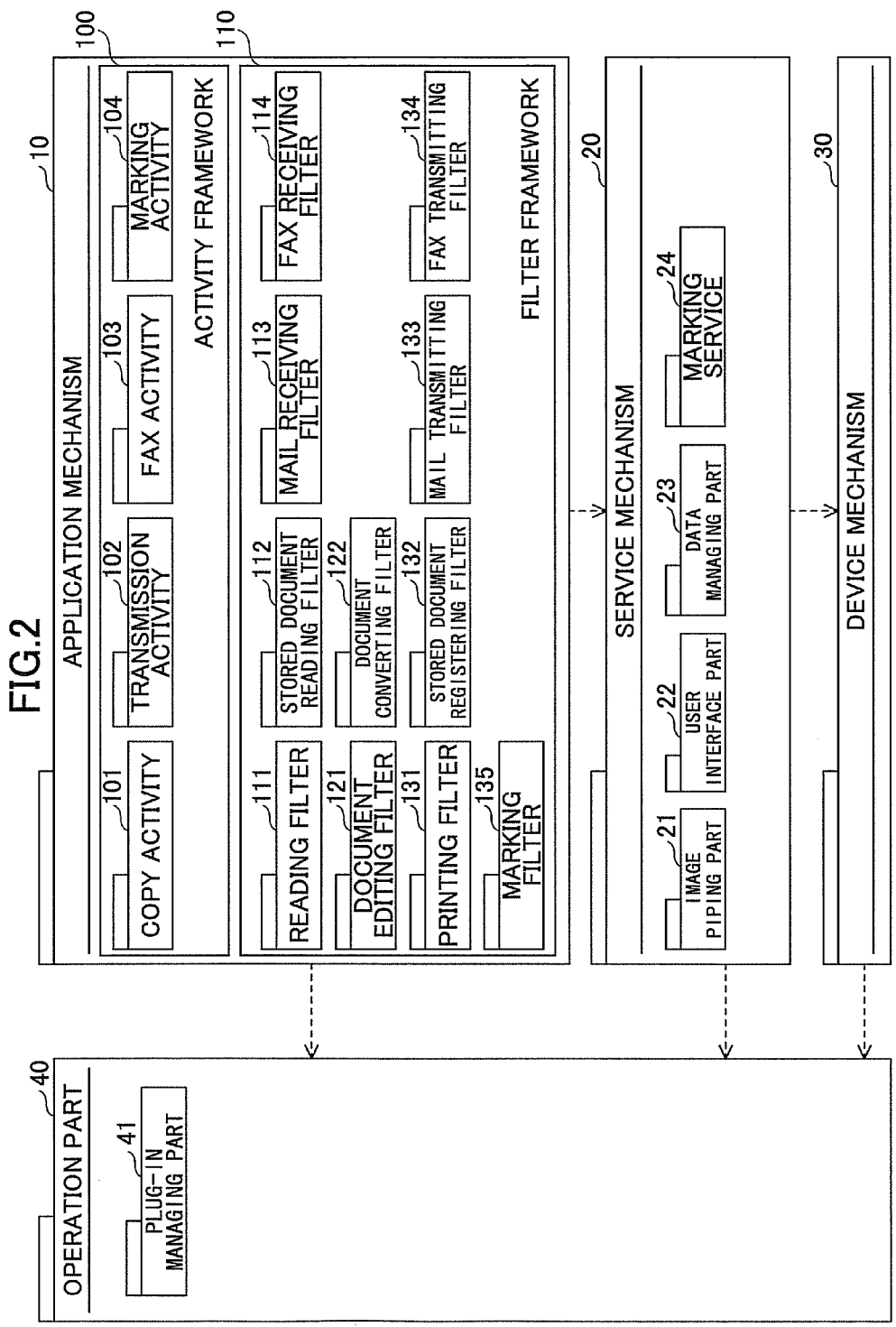
FIG. 2 is a block diagram illustrating the software composition of the image forming device of this embodiment.

FIG. 2 is a block diagram illustrating the software composition of the image forming device of this embodiment. As illustrated in FIG. 2, the software of the MFP 1 is constituted by a number of layers including an application mechanism 10, a service mechanism 20, a device mechanism 30, and an operation part 40.

The hierarchical order of the layers illustrated in FIG. 2 is based on the call relation between the layers. Among the layers illustrated in FIG. 2, fundamentally, an upper layer calls a lower layer, and a lower layer is called by an upper layer.

For example, the software components of FIG. 2 are stored in the HDD 633, a software component from the HDD 633 is loaded to the MEM-P 631 at the time of execution, and the CPU 611 is caused to perform the function of the software component.

The application mechanism 10 is a layer in which the groups of software components (programs) for allowing a user to exploit the function or information (data) resources provided by the MFP 1, are implemented. In this embodiment, some software components implemented in the application mechanism 10 are called "filters". This is because a certain application which performs a job of the MFP 1 is constructed based on the pipe and filter architecture.

Figure 3:
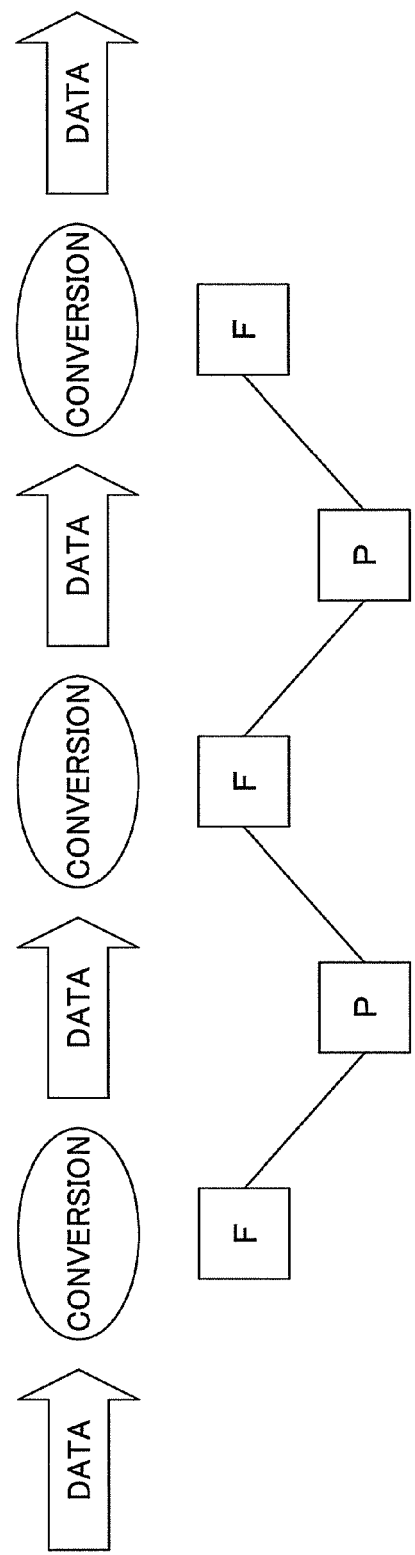
FIG. 3 is a diagram for explaining the concept of pipe and filter architecture.

FIG. 3 is a diagram for explaining the concept of pipe and filter architecture. In FIG. 3, "F" denotes a filter and "P" denotes a pipe.

As illustrated in FIG. 3, each filter F is connected by a corresponding pipe P. A filter F converts an input data and outputs a resulting data of the conversion. For example, a pipe P which connects two filters F is configured to include a storage area that can be accessed by the two filters. The pipe P transmits the data output from the preceding filter, to the following filter.

In the MFP 1 of this embodiment, a job is regarded as a series of "conversions" that are continuously performed for a document (image data). It can be assumed that a job in the MFP 1 is constituted by the inputting, the processing and the outputting of a document, and each of the inputting, the processing, and the outputting is regarded as "conversion." In the MFP 1 of this embodiment, a software component which carries out one of these "conversions" is constituted as a filter. Specifically, a filter which is constituted to carry out the inputting is called "input filter", a filter which is constituted to carry out the processing is called "processing filter", and a filter which is constituted to carry out the outputting is called "output filter". Fundamentally, it is impossible for each of these filters to carry out one job solely by itself. However, a plurality of filters, each of which respectively performs a part of one job, are connected together as illustrated in FIG. 3, and an application which carries out one job is constructed by the plurality of filters.

Each filter is implemented in the MFP 1 so that the filter can operate on the filter framework 110. Specifically, each filter is configured with an interface which is specified in the filter framework 110, and the filter framework 110 controls the procedure of execution of each filter through the specified interface. The filters implemented in the MFP 1 are independent of each other, and, fundamentally, there is no call relation between the filters. Hence, addition (installation) or deletion (uninstallation) of filters can be performed on a filter basis.

Referring back to FIG. 2, the application mechanism 10 includes a reading filter 111, stored document reading filter 112, a mail receiving filter 113, and a fax receiving filter 114 as input filters.

The reading filter 111 controls reading of image data by the imaging part 604 (scanner), and outputs the read image data. The stored document reading filter 112 reads document data (image data) stored in the storage device of the MFP 1, and outputs the read document data. The mail receiving filter 113 receives an e-mail from the network and outputs the data contained in the received e-mail. The fax receiving filter 114 controls a fax receiving operation and outputs the received print data.

Moreover, the application mechanism 10 includes a document editing filter 121 and a document converting filter 122 as processing filters. The document editing filter 121 performs predetermined image transform processing (scaling, rotation, collection, etc.) to the input data and outputs the processed data. The document converting filter 122 converts the data format of image data. For example, the document converting filter 122 performs rendering processing (i.e., it converts the input PostScript data into bit map data and outputs the bit map data).

Moreover, the application mechanism 10 includes a printing filter 131r a stored document registering filter 132, a mail transmitting filter 133, a fax transmitting filter 134, and a marking filter 135 as output filters.

The printing filter 131 receives the input data and outputs the received data to the plotter (the printing part 605). The stored document registering filter 132 receives the input data and stores the received data in the storage device of the MFP 1 (for example, the HDD 633). The mail transmitting filter 133 receives the input data and transmits an e-mail by attaching the received data thereto. The fax transmitting filter 134 receives the input data and performs fax transmission of the received data. The marking filter 135 controls the extracting processing and embedding processing of embedded information in the input image data, and outputs the processing result. This embedded information is the information embedded in the image data, separately from the drawing elements of the image, in accordance with a predetermined format (such as ground tint or bar code). Although the use of embedded information is not limited to a predetermined use, detection of a falsification of a paper document, embedded information may be used for the output person detection that detects an output person who has output a paper document (or a user who has input a printing request or a copy request), etc.

For example, various functions in the MFP 1 are carried out by the following combinations of the filters. FIG. 4 is a diagram illustrating the combinations of filters for performing each of functions in the MFP of this embodiment.

For example, as illustrated in FIG. 4, a copy function is realized by connecting the reading filter 111 and the printing filter 131. When the copy function is carried out, the reading filter 111 is used to read the image data from a document, and the printing filter 131 is used to print the read image data. When processing of collection, expansion, or reduction is requested, the document editing filter 121 which realizes such processing is inserted between the two filters.

A scan to email function (or the function to transmit the scanned image data by e-mail) is realized by connecting the reading filter 111 and the mail transmitting filter 133. A fax transmitting function is realized by connecting the reading filter 111 and the fax transmitting filter 134. A fax receiving function is realized by connecting the fax receiving filter 114 and the printing filter 131. A document box storing function (or the function to store the scanned image data in the MFP 1) is realized by connecting the reading filter 111 and the stored document registering filter 132. A document box printing function (or the function to print the document data stored in the MFP 1) is realized by connecting the stored document reading filter 102 and the printing filter 131.

In the example of FIG. 4, the reading filter 111 is used in the five functions. In this manner, each filter may be used in a plurality of functions, and the load of development of the software components for performing the respective functions can be reduced.

In the MFP 1, the applications are constructed by using respective filters as software components, and customization or expansion of the functions can be performed simply. Namely, there is no call relation between the respective filters and the filters are retained as being independent of each other. Development of a new application can be easily performed by addition of a new filter or change of the combination of filters. Therefore, when implementation of a new application is requested and a filter which realizes processing of a part of the new application is not implemented, only the filter which realizes the corresponding processing is developed and installed in the MFP 1. Hence, the frequency of correction of low-level layers of the application mechanism 10 needed for implementing the new application can be reduced, and a stable software platform can be provided.

Referring back to FIG. 2, the application mechanism 10 includes "activity" software components called. Each activity is a software component which manages the sequence in which a plurality of filters are connected, and performs the plurality of filters in accordance with the sequence to perform a job. One application is realized by one activity.

Because the level of independence of the filters is high, the combinations of filters (or the connecting relation) may be set up dynamically. Specifically, the combinations of filters may be set up such that each time a request for executing a job is received, the user is prompted to input, through the operation panel 602, the filters to be used, the sequence of execution of the filters, and the operating conditions of each filter, in order to realize the function requested by the user.

However, with respect to the frequently used function, such as the copy function, it is very inconvenient to the user if the filters to be used must be selected each time a request for executing a job is sent by the user. The activity is used in order to eliminate the problem. Namely, if the combinations of the filters are defined beforehand as the activities, the user can select one of the activities as the candidate for the combination of the filters to be used. The selected activity performs automatically the respective filters of the combination corresponding to the selected activity. In this manner, the user can eliminate any inconvenience when using the activities.

As illustrated in FIG. 2, the application mechanism 10 includes a copy activity 101, a transmitting activity 102, a fax activity 103, and a marking activity 104 as activities. For example, the copy activity 101 realizes a copy job (copy application) by the combination of the reading filter 111, the document editing filter 121, and the printing filter 131. The marking activity 104 will be described later.

Each activity is implemented in the MFP 1 so that it can operate on the activity framework 100. Specifically, each activity is configured with an interface which is specified in the activity framework 100, and the activity framework 100 controls the procedure of execution of each activity through the specified interface. The activities implemented in the MFP 1 are independent of each other, and, fundamentally, there is no call relation between the activities. Hence, addition (installation) or deletion (uninstallation) of activities can be performed on an activity basis. Therefore, if another activity different than the activities illustrated in FIG. 2 is needed, the activity may be created by a combination of various filters and the activity may be installed.

Figure 5:
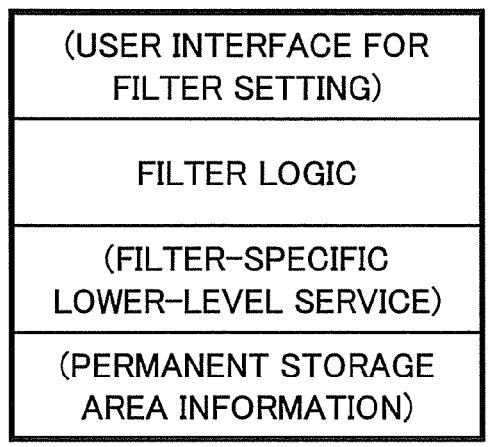
FIG. 5 is a diagram for explaining the components of a filter.

The filter and the activity will be described in greater detail. FIG. 5 is a diagram for explaining the components of a filter.

As illustrated in FIG. 5, the filter includes a filter-setting user interface, a filter logic, a filter-specific lower-level service, and permanent storage area information. Among these elements, the filter-setting user interface, the filter-specific lower-level service and the permanent storage area information are not contained as the components with respect to a certain filter.

The filter-setting user interface is a program which is configured to display the screen for causing the user to set up the operating conditions of the filter, on the operation panel 602. Namely, the operating conditions are set up for every filter. For example, in the case of the reading filter 111, the filter-setting user interface corresponds to the screen for causing the user to set up a document kind, a reading size, a resolution, etc., which is displayed on the operation panel 602. If the operation panel 602 is arranged to perform a display control based on HTML data or scripts, the filter-setting user interface may correspond to HTML data or scripts.

The filter logic is a program in which the logic for performing the function of the filter is implemented. Namely, the function of the filter is carried out according to the operating conditions set up through the filter-setting user interface, by using the filter-specific lower-level service as the component of the filter and the service mechanism 20. For example, in the case of the reading filter 111, the filter logic corresponds to the logic for controlling reading of the document by the imaging part 604.

The filter-specific-lower-level service is a lower-level function (library) which is needed to realize the filter logic. The permanent storage area information corresponds to a schema definition of the data which is needed to be stored in the non-volatile memory, such as setup information of the filter (for example, defaults of operating conditions). This schema definition is registered in the data managing part 23 at the time of installation of the filter.

Figure 6:
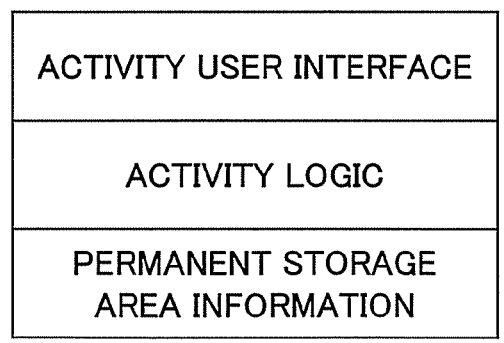
FIG. 6 is a diagram for explaining the components of an activity.

FIG. 6 is a diagram for explaining the component of an activity.

As illustrated in FIG. 6, the activity includes an activity user interface (UI), an activity logic, and permanent storage area information.

The activity UI is information or a program for displaying the screen of the activity (for example, a setting screen for causing the user to set up the operating conditions of the activity), on the operation panel 602.

The activity logic is a program in which the content of the processing of the activity is implemented. In the activity logic, fundamentally, the logic related to the combination of filters (for example, the order of execution of filters, the setting over two or more filters, the change of connection of filters, error processing, etc.) are implemented.

The permanent storage area information corresponds to a schema definition of the data which is needed to be stored in the non-volatile memory, such as setup information of the activity (for example, defaults of operating conditions). This schema definition is registered into the data managing part 23 at the time of installation of the activity.

Referring back to FIG. 2, the service mechanism 20 is the layer in which software components which provide the primitive services used by the activities or the filters, and software components which provide the mechanism for making the applications be non-restrictive to the hardware specifications of each device type are implemented. In the composition of FIG. 2, the software components, including an image piping part 21, a user interface (UI) part 22, a data managing part 23 and a marking service 24, are contained in the service mechanism 20.

The image piping part 21 carries out the function of the pipe described above. Namely, the output data from the preceding filter is received by the image piping part 21 using a memory area, etc. and the received output data is transmitted to the following filter by the image piping part 21. In the composition of FIG. 2, the image piping part 21 is illustrated as one block. However, a number of substances of the image piping parts 21 corresponding to a number of the pipes may be created to connect between two of the filters.

The UI part 22 interprets a request of a user input from an operation screen displayed on the operation panel 602, and transfers a processing control according to the user request to the software component in the application mechanism 10 or the service mechanism 20. The data managing part 23 specifies storing methods and storing locations with respect to varieties of information stored inside and outside the image forming device, such as user information.

The marking service 24 receives a request from the marking filter 135 and performs a process of embedding information to image data or a process of extracting embedded information from image data in response to the received request.

The device mechanism 30 includes a unit which controls each of respective devices which are arranged in the MFP 1.

The operation part 40 is a part of the software of the MFP 1 in which the software components related to the administrative operations of the system are implemented. This operation part 40 is used in common by the application mechanism 10, the service mechanism 20, and the device mechanism 30. As illustrated in FIG. 2, a plug-in managing part 41 is included in the operation part 40. The plug-in managing part 41 manages the information of the plug-in software components which can be freely installed or uninstalled in the software of the MFP 1, such as the activities and the filters.

Next, the embedded information extracting function or the information embedding function (which is called "marking process function") in the MFP 1 having the above-described software composition will be described.

Figure 7:
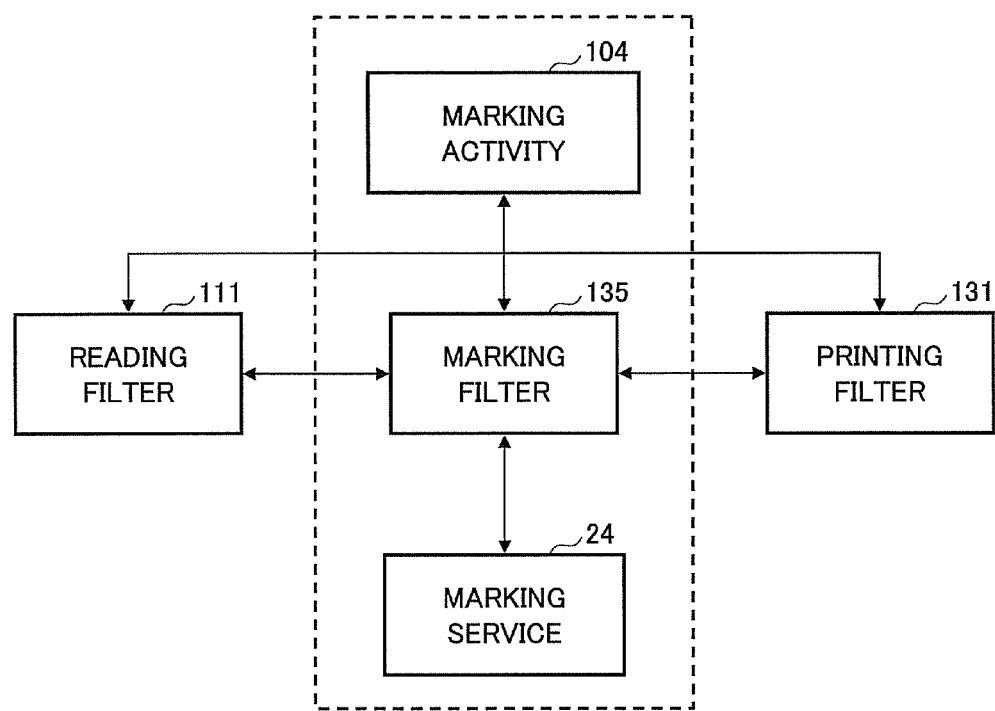
FIG. 7 is a diagram illustrating the composition of the software components for performing a marking process function.

FIG. 7 is a diagram illustrating the composition of the software components for performing the marking process function. A job of the marking process function (which is called a "marking job") is controlled by the marking activity 104. In the composition of FIG. 7, the marking activity 104 performs a marking job using the combination of the reading filter 111, the marking filter 135, and the printing filter 131. Alternatively, the printing filter 131 is not necessarily needed, which depends on the kind of the marking process function.

For example, when an output person detecting job, which is one of the marking jobs, is performed, the marking activity 104 controls the reading filter 111 so that image data of a paper document is read by the imaging part 604 under the control of the reading filter 111. The marking activity 104 controls the marking filter 135 so that the embedded information for output person detection (output person detection information) embedded in the paper document (or the corresponding image data) in accordance with the format, such as ground tint or bar code, is extracted under the control of the marking filter 135. The image processing for extracting the output person detection information is performed by the marking service 24. Subsequently, the extracted information (for example, information which specifies an output person has printed the document image) is displayed on the operation panel 602 by the marking filter 135. In this manner, when an output person detecting job is performed, the document editing filter 121 and the printing filter 131 are not needed.

When a falsification detecting job, which is one of marking jobs, is performed, the marking activity 104 controls the reading filter 111 so that image data of a paper document is read by the imaging part 604 under the control of the reading filter 111. The marking activity 104 controls the marking filter 135 so that the embedded information for falsification detection (falsification detection information) embedded in the paper document (or the corresponding image data) in accordance with the format, such as ground tint or bar code, is extracted under the control of the marking filter 135. The image processing for extracting falsification detection information is performed by the marking service 24. Moreover, based on the extracted falsification detection information, the marking service 24 determines the existence of a falsification, and if a falsification is detected, specifies the location of a falsified part by giving a color marking to the corresponding falsified part. The method of detection of a falsification and determination of a falsified part location using a ground tint is known in the related art, and this method may be used in this embodiment. For example, the method of this type is disclosed in Japanese Laid-Open Patent Publication No. 2005-12530 and Japanese Laid-Open Patent Publication No. 2005-192148, the contents of which are incorporated herein by reference in their entirety.

When a falsification is detected by the marking service 24, the marking filter 135 outputs the image data in which the color marking is given to the corresponding falsified part, to the document editing filter 121. Subsequently, the marking activity 104 controls the printing filter 131 so that the image data received from the marking filter 135 is printed on a copy sheet under the control of the printing filter 131. Therefore, the user can recognize the existence of the falsification and the location of the falsified part by reviewing the printed document.

On the other hand, when a falsification is not detected by the marking service 24, a message indicating that no falsification is detected is displayed on the operation panel 602 and the falsification detecting job is terminated. In this case, the document editing filter 121 and the printing filter 131 are not used.

In the composition of FIG. 7, the example in which the reading filter 111 is used as the input filter and the printing filter 131 is used as the output filter is illustrated. Alternatively, the input filter and the output filter may be altered suitably depending on the kind of a job to be performed.

Figure 8:
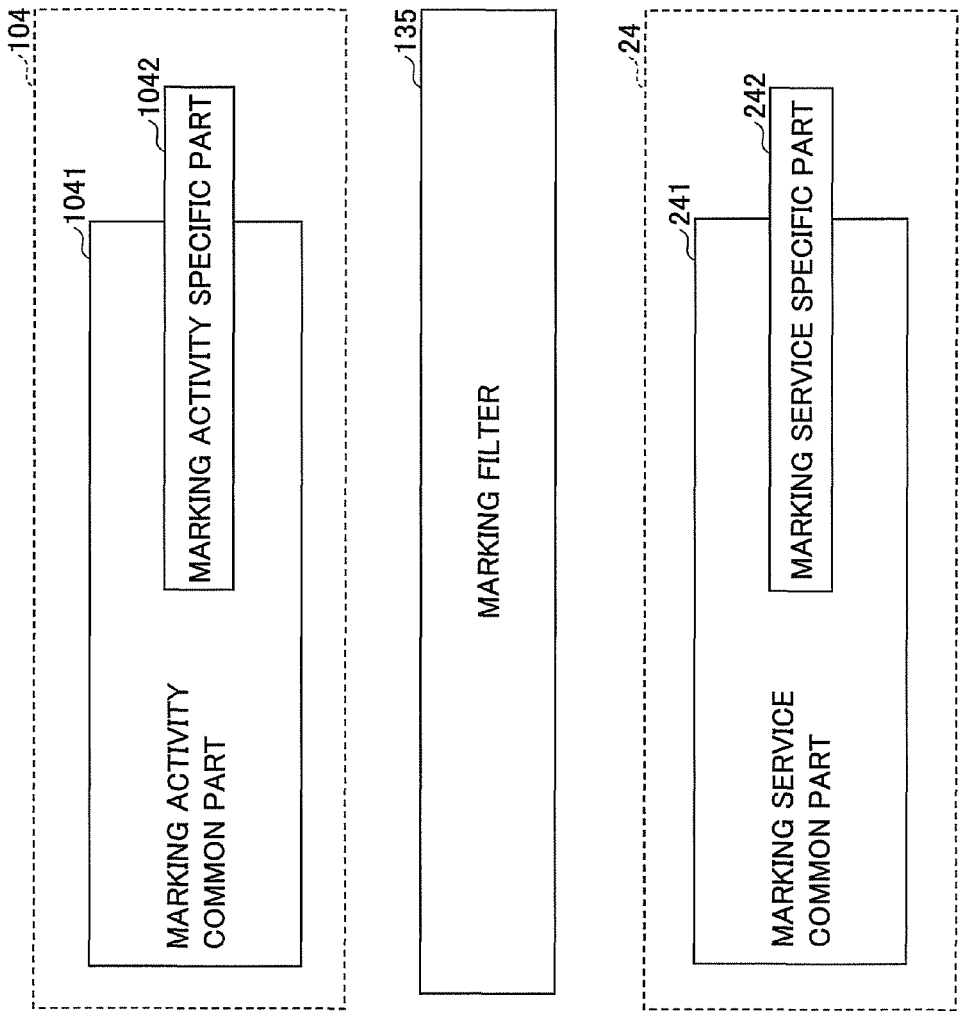
FIG. 8 is a diagram illustrating the composition of a marking activity, a marking filter, and a marking service.

Next, a description will be given of the indispensable software components in the composition of FIG. 7 for performing the marking process function. The indispensable software components are surrounded by the dotted line in FIG. 7. FIG. 8 is a diagram illustrating the composition of a marking activity, a marking filter, and a marking service.

As illustrated in FIG. 8, the marking activity 104 includes a marking activity common part 1041 and a marking activity specific part 1042. The marking activity common part 1041 is the portion of the marking activity 104 which is configured to perform a common process which is common to the respective kinds of the marking jobs among the processes which are to be performed by the marking activity 104. On the other hand, the marking activity specific part 1042 is the portion of the marking activity 104 which is configured to perform a specific process which is specific to a kind of the marking jobs. Actually, a plurality of marking activity specific parts 1042 are implemented in the MFP 1 for performing specific processes which are specific to the respective kinds of the marking jobs required for the MFP 1.

It is necessary that the marking activity specific part 1042 be provided with an interface specified in the marking activity common part 1041. In other words, the marking activity specific part 1042 is created by implementing the specific process which is specific to the kind of the marking jobs, together with the interface specified in the marking activity common part 1041.

Similarly, in the composition of FIG. 8, the marking service 24 includes a marking service common part 241 and a marking service specific part 242. The marking service common part 241 is the portion of the marking service 24 which is configured to perform a common process which is common to the respective kinds of the marking jobs among the processes which are to be performed by the marking service 24. On the other hand, the marking service specific part 242 is the portion of the marking service 24 which is configured to perform a specific process which is specific to a kind of the marking jobs. Actually, a plurality of marking service specific parts 242 are implemented in the MFP 1 for performing specific processes which are specific to the respective kinds of the marking jobs required for the MFP 1.

It is necessary that the marking service specific part 242 be provided with an interface specified in the marking service common part 241. In other words, the marking service specific part 242 is created by implementing the specific process which is specific to the kind of the marking jobs, together with the interface specified in the marking service specific part 242.

In the composition of FIG. 8, the marking filter 135 is a general-purpose marking filter which is suitable to the respective kinds of the marking process function. Therefore, the marking filter 135 is used in common, regardless of the kind of the marking process function. This is because the specific portions of the composition among the kinds of the marking process function are incorporated into the marking activity specific part 1042 and the marking service specific part 242.

In the composition of FIG. 8, the common portion (the marking activity common part 1041, the marking filter 135, and the marking service common part 241), which is common to the respective kinds of the marking process function, functions as a framework ("marking framework") for performing the marking process function. When it is desired to implement a certain marking process function, the portion other than the marking framework (the marking activity specific part 1042 or the marking service specific part 242) may be implemented according to the interface specified in the marking framework.

Figure 9:
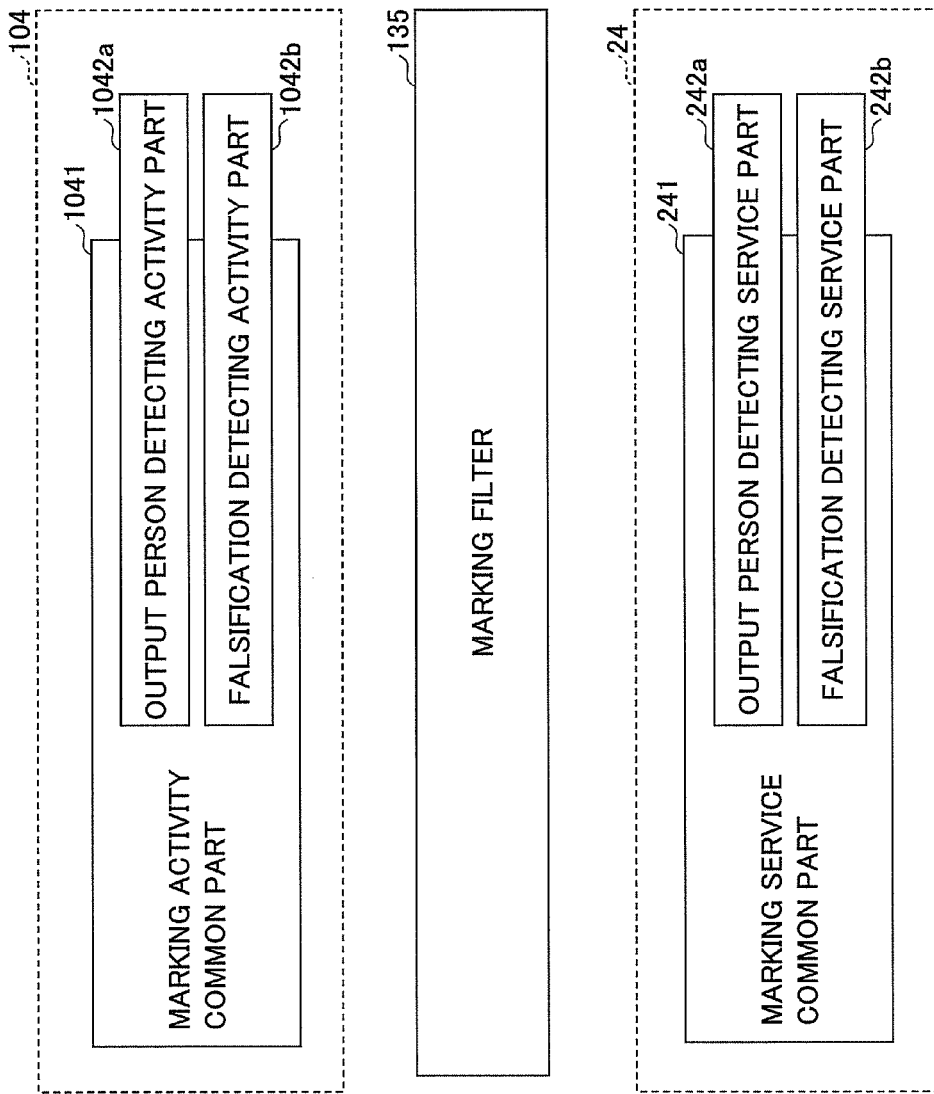
FIG. 9 is a diagram illustrating the composition in which an output person detecting function and a falsification detecting function are implemented in a marking framework.

For example, FIG. 9 is a diagram illustrating the composition when the output person detecting function and the falsification detecting function are implemented in the marking framework.

In the composition of FIG. 9, a plug-in output person detecting activity part 1042a and a plug-in falsification detecting activity part 1042b are implemented as the marking activity specific parts 1402. Moreover, in the composition of FIG. 9, a plug-in output person detecting service part 242a and a plug-in falsification detecting service part 242b are implemented as the marking service specific parts 242. According to the composition of FIG. 9, execution of an output person detecting job and a falsification detecting job is possible.

Figure 10:
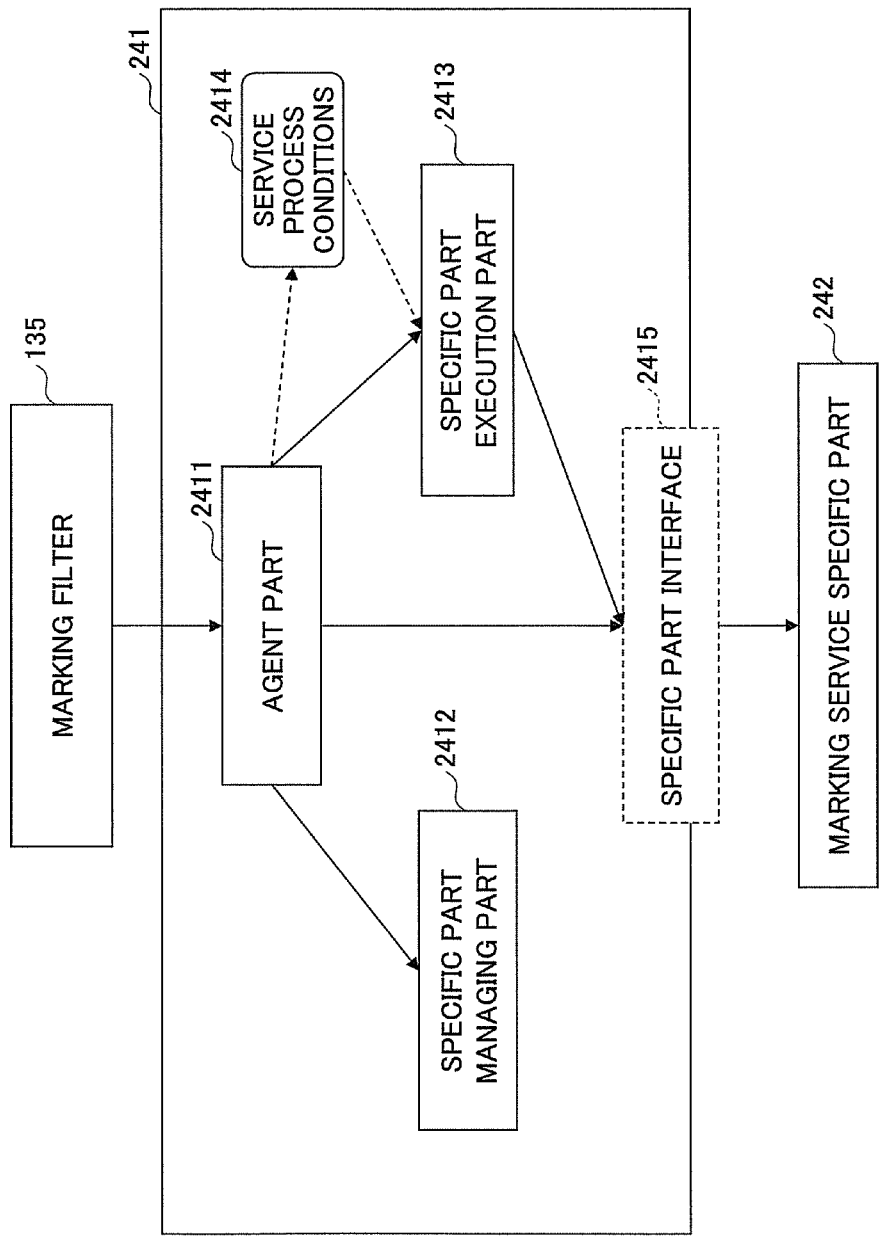
FIG. 10 is a diagram illustrating the composition of a marking service common part.

FIG. 10 is a diagram illustrating the composition of a marking service common part 241.

As illustrated in FIG. 10, the marking service common part 241 includes an agent part 2411, a specific part managing part 2412, a specific part execution part 2413, and service process conditions 2414.

The agent part 2411 is a proxy part of the marking service common part 241, and the agent part 2411 provides a common interface which is common to the respective kinds of the marking process function, to the marking filter 135. The agent part 2411 receives one of numerous requests of several kinds from the marking filter 135 through the common interface, and transmits the received request to the marking service specific part 242. In this manner, the marking filter 135 does not call the marking service specific part 242 directly. Therefore, the marking filter 135 is able to make use of the marking service 24 easily, and there is no need for the marking filter 135 to specify what kind of the marking process function is to be performed.

The specific part managing part 2412 manages one or more marking service specific parts 242. Specifically, the specific part managing part 2412 performs management of the list information of the one or more marking service specific parts 242 having been installed, and performs the loading of each marking service specific part 242 to the MFP 1. For example, this loading is instantiation of the object.

The service processing conditions 2414 are a set of data (objects) which contain the execution condition of the process by the marking service 24 when a job is executed. Specifically, the service process conditions 2414 contain the information which identifies the instance of the marking service specific part 242 used in the job being executed. This identification information may be the instance itself or the reference to the instance.

The specific part execution part 2413 causes, in response to a request received from the agent part 2411, the marking service specific part 242 (which is specified by the information contained in the service process conditions 2414) to perform a specific process (which is appropriate for each marking process function).

In the composition of FIG. 10, a specific part interface 2415 is illustrated. However, the substance of the specific part interface 2415 does not exist, and the interface which is provided by the marking service specific part 242 is illustrated as the specific part interface 2415. The specific part interface 2415 corresponds to the interface which is provided to the marking filter 135 by the agent part 2411. The agent part 2411 and the specific part execution part 2413 transmit the request received from the marking filter 135, to each marking service specific part 242 by using the specific part interface 2415.

Next, the processes which are performed by the MFP 1 when the marking process function is performed will be described. First, an initialization process for performing the marking job will be described. This initialization process is a preparatory process for performing the marking job. For example, this initialization process is performed automatically upon starting of the MFP 1.

Alternatively, the initialization process may be performed in response to a request of use of the marking job which is input by a user (for example, by depression of a marking job button corresponding to the marking job on the operation panel 602).

Figure 11:
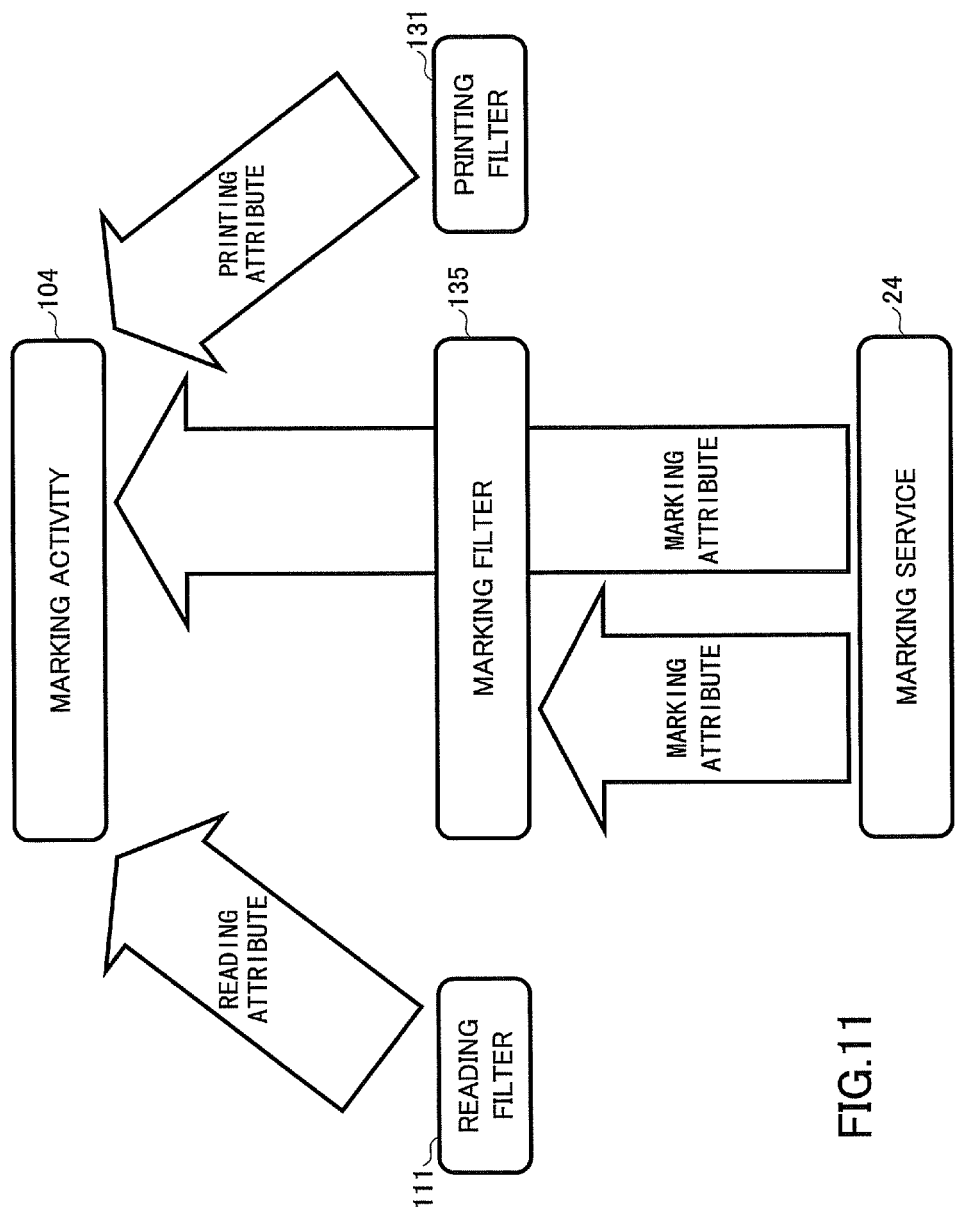
FIG. 11 is a diagram for explaining the outline of the initialization process for a marking job.

FIG. 11 is a diagram for explaining the outline of the initialization process for a marking job. As illustrated in FIG. 11, in this initialization process, the configuration information (an attribute name, a data type, an attribute value (initial value)) of the parameters (attribute items (setting items)) constituting the execution conditions, which configuration information must be set up to each of the filters used in the marking job (the reading filter 111, the marking filter 135, and the printing filter 131), is set up to the marking activity 104 by each filter.

The execution condition of the reading filter 111 is called a reading attribute. The execution condition of the marking filter 135 is called a marking attribute. The execution condition of the printing filter 131 is called a printing attribute.

As is apparent from FIG. 11, the setting of the marking attribute to the marking activity 104 is not performed by the marking filter 135 and this operation is transferred to the marking service 24. This is because the configuration of a marking attribute differs for each of the respective marking service specific parts 242 installed in the MFP 1. The versatility of the marking filter 135 is secured by transferring the setting of the marking attribute to the marking activity 104 to the marking service 24. The marking attribute is set up also to the marking filter 135.

Figure 12:
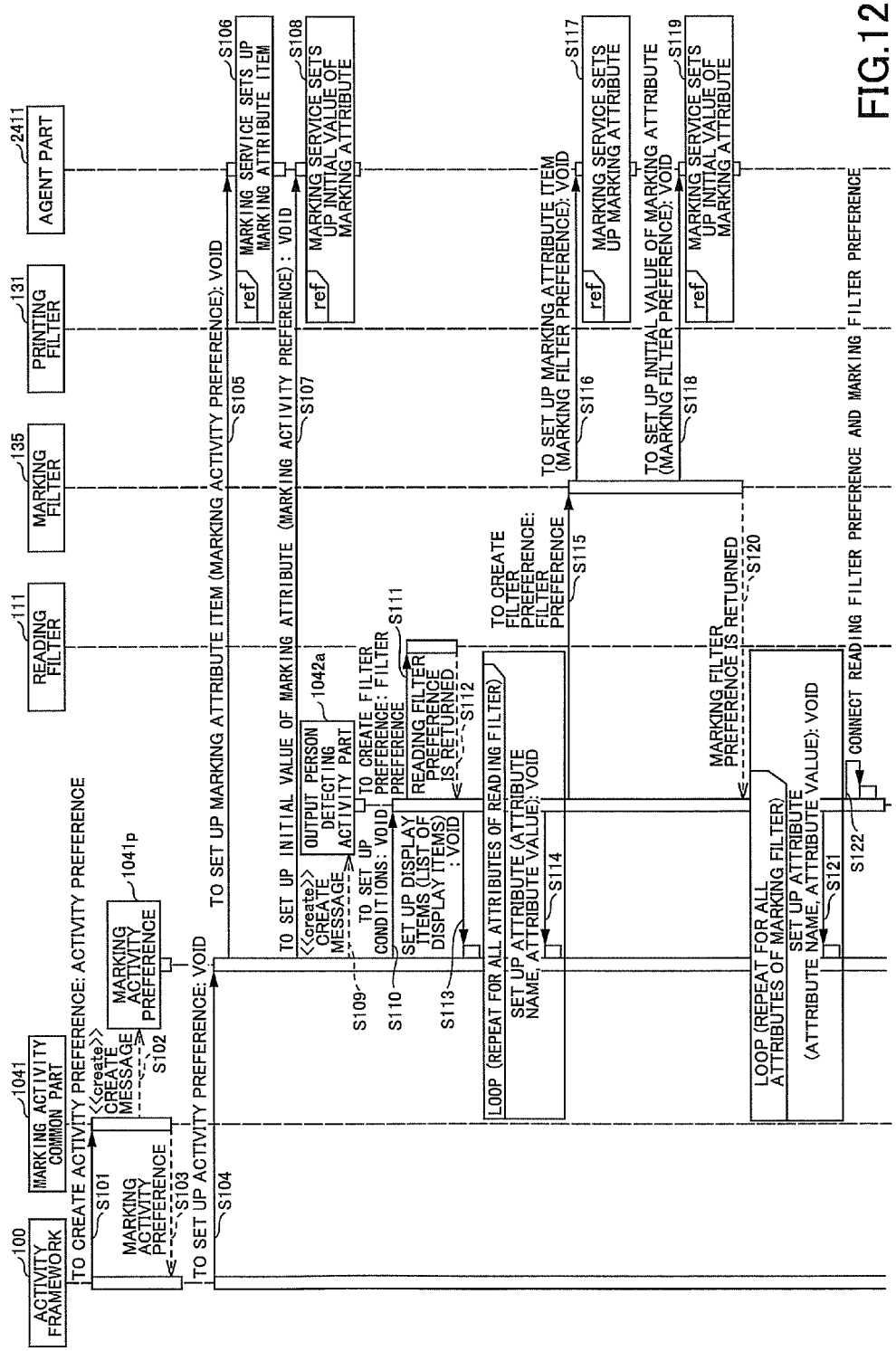
FIG. 12 is a sequence diagram for explaining the initialization process for a marking job.
Figure 13:
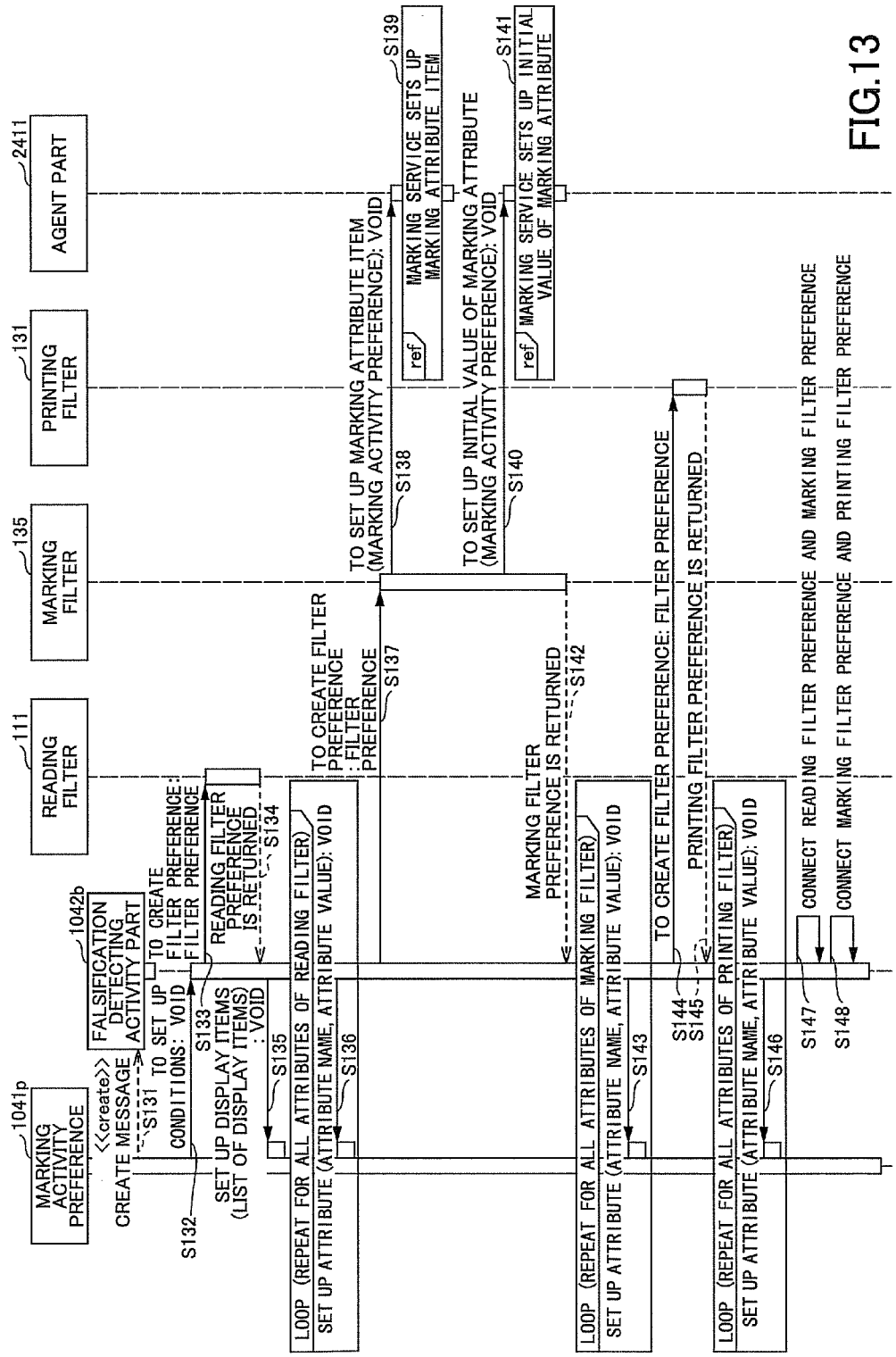
FIG. 13 is a sequence diagram for explaining the initialization process for a marking job.

A description will be given of the initialization process. FIGS. 12 and 13 are sequence diagrams for explaining the initialization process for the marking job.

In step S101, the activity framework 100 sends a request of creation of a preference to the marking activity common part 1041 (S101). In this embodiment, "preference" is an object which constitutes a part of activity logic or filter logic, and this object is for storing the information about the attribute item which constitutes execution conditions of the job or the like. Specifically, the attribute name, the data type, the attribute value, etc. of each attribute item are stored in the preference.

Subsequently, the marking activity common part 1041 creates a marking activity preference 1041p as the preference for the marking job (the instance thereof) (S102), and returns the created marking activity preference 1041p to the activity framework 100 (S103). The content of the marking activity preference 1041p is vacant at this time. Namely, the configuration information of the attribute items of the execution conditions is not set up at this time.

Subsequently, the activity framework 100 sends a request of setting of the marking activity preference 1041p (setting of the configuration information of the attribute items of the execution conditions) to the marking activity preference 1041p (S104). In response to request, the marking activity preference 1041p specifies the instance of itself (the marking activity preference 1041p) as the argument, and sends a request of setting of the configuration information (the attribute name and the data type of each attribute item) of the marking attribute to the agent part 2411 of the marking service common part 241 (S105).

In response to the request, the marking service 24 performs setting of the configuration information (attribute name and data type) of the marking attributes to the marking activity preference 1041p (S106). The details of step S106 will be described later.

Subsequently, the marking activity preference 1041p requests the agent part 2411 to set up the attribute values (initial values) to the marking activity preference 1041p (S107). In response to the request, the marking service 24 sets up the initial values (default) of the respective marking attribute items in the configuration information which is set up in step S106 (S108). The details of step S108 will be described later.

In the steps S106 and S108, the schema definition (the attribute name and the data type of each attribute item) and the initial values of the marking attributes are defined in the vacant marking preference 104p. This is because this definition varies depending on the kind of the plug-in marking service specific part 242 and the fixed configuration information of marking attributes cannot be defined beforehand.

Subsequently, the marking activity preference 1041p causes each of the currently installed marking activity specific parts 242 (which are, in this embodiment, the output person detecting activity part 1042a and the falsification detecting activity part 1042b) to perform setting of the configuration information of the execution conditions needed to perform the specific marking process function.

First, the marking activity preference 1041p creates the instance of the output person detecting activity part 1042a (S109). Subsequently, the marking activity preference 1041p sends a request of setting of the information of the execution conditions of the output person detecting job (setting to the marking activity preference 1041p) to the output person detecting activity part 1042a (S110). In response to the request, the output person detecting activity part 1042a acquires the preference (filter preference) which contains the information of each execution condition from each filter (the reading filter 111, the marking filter 135) used in the output person detecting job.

First, the output person detecting activity part 1042a sends a request of creation of a filter preference to the reading filter 111 (S111). The reading filter 111 creates the filter preference (reading filter preference) in which the attribute name, the data type and the initial values of each attribute item which constitute the reading attribute, are stored, and returns the created reading filter preference to the output person detecting activity part 1042a (S112).

Figures 14, 15:
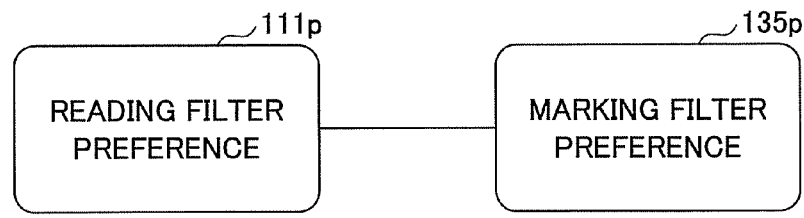
FIG. 14 is a diagram illustrating the example of a display item definition table.
FIG. 15 is a diagram illustrating the state where a reading filter preference and a marking filter preference are connected.

Subsequently, the output person detecting activity part 1042a sets up the list of the attribute names about the attribute items (display items) to be displayed on the UI screen (setting screen) among the attribute items set to the reading filter preference, to the marking activity preference 1041p (S113). The reading filter 111 is provided for the general purpose so that it may be used by various kinds of activities (various kinds of applications). Hence, the attribute items of the reading filter 111 are provided for the general purpose. However, when performing the output person detecting job, there is an attribute item whose attribute value has to be a predetermined (or fixed) value (for example, a resolution, etc.) among the attribute items of the reading filter 111. Such an attribute item has to be set to a non-display item. Hence, the attribute items corresponding to the non-display items are removed from all the attribute items, and the remaining attribute items are set to the marking activity preference 1041p. The determination as to which attribute items are considered as the non-display items may be performed based on the hard coding of the logic or the table-form information (a display item definition table as illustrated in FIG. 14) stored in the HDD 633. In the case of the display item definition table of FIG. 14, the advantageous feature is that the contents of the table may be easily modified according to the extended functions. In the example of FIG. 14, the attribute item with the need of display item being set to "TRUE" is defined as being a display item.

Subsequently, the output person detecting activity part 1042a sets the attribute name and the attribute value (initial values) to the marking activity preference 1041p for all the attribute items set to the reading filter preference (S114).

Subsequently, the output person detecting activity part 1042a repeats for the marking filter 135 the processing that is the same as the processing performed for the reading filter 111. First, the output person detecting activity part 1042a sends a request of creation of a filter preference to the marking filter 135 (S115). The marking filter 135 creates a vacant filter preference (a marking filter preference) for the marking filter 135 and sends a request of setting of the configuration information of the marking attributes to the corresponding marking preference, to the agent part 2411 of the marking service common part 241 (S116).

In response to the request, the marking service 24 performs setting of the configuration information (attribute name and data type) of the marking attribute to the marking filter preference (S117). The details of step S117 will be described later.

Subsequently, the marking filter 135 requests the agent part 2411 to set up the attribute values (initial attribute values) to the marking filter preference (S118). In response to the request, the marking service 24 sets up the initial values (default) for the respective marking attribute items in the configuration information which is set in step S117 (S119). The details of step S119 will be described later.

Subsequently, the marking filter 135 returns the marking filter preference to the output person detecting activity 1042a (S120). Subsequently, the output person detecting activity part 1042a sets the attribute name and the attribute value (initial values) to the marking activity preference 1041p for all the attribute items set to the marking filter preference (S121).

Subsequently, the output person detecting activity part 1042a connects the respective filter preferences of the reading filter 111 and the marking filter 135 (the reading filter preference, the marking filter preference) which are used in the output person detecting job in the connecting sequence corresponding to the execution order of the filters (S122). Namely, the connecting relation of filters is determined and, in the connection relation, the reading filter preference is located in the preceding stage and the marking filter preference is located in the following stage. FIG. 15 illustrates the state where the reading filter preference 111p and the marking filter preference 135p are connected.

Referring to FIG. 13, the marking activity preference 1041p causes the falsification detecting activity part 1042b to perform the processing which is the same as the processing performed by the output person detecting activity part 1042a in steps S111-S122.

First, the marking activity preference 1041p creates the instance of the falsification detecting activity part 1042b (S131). Subsequently, the marking activity preference 1041p sends a request of setting of the information of the execution conditions of the falsification detecting job (setting to the marking activity preference 1041p) to the falsification detecting activity part 1042b (S132). In response to the request, the falsification detecting activity part 1042b acquires the preference (filter preference) containing the information about each execution condition from each of the filters used in the falsification detecting job (the reading filter 111, the marking filter 135, and the printing filter 131).

First, the falsification detecting activity part 1042b sends a request of creation of a filter preference to the reading filter 111 (S133). Similar to step S112, the reading filter 111 creates the reading filter preference and returns the reading filter preference to the falsification detecting activity part 1042b (S134). The instance of the reading filter preference created at this time differs from the preference created in step S112.

Subsequently, the falsification detecting activity part 1042b sets the list of attribute names of the display items among the attribute items set to the reading filter preference to the marking activity preference 1341p (S135).

Subsequently, the falsification detecting activity part 1042b sets the attribute name and the attribute value (initial values) to the marking activity preference 1041p for all the attribute items set to the reading filter preference (S136). Subsequently, the processing which is the same as the processing of steps S115-S121 is performed for the marking filter 135 under the control of the falsification detecting activity part 1042b (S137-S143).

As a result, the marking filter preference is created and the attribute name and the attribute value of each attribute item set to the marking filter preference are set to the marking activity preference 1041p. The instance of the marking filter preference created in step S137 differs from the preference created in step S116.

Subsequently, the falsification detecting activity part 1042b repeats for the printing filter 131 the processing that is the same as the processing performed for the reading filter 111.

The falsification detecting activity part 1042b sends a request of creation of a filter preference to the printing filter 131 (S144). The printing filter 131 creates the filter preference (printing filter preference) which contains the attribute name, the data type and the initial value of each attribute item constituting the execution conditions of the printing filter 131, and returns the printing filter preference to the falsification detecting activity part 1042b (S145).

Subsequently, the falsification detecting activity part 1042b sets the attribute name and the attribute value (initial values) as the marking activity preference 1041p for all the attribute items set to the printing filter preference (S146).

Figure 16:
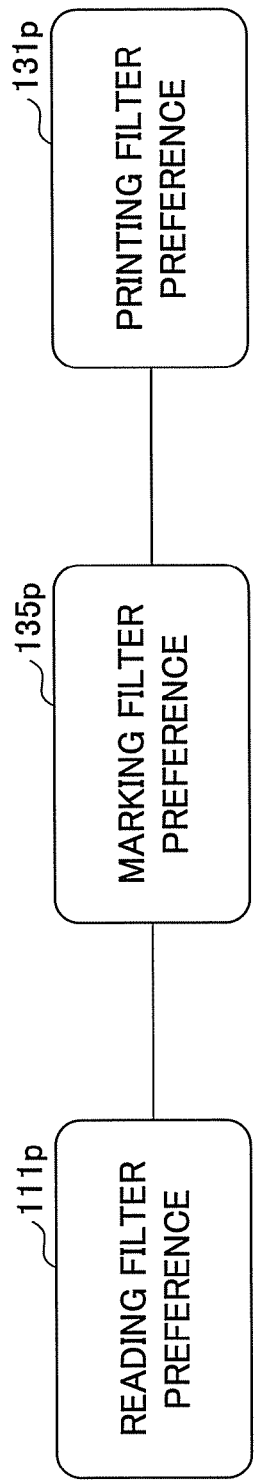
FIG. 16 is a diagram illustrating the state where a reading filter preference, a marking filter preference, and a printing filter preference are connected.

Subsequently, the falsification detecting activity part 1042b connects the reading filter preference and the marking filter preference in the connection sequence corresponding to the execution order of the filters (S147). The falsification detecting activity part 1042b connects the marking filter preference and the printing filter preference in the connecting sequence corresponding to the execution order of the filters (S148). Therefore, the connecting relation in which the reading filter preference, the marking filter preference, and the printing filter preference are connected in this order is created. The state in which the reading filter preference 111p, the marking filter preference 135p, and the printing filter preference 131p are connected is illustrated in FIG. 16.

Figure 17:
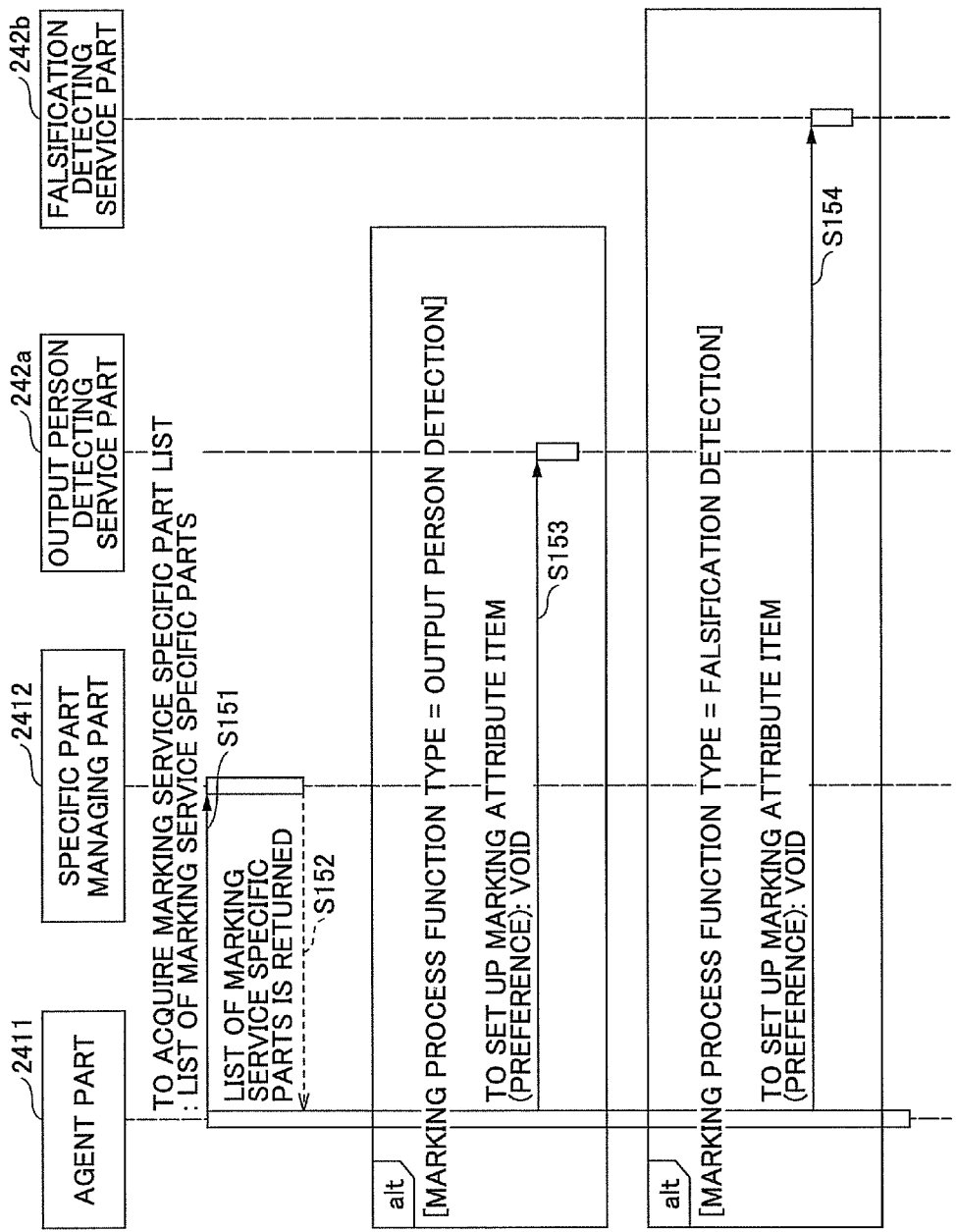
FIG. 17 is a sequence diagram for explaining the setting processing of the configuration information of marking attributes to the preference by the marking service.

Next, the common processing performed in steps S106, S117 and S139 will be described. FIG. 17 is a sequence diagram for explaining the setting processing of the configuration information of marking attributes to the preference by the marking service.

First, the agent part 2411 acquires the list (which is called "marking service specific part list") of the instances (objects) of the marking service specific part 242 installed in the MFP 1 from the specific part managing part 2412 (S151, S152). It is assumed that the instances of the marking service specific part 242 are loaded on the memory and already managed by the specific part managing part 2412. The processing is branched in accordance with the marking process function type. The marking process function type is the information which indicates a kind of the marking process function ("output person detecting function" and "falsification detecting function"). In this embodiment, in the case of step S117, the marking process function type is notified from the output person detecting activity part 1042a via steps S115 and S116. In the case of step S139, the marking process function type is notified from the falsification detecting activity part 1042b through steps S137 and S138.

When the marking process function type indicates an output person detecting function (in the case of step S117), the agent part 2411 sends a request of setting of the configuration information of the marking attributes to the preference, to the output person detecting service part 242a (S153).

In response to the request, the output person detecting service part 242a sets the attribute name and the data type of each attribute item needed for the output person detecting job to the preference.

When the marking process function type indicates a falsification detecting function (in the case of step S139), the agent part 2411 sends a request of setting of the configuration information of the marking attribute to the preference, to the falsification detecting service part 242b (S154).

In response to the request, the falsification detecting service part 242b sets the attribute name and the data type of each attribute item needed for the falsification detecting job to the preference.

In this manner, the agent part 2411 causes the marking service specific part 242 to perform the responding processing to the setting request of the configuration information of the marking attribute (or the inquiry of the configuration information of the marking attribute). The preference to be set up in the process of FIG. 17 is the preference specified as the argument in the steps S105, S116 or S139.

Figure 18:
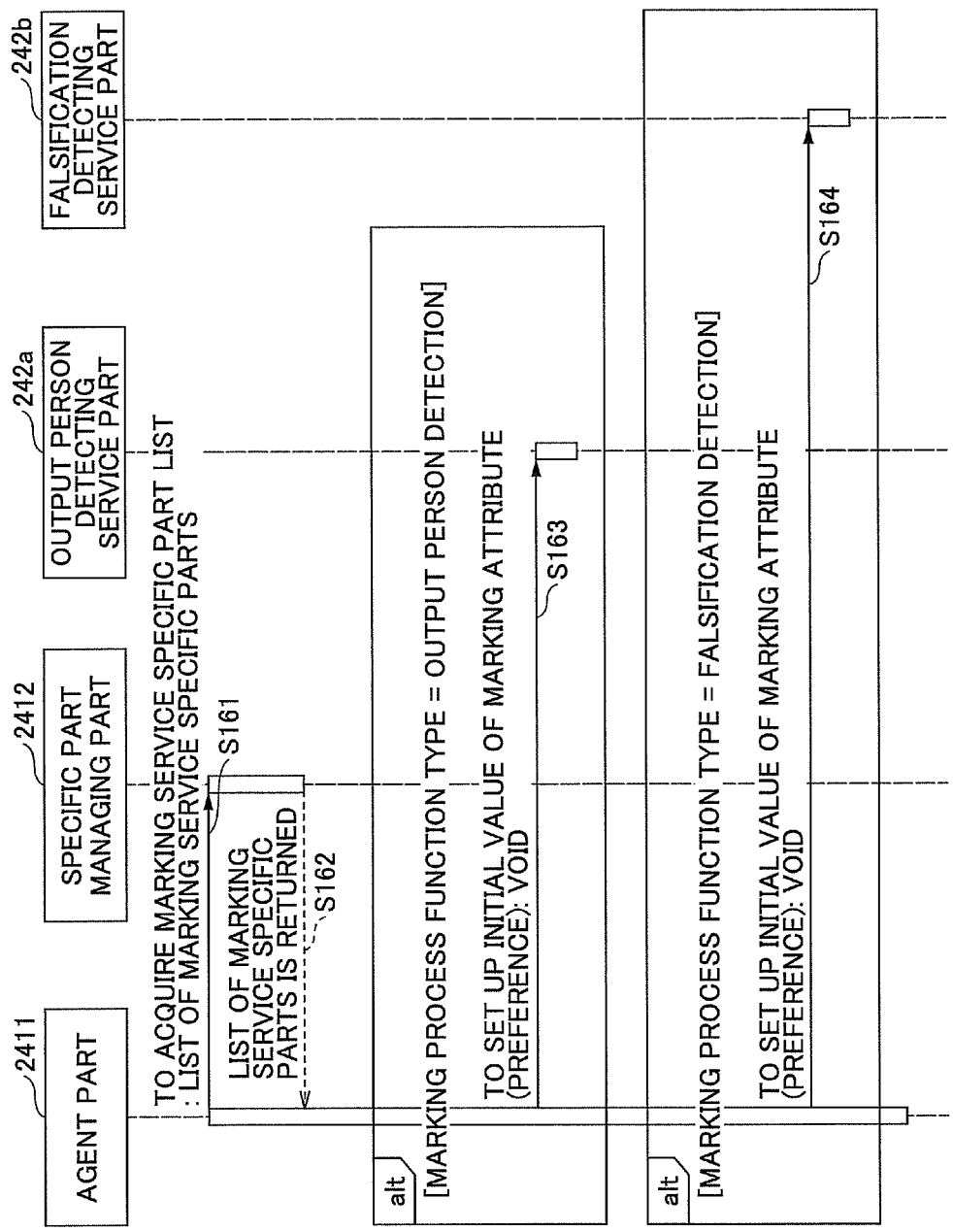
FIG. 18 is a sequence diagram for explaining the setting processing of the initial values of marking attributes to the preference by the marking service.

Next, the common processing performed in step S108, S119 and S141 of FIGS. 12 and 13 will be described. FIG. 18 is a sequence diagram for explaining the setting processing of the initial values of marking attributes to the preference by the marking service.

First, the agent part 2411 acquires a marking service specific part list from the specific part managing part 2412 (S161, S162). Then, the control processing is branched in accordance with the marking process function type.

When the marking process function type indicates an output person detecting function (in the case of step S119), the agent part 2411 sends a request of setting of the initial values of the marking attributes to the preference, to the output person detecting service part 242a (S163). In response to the request, the output person detecting service part 242a sets the initial value type of each attribute item needed for the output person detecting job as the preference. At this time, the value which indicates an output person detecting function as a marking process function type is also set to the preference.

When the marking process function type indicates a falsification detecting function (in the case of step S141), the agent part 2411 sends a request of setting of the configuration information of the marking attributes to the preference, to the falsification detecting service part 242b (S164). In response to the request, the falsification detecting service part 242b sets the initial values of attribute items needed for the falsification detecting job as the preference. At this time, the value which indicates a falsification detecting function as the marking process function type is also set to the preference.

In this manner, the agent part 2411 cause the marking service specific part 242 to perform the responding processing to the setting request of the initial value of the marking attribute (or the inquiry of the initial value of the marking attribute). The preference which is set up in the processing of FIG. 18 is the preference specified as the argument in the steps S107, S118, S140.

As described in the foregoing, the initialization process is ended. In the processing of FIGS. 12 and 13, the portions in which the implementation specific to each of the marking process functions is needed are only the output person detecting activity part 1042a and the falsification detecting activity part 1042b. In the processing of FIGS. 17 and 18, the portions in which the implementation specific to each of the marking process functions is needed are only the output person detecting service part 242a and the falsification detecting service part 242b.

On the other hand, if the MFP 1 is not provided with the marking framework, the processing of FIGS. 12 and 13 related to the marking activity common part 1041, the marking activity preference 1041p, the marking filter 135, and the agent part 2411 requires the implementation specific to each of the marking process functions. Moreover, the processing of FIGS. 17 and 18 related to the agent part 2411 and the specific part managing part 2412 requires the implementation specific to each of the marking process functions. Thus, by the use of the marking framework, the portions in which the implementation of the initialization process specific to each of the marking process functions is needed are remarkably reduced.

After the initialization process (FIG. 12, FIG. 13) is completed, if a given key (button) on the operation panel 602 is depressed by the user, the MFP 1 displays a login screen on the operation panel 602.

Figures 19, 20:
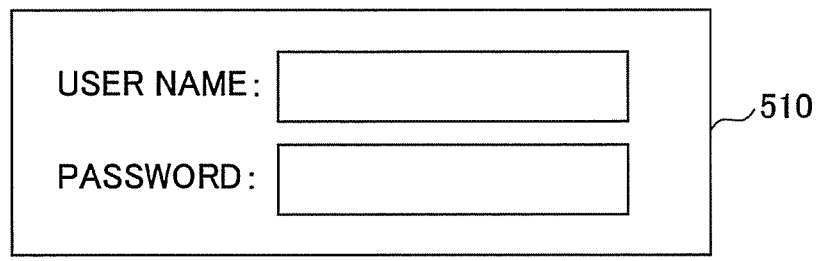
FIG. 19 is a diagram illustrating an example of a login screen displayed.
FIG. 20 is a diagram illustrating an example of a use right table.

FIG. 19 is a diagram illustrating the display example of a login screen. If a user name and a password are entered through the login screen 510 illustrated in FIG. 19, an authentication part (not illustrated) of the MFP 1 performs authentication of the user. When the authentication is normally performed, the MFP 1 determines a marking process function which is available to the user, based on a use right table stored in the MFP 1.

FIG. 20 is a diagram illustrating an example of a use right table. In the use right table of FIG. 20, the user names of users who own the use right are registered for each of the marking process functions. For example, for the output person detecting function, the users with the user names "user1" and "user2" own the use right. For the falsification detecting function, the users with the user names "user1" and "user3" own the use right.

Subsequently, the MFP 1 displays an application selection screen on the operation panel 602 so that the user can select one of the functions for which the user is determined as owning the use right based on the use right table.

Figure 21:
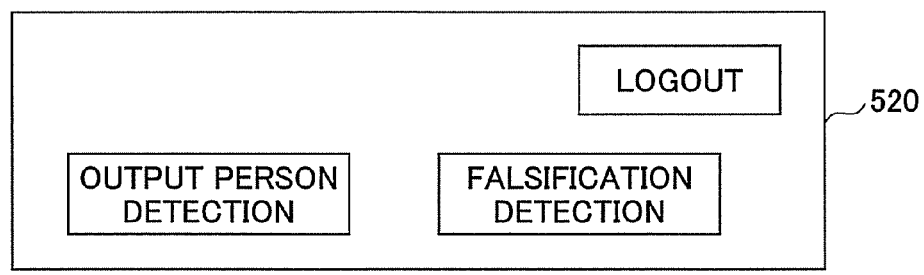
FIG. 21 is a diagram illustrating an example of an application selection screen displayed.

FIG. 21 is a diagram illustrating an example of an application selection screen displayed. As illustrated in FIG. 21, an output person detecting button and a falsification detecting button are displayed in the application selection screen 520. If the use right table of FIG. 20 is used, the example of FIG. 21 is the application selection screen which is displayed when the user ("user1") logs in the MFP 1.

When the button corresponding to one of the applications (marking process functions) in the application selection screen 520 is chosen by the user, the activity UI of the marking activity 104 (FIG. 6) which is called "marking activity UI" displays a setting screen corresponding to the selected application (the output person detecting function or the falsification detecting function) on the operation panel 602. In accordance with the selected application from the setting screen, the marking process function type corresponding to the selected application is stored (or registered) in the MEM-P 631.

When the output person detecting function is chosen, the marking activity UI displays the setting screen (output person detecting setting screen) for setting up attribute values (or the execution conditions of the output person detecting job) of the attribute items which are set to the marking activity preference 1041*p* by the output person detecting activity part 1042*a*, which attribute items are needed for the output person detecting job.

Figure 22:
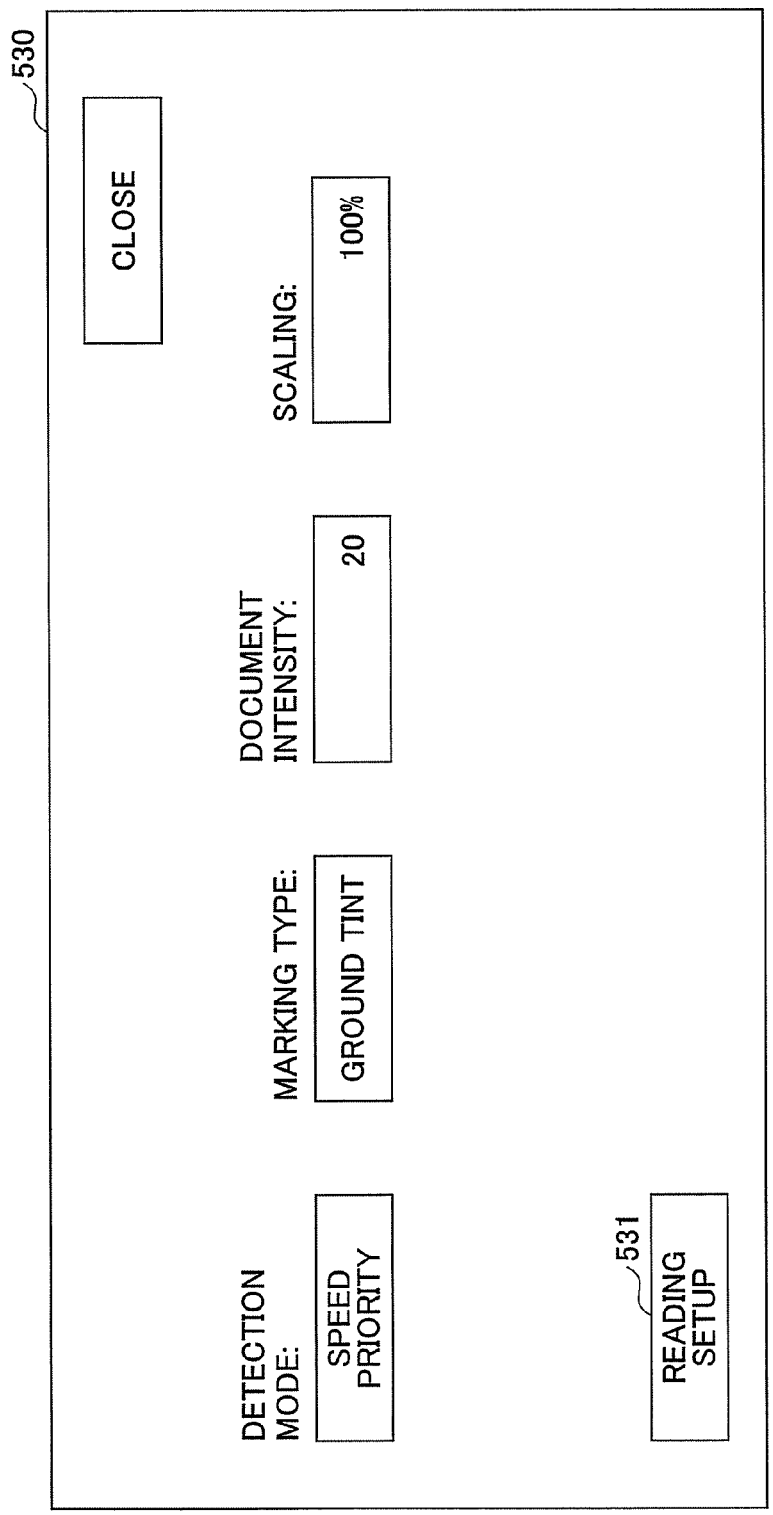
FIG. 22 is a diagram illustrating an example of an output person detecting setting screen displayed.

FIG. 22 is a diagram illustrating an example of an output person detecting setting screen displayed. In FIG. 22, display components for setting up the values (attribute values) of the respective attribute items of marking attributes, such as a detection mode, a marking type, a document intensity, and a scaling rate of the original document, are displayed in an output person detecting setting screen 530.

In the initial state of the output person detecting setting screen 530, the initial values of the respective attribute items set to the marking activity preference 1041*p* are displayed.

A reading setup key 531 is displayed in the output person detecting setting screen 530. If the reading setup key 531 is depressed, the marking activity UI displays a setting screen for setting up the reading attributes set to the marking activity preference 1041*p*.

On the other hand, when the falsification detecting function is chosen, the marking activity UI displays a setting screen (falsification detecting setting screen) for setting up the attribute values (the execution conditions of the falsification detecting job) of the attribute items (the attribute items needed for the falsification detecting job) set to the marking activity preference 1041*p* by the falsification detecting activity part 1042*b*.

Figure 23:
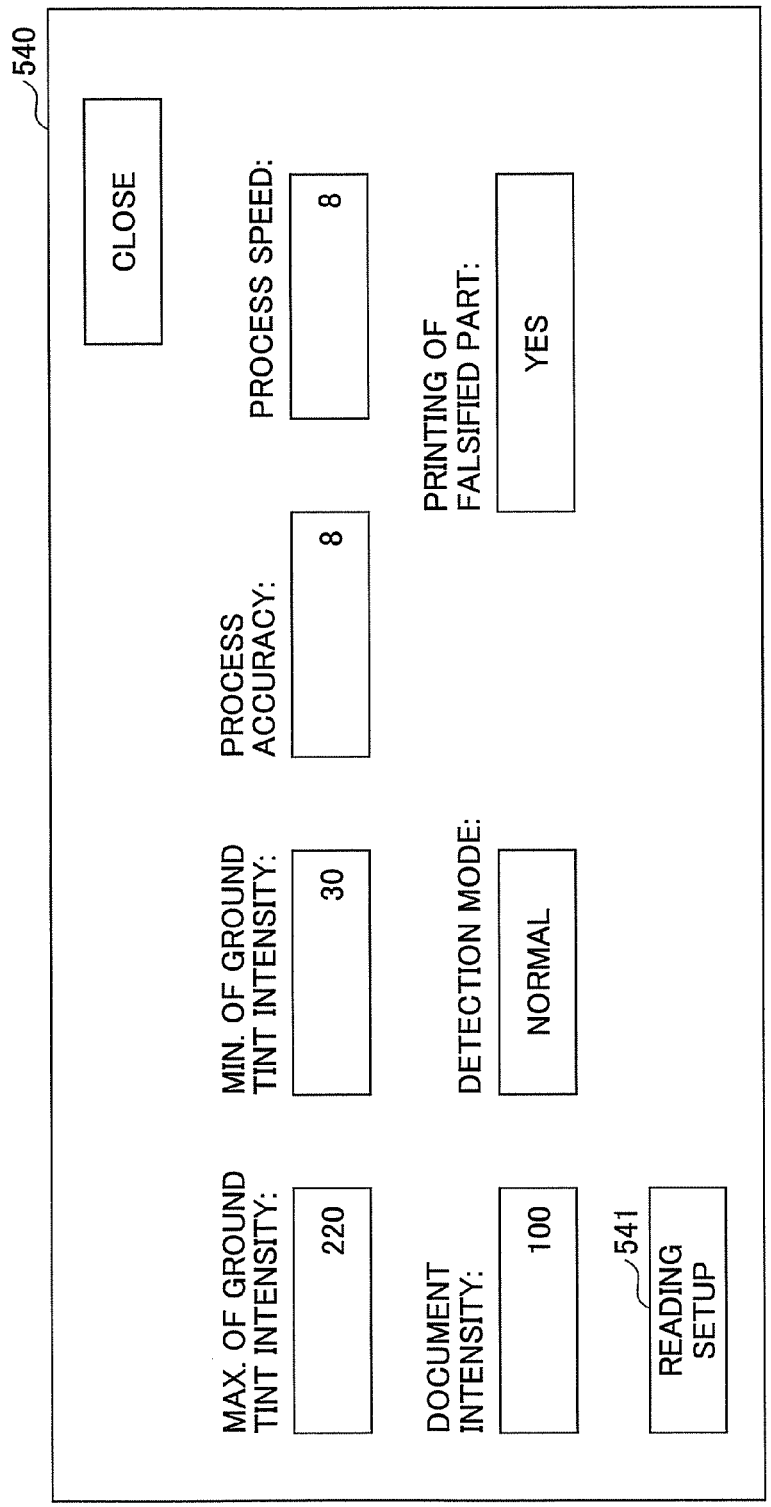
FIG. 23 is a diagram illustrating an example of a falsification detecting setting screen displayed.

FIG. 23 is a diagram illustrating an example of a falsification detecting setting screen. In FIG. 23, display components for setting up the values (attribute values) of respective attribute items of marking attributes, such as the maximum of ground tint intensity, the minimum of ground tint intensity, a processing accuracy, a processing speed, a document intensity, a detection mode, and a need for printing of a falsified part, are displayed in a falsification detecting setting screen 540.

A reading setup key 541 is displayed in the falsification detecting setting screen 540. If the reading setup key 541 is depressed, the marking activity UI displays the screen for setting up the attribute values of the reading attributes set to the marking activity preference 1041*p*.

Next, the processes performed by the MFP 1 after the setting of the execution conditions (attribute values) to the marking job is performed by the user through the setting screen (the output person detecting setting screen 530 or the falsification detecting setting screen 540 will be described.

Figure 24:
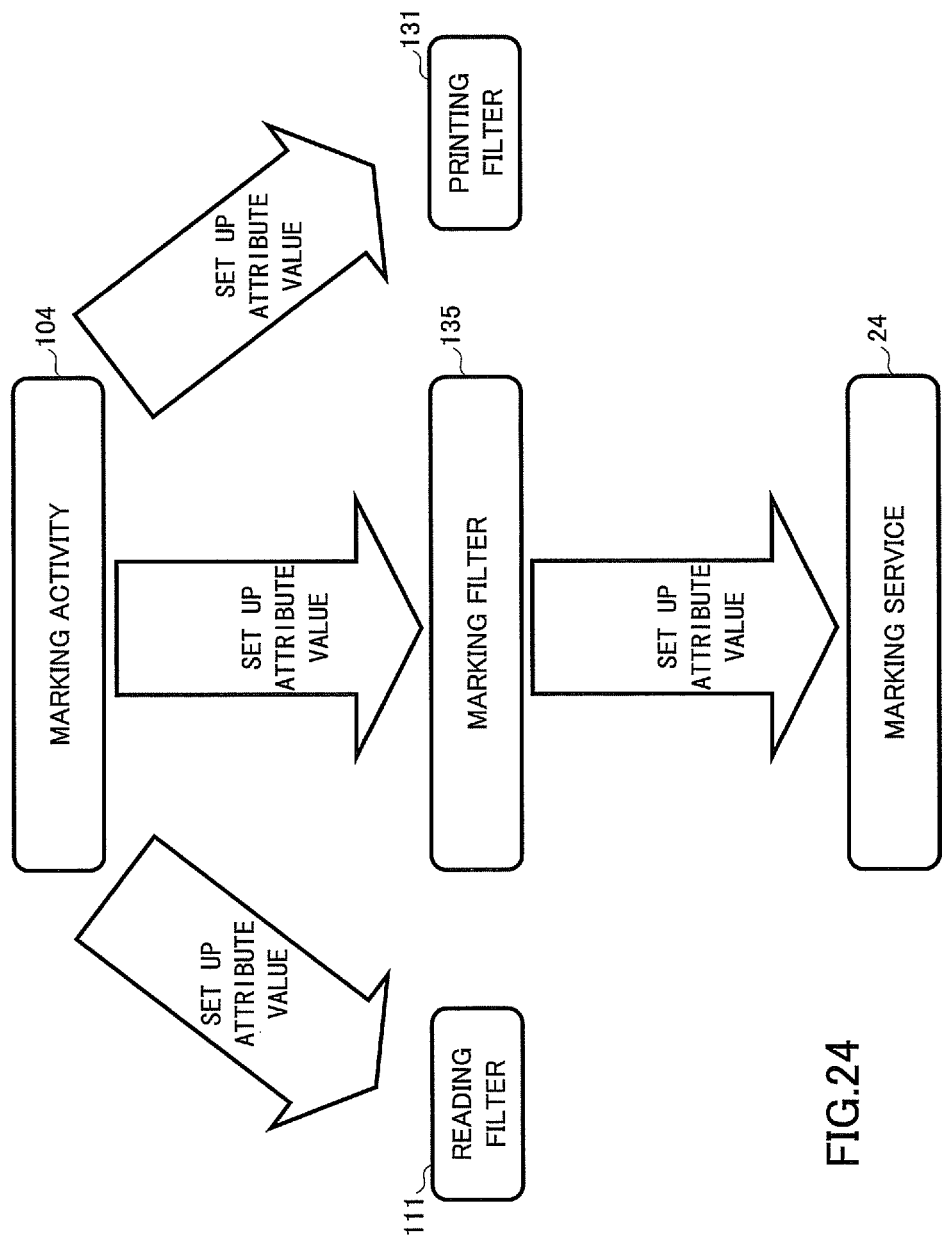
FIG. 24 is a diagram illustrating the outline of the setting processing of attribute values to the marking job.

FIG. 24 is a diagram illustrating the outline of the setting processing of attribute values to the marking job. As illustrated in FIG. 24, in the setting processing of attribute values, the attribute values set up by the user are set to the respective filters by marking activity 104.

For example, the attribute value of each attribute item of the reading attribute is set up to the reading filter 111. The attribute value of each attribute item of the marking attribute is set up to the marking filter 135. The attribute value of each attribute item of the printing attribute is set up to the printing filter 131. The attribute value set to each filter is used when each filter performs the processing. However, the attribute value set to the marking filter 135 is used by the marking service 24. Namely, the marking filter 135 sets the attribute value to the marking service 24 as it is, and does not involve with the processing (logic) which is performed based on the attribute value. The versatility of the marking filter 135 is secured by this composition.

Figure 25:
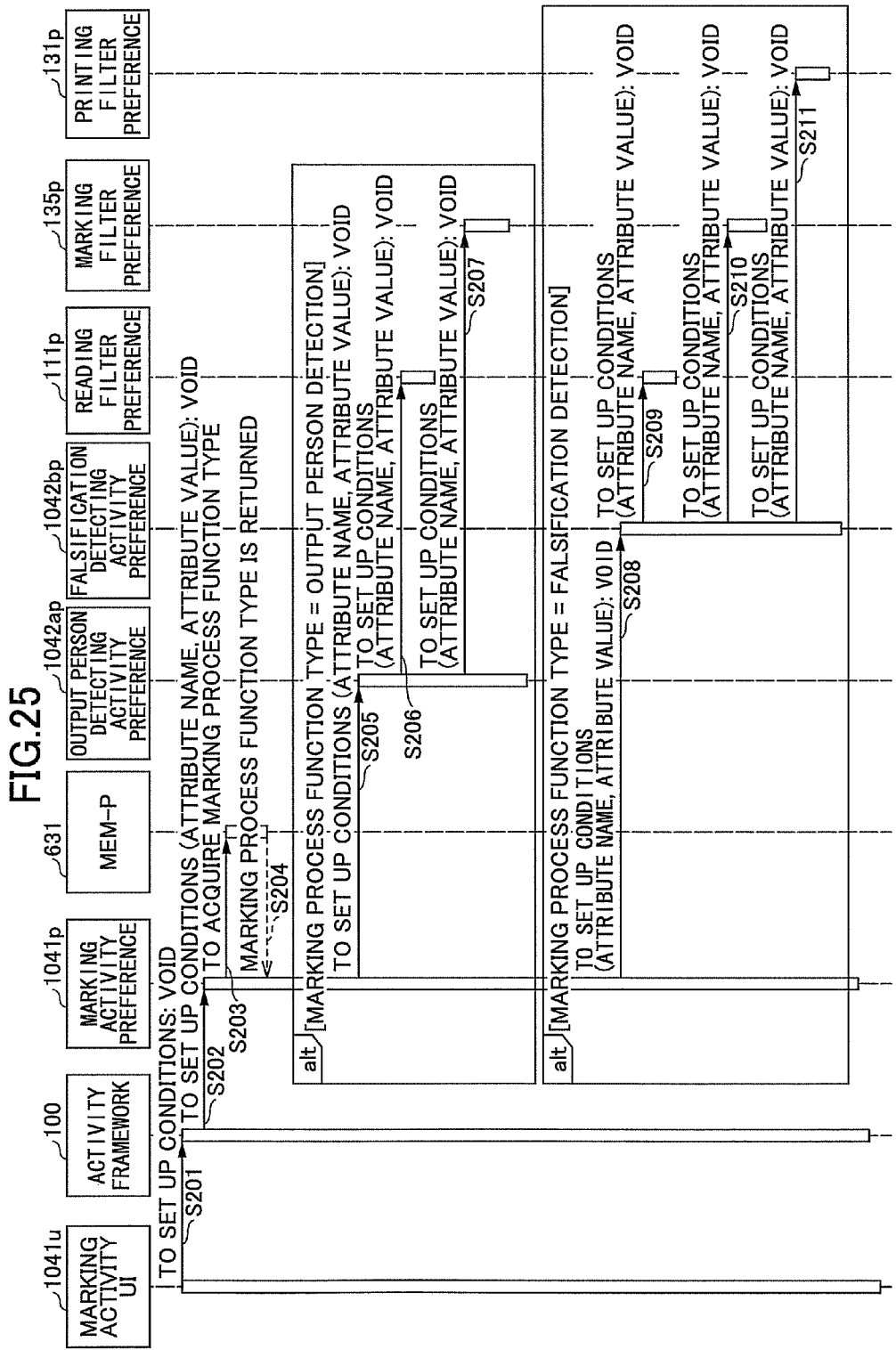
FIG. 25 is a sequence diagram for explaining the setting processing of the attribute values to the marking job.

A description will be given of the setting processing of attribute values. FIG. 25 is a sequence diagram for explaining the setting processing of the attribute value to the marking job.

If the attribute values (the execution conditions of an output person detecting job or a falsification detecting job) are set to the respective attribute items by the user through the setting screen of the output person detecting setting screen 530 or the falsification detecting setting screen 540, the marking activity UI 1041*u* notifies the corresponding attribute items and the attribute values to the marking activity preference 1041*p* through the marking framework 100 (S201, S202).

Subsequently, the marking activity preference 1041*p* acquires the marking process function type from the MEM-P 631 according to the selection of the application in the application selection screen 520 (S203, S204).

When the acquired marking process function type indicates an output person detecting function, the marking activity preference 1041*p* notifies the attribute name and the attribute value to the output person detecting marking activity preference 1042*ap* (S205). The output person detecting marking activity preference 1042*ap* is the preference to the output person detecting activity part 1042*a*.

Subsequently, the output person detecting marking activity preference 1042*ap* sets the attribute value of the corresponding attribute name to the corresponding filter preference. For example, when the corresponding attribute name relates to the attribute item of a reading attribute, the output person detecting marking activity preference 1042*ap* sets the attribute value of the corresponding attribute name to the reading filter preference 111*p* (S206).

On the other hand, when the corresponding attribute name relates to the attribute item of a marking attribute, the output person detecting marking activity preference 1042*ap* sets the attribute value to the marking filter preference 135*p* (S207).

When the acquired marking process function type indicates a falsification detecting function, the marking activity preference 1041*p* notifies the attribute name and the attribute value to the falsification detecting marking activity preference 1042*bp* (S208). The falsification detecting marking activity preference 1042*bp* is the preference to the falsification detecting activity part 1042*b*.

Subsequently, the falsification detecting marking activity preference 1042*bp* sets the attribute value of the corresponding attribute name to the corresponding filter preference. For example, when the corresponding attribute name relates to the attribute item of a reading attribute, the falsification detecting marking activity preference 1042*ap* sets the attribute value of the corresponding attribute name to the reading filter preference 111*p* (S209).

On the other hand, when the corresponding attribute name relates to the attribute item of a marking attribute, the falsification detecting marking activity preference 1042*ap* sets the attribute value to the marking filter preference 135p (S210). The falsification detecting marking activity preference 1042ap sets up the attribute name and the attribute value of the printing attribute to the printing filter preference 131p (S211). There is no display component for setting up a printing attribute in the falsification setting screen 540 of FIG. 23. This is because, in this embodiment, the fixed attribute value of the printing attribute is set to the printing filter preference 131p by the falsification detecting marking activity preference 1042ap.

The attribute value set up by the process of FIG. 25 through the output person detecting setting screen 530 or the falsification detecting setting screen 540 is set to each filter preference (refer to FIG. 15 and FIG. 16). Therefore, in this stage, the execution conditions of the output person detecting job or the falsification detecting job are held in each filter preference.

The portions in which the implementation specific to each of the marking process functions is needed are only the processing related to the output person detecting activity preference 1042ap or the falsification detecting activity preference 1042bp in the setting processing of attribute values (FIG. 25). If the MFP 1 is not provided with the marking framework, it is necessary to implement the processing related to the marking activity preference 1041p and the processing related to the marking filter preference 135p individually for each of the marking process functions. It is to be noted that, by the use of the marking framework, the portions in which the implementation of the setting processing of attribute values specific to each of the marking process functions is needed are remarkably reduced.

Figure 26:
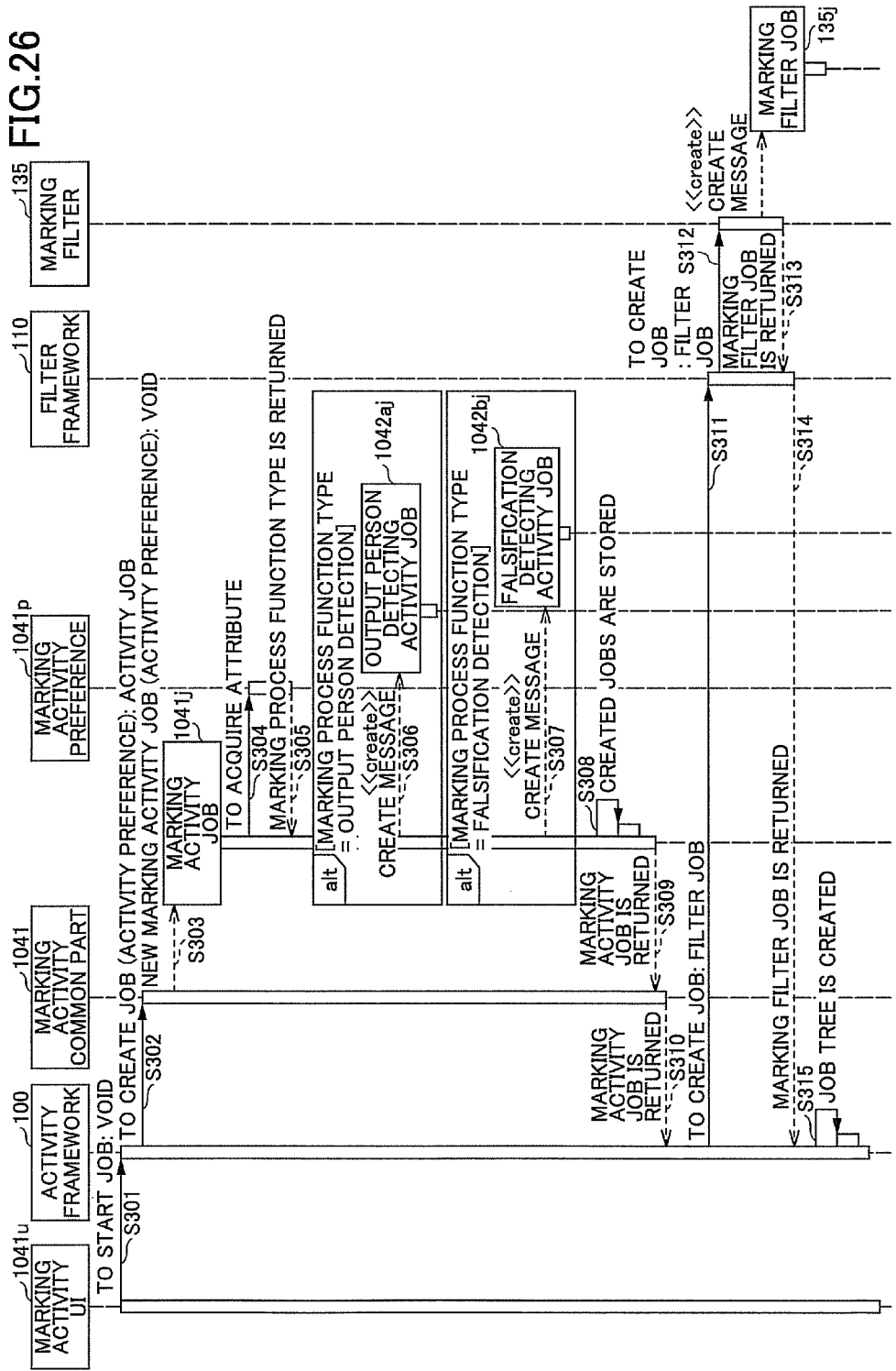
FIG. 26 is a sequence diagram for explaining the execution process of the marking job.

FIG. 26 is a sequence diagram for explaining the execution process of a marking job.

If the start button of the operation panel 602 is depressed by the user after the attribute values (the execution conditions of the job) are set up through the output person detecting setting screen 530 or the falsification detecting setting screen 540, the execution process is started. The marking activity UI 1041u sends a request of starting of the marking job to the activity framework 100 (S301).

Subsequently, the activity framework 100 specifies the marking activity preference 1041p as an argument and sends a request of creation of a job object to the marking activity common part 1041 (S302). The job object is an object which constitutes the activity logic or the filter logic, and this job object is created for every activity and every filter used in the corresponding job upon start of the job, and controls execution of the job. The order of execution of filters is expressed by the relation of connection of job objects.

The marking activity common part 1041 creates the job object (marking activity job 1041j) corresponding to the marking activity 104 (marking activity common part 1041) (S303). At this time, the marking activity common part 1041 sends the marking activity preference 1041p to the marking activity job 1041j as the argument.

Subsequently, the marking activity job 1041j acquires a marking process function type from marking activity preference 1041p (S304, S305). Subsequently, the marking activity job 1041j creates the job object corresponding to the marking activity specific part 1042.

Specifically, when the marking process function type indicates an output person detecting function, the marking activity job 1041j creates the output person detecting activity job 1042aj which is a job object corresponding to the output person detecting activity part 1042a (S306). On the other hand, when the marking process function type indicates a falsification detecting function, the marking activity job 1041j creates the falsification detecting activity job 1042bj which is a job object corresponding to the falsification detecting activity part 1042b (S307).

After step S306 or S307 is performed, the marking activity job 1041j sets the created output person detecting activity job 1042aj or falsification detecting activity job 1042bj to the job itself (the marking activity job 1041j) (S308).

Subsequently, the marking activity job 1041j returns the instance to the marking activity common part 1041 (S309). The marking activity common part 1041 returns the marking activity job 1041j to the activity framework 100 (S310).

Subsequently, the activity framework 100 sends a request of creation of the job objects of the respective filters to the filter framework 110 (S311) The filter framework 110 creates the job object of each filter based on the filter preference according to the marking job to be executed. For example, the filter framework 110 sends a request of creation of a job object to the marking filter 135 (S312). The marking filter 135 creates the marking filter job 135j and returns the same to the marking framework 110. The filter framework 110 returns the marking filter job to the activity framework 100.

For the sake of convenience, only the creation of the marking filter job 135j is illustrated in FIG. 26. Similarly, for the job objects of the jobs of other filters, a job object for each filter is created and it is returned to the activity framework 100 through the filter framework 110.

For example, when the marking job to be executed is an output person detecting job, based on the reading filter preference 1ip and the marking filter preference 135p illustrated in FIG. 15, the job object (the reading filter job 111j) of the reading filter 111 and the job object (the marking filter job 135j) of the marking filter 135 are created.

When the marking job to be executed is a falsification detecting job, based on the reading filter preference 111p, the marking filter preference 135p and the printing filter preference 131p, illustrated in FIG. 16, the job object (the reading filter job 111j) of the reading filter 111, the job object (the marking filter job 135j) of the marking filter 135, and the job object (the printing filter job 131j) of the printing filter 131 are created.

By the above processing, the job objects corresponding to the marking activity and the job objects corresponding to the respective filters used in the marking job to be executed are collected by the activity framework 100. Subsequently, the activity framework 100 connects the collected job objects together corresponding to the connecting relation of the preferences (refer to FIG. 15 and FIG. 16), and the activity framework 100 creates a job tree in the MEM-P 631 (S315). The job tree built at this time corresponding to the marking job to be executed is as follows.

Figure 28:
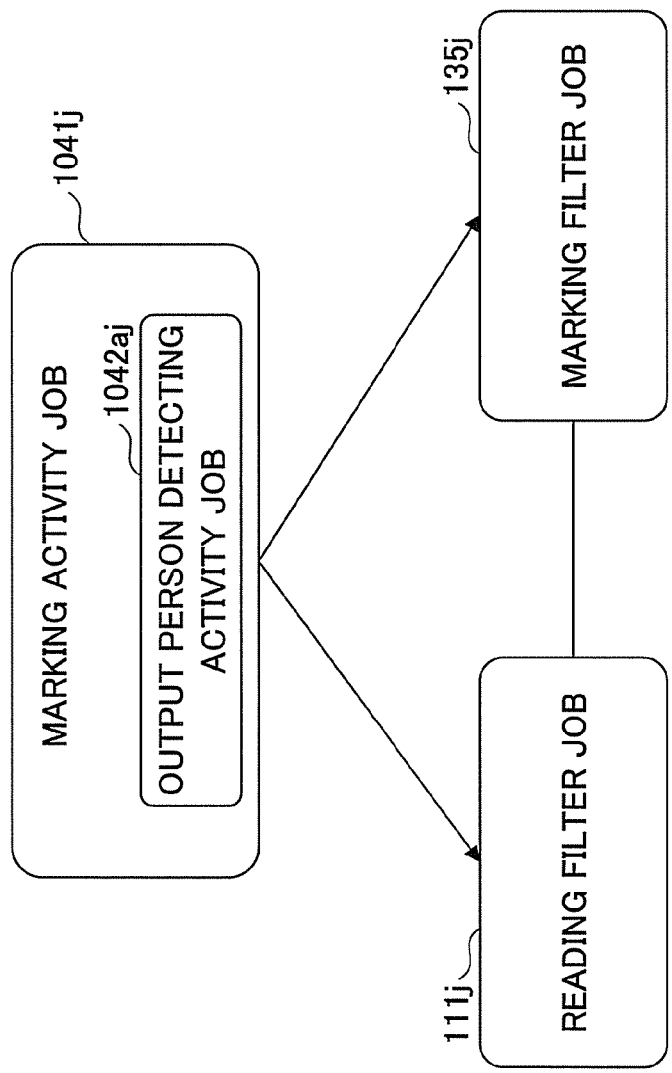
FIG. 28 is a diagram illustrating an example of a job tree when the output person detecting job is performed.

FIG. 28 is a diagram illustrating an example of a job tree when the output person detecting job is performed. In the job tree of FIG. 28, a reading filter job 111j and a marking filter job 135j are connected in the sequence corresponding to the connection order of the preferences of FIG. 15. The relation which indicates the use relation to each filter job from the marking activity job 1041j in which the output person detecting activity job 1042aj was stored in step S308 is created. By using this job tree, it is recognized that the output person detecting job needs to perform the filters in order of the reading filter 111->the marking filter 135.

Figure 29:
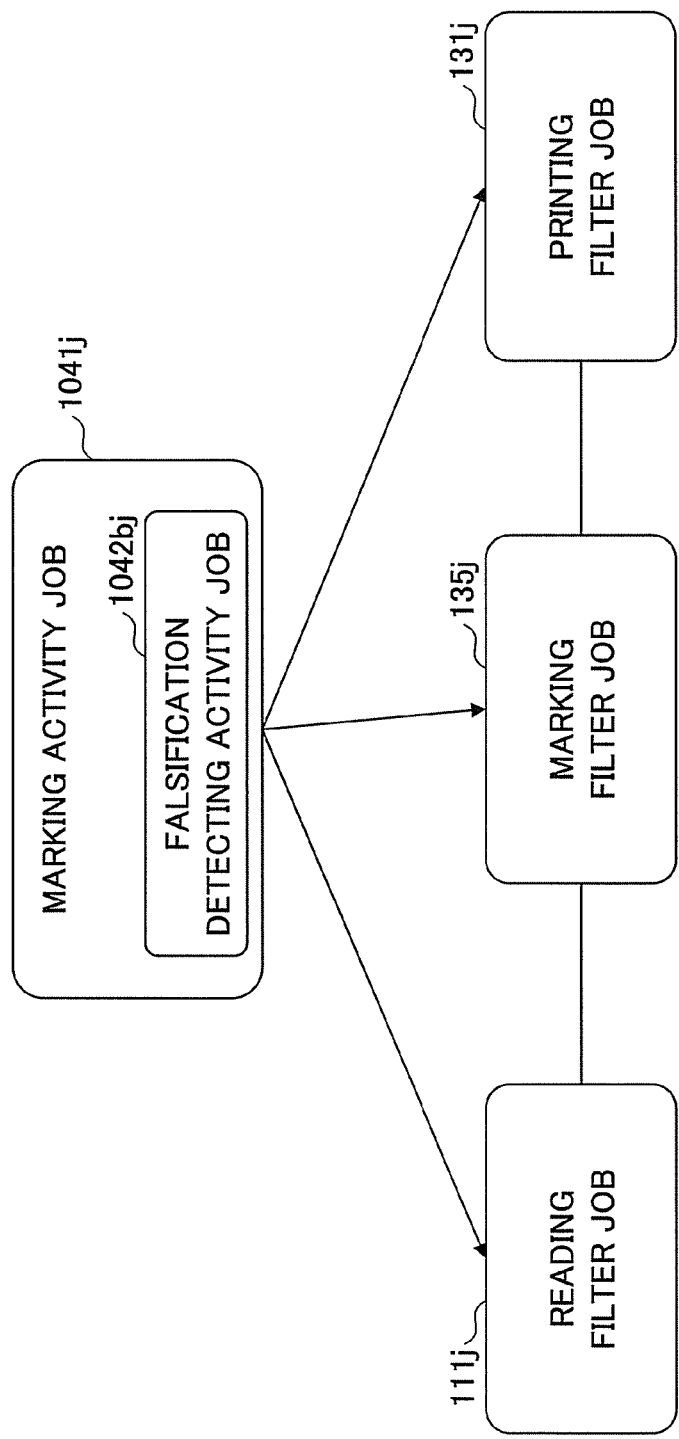
FIG. 29 is a diagram illustrating an example of a job tree when the falsification detecting job is performed.

FIG. 29 is a diagram illustrating an example of a job tree when the falsification detecting job is performed. In the job tree of FIG. 29, a reading filter job 111j, a marking filter job 135j, and a printing filter job 131j are connected in the sequence corresponding to the connection order of the preferences of FIG. 16. The relation which indicates the use relation to each filter job from the marking activity job 1041*j* in which the falsification detecting activity job 1042*bj* was stored in step S308 is created. By using this job tree, it is recognized that the falsification detecting job needs to perform the filters in order of the reading filter 111->the marking filter 135->the printing filter 131.

Figure 27:
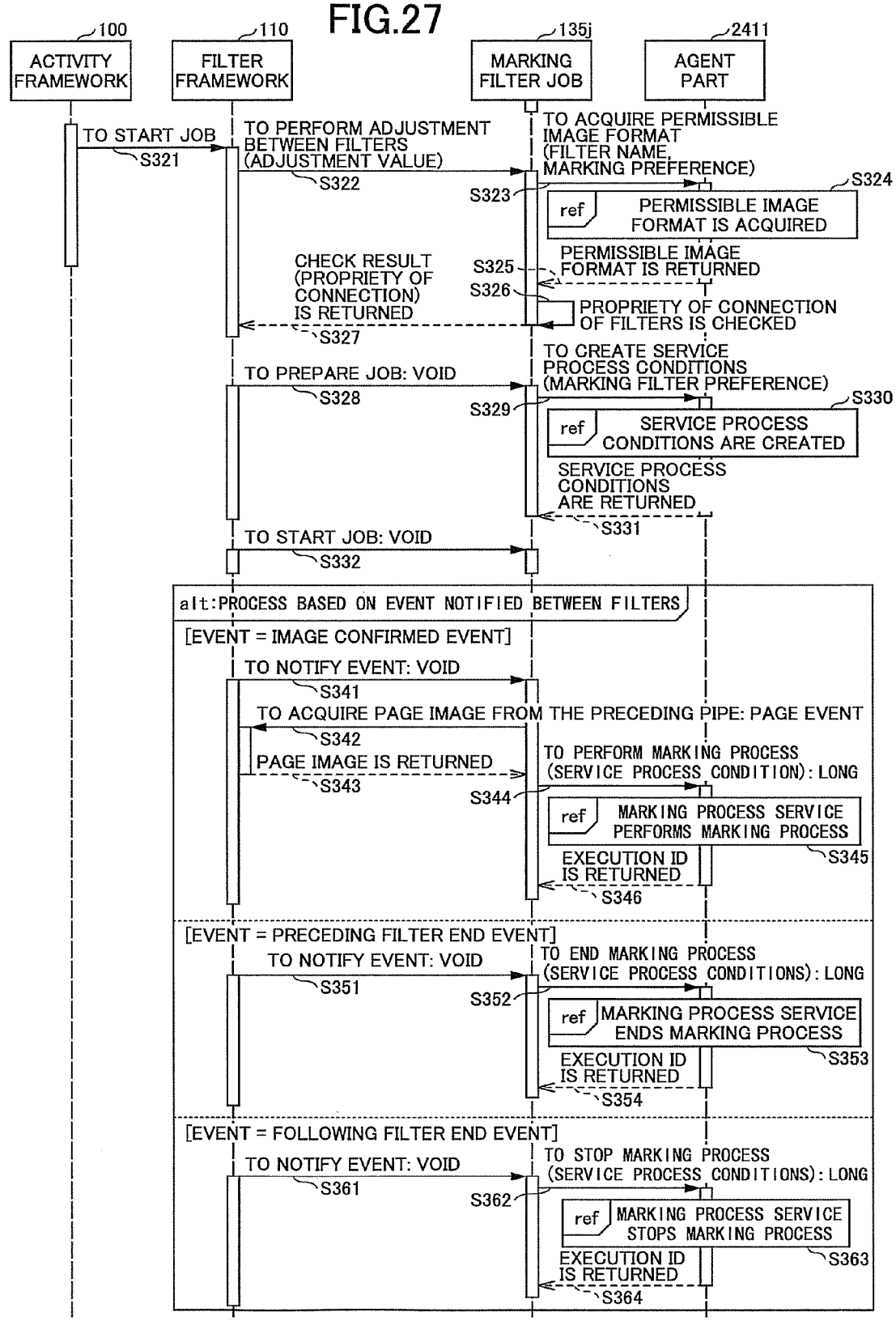
FIG. 27 is a sequence diagram for explaining the execution process of the marking job.

The activity framework 100 sends a request of starting of execution of the job to the filter framework 110 following the construction of the job tree (S321 in FIG. 27). In response to the starting request of the job, the filter framework 110 controls the execution process of the job based on the job tree stored in the MEM-P 631. First, the filter framework 110 causes each filter used in the job to perform adjustment between filters.

Figure 30:
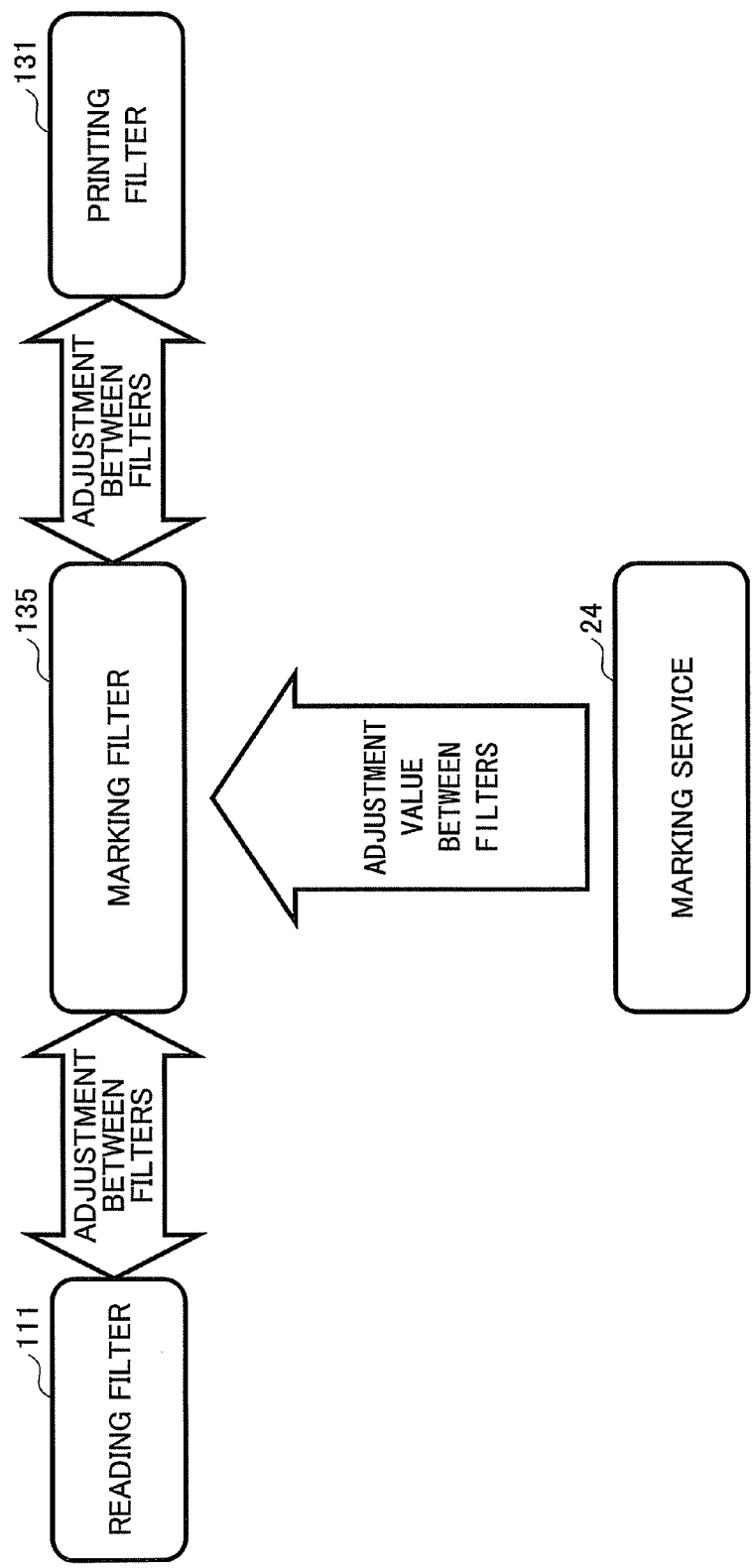
FIG. 30 is a diagram for explaining adjustment between filters.

FIG. 30 is a diagram for explaining the adjustment between filters. The adjustment between filters is the process in which the data format (image format) of image data transmitted through the pipe is adjusted between the filters arrayed in the connecting relation thereof. For example, assume that the reading filter 111 is able to output image data in both the TIFF format and the JPEG format and the marking filter 135 is able to perform image processing of image data in both the JPEG format and the BMP format. In this case, the format of the image data transmitted between these filters is adjusted to the JPEG format. Fundamentally, the format of image data which can be processed by each filter is known to the filter itself.

However, the marking filter 135 is provided in the general-purpose design, and the marking filter 135 acquires the information (which is called "adjustment value between filters") which indicates the image format of image data which can be processed, by sending an inquiry about the image format to the marking service 24.

When performing the adjustment between filters, the filter framework 110 sends a request of adjustment between filters to the filter (which is called "filter C") located at an end of the connecting relation of the filters represented by the job tree. The filter C returns the adjustment value between filters to the filter framework 110. The filter framework 110 notifies the returned adjustment value to the filter (which is called "filter B") located in the preceding stage of the filter C, and sends a request of adjustment between filters to the filter B. The filter B checks the propriety of the output in the image format indicated by the notified adjustment value, and if the output is possible, the filter B returns the adjustment value between filters to the filter framework 110. When the filter (which is called "filter A") located in the preceding stage of the filter B exists further, the filter framework 110 notifies the adjustment value of the filter B to the filter A, and sends a request of adjustment between filters to the filter A. In this manner, the adjustment between filters is performed such that the adjustment process is applied to the filters in the sequence from the following stage to the preceding stage according to the job tree.

Alternatively, the adjustment process may be applied to the filters in the reverse sequence from the preceding stage to the following stage according to the job tree. FIG. 27 is a sequence diagram for explaining the execution process of a marking job when the adjustment between filters is performed in the reverse sequence.

For the sake of convenience, only the adjustment between filters by the marking filter 135 is illustrated in FIG. 27. As illustrated in FIG. 27, in step S322, the filter framework 110 specifies the adjustment value between filters as the argument and sends a request of adjustment between filters to the marking filter job 135*j*. The adjustment value between filters specified as the argument is acquired from the job object (the reading filter job 111*j*) of the filter located in the preceding stage of the marking filter 135. Two or more kinds of image formats may be included in the adjustment value between filters.

Subsequently, the marking filter job 135*j* asks the agent part 2411 of the marking service common part 241 about an applicable image format of image data which can be processed, as illustrated in FIG. 30 (S323).

In response to the inquiry, the marking filter job 135*j* sends the filter name ("marking filter") and the marking filter preference 135*p* to the agent part 2411 as the arguments. This is because there is a possibility that an image format which can be processed changes according to the filter which uses the marking service 24 (or the marking service specific part 242), and according to the value of the marking filter preference 135*p* (the marking attribute).

In response to the inquiry, the agent part 2411 acquires an image format of image data which can be processed in the marking service specific part 242 corresponding to the marking job being executed (S324). The agent part 2411 returns the acquired image format to the marking filter job 135*j* (S325). In this case, two or more kinds of image formats may be acquired and returned. The details of step S325 will be described later.

Subsequently, the marking filter job 135*j* checks the propriety of connection between filters by comparing the adjustment value between filters (the image format of image data which can be output by the reading filter 111) notified in step S322 with the image format returned from the agent part 2411 (S326). Namely, if agreement of the image format arises, the marking filter job 135*j* determines that the connection between filters is possible, and if the agreement does not arise, the marking filter job 135*j* determines that the connection between filters is impossible. Subsequently, the marking filter job 135*j* returns a detection result (propriety of connection between filters) to the filter framework 110 (S327).

When it is determined that connection between two adjacent filters of all the filters used (the reading filter 111, the printing filter 131) is possible, the filter framework 110 requests preparation of the job to each of the filters. For the sake of convenience, only the marking filter 135 is illustrated in FIG. 27.

Namely, in step S328, the filter framework 110 sends a request of preparation of the job to the marking filter job 135*j*. The marking filter job 135*j* specifies the marking filter preference 135*p* as the argument and sends a request of creation of the service process conditions 2414 (refer to FIG. 10) to the agent part 2411 (S329). The agent part 2411 creates the service process conditions 2414 (S330), and returns the service process conditions 2414 to the marking filter job 135*j* (S331).

When the preparation of the job is completed for all the other filters, the filter framework 110 controls execution of the marking job using the respective filters (job objects).

Figure 31:
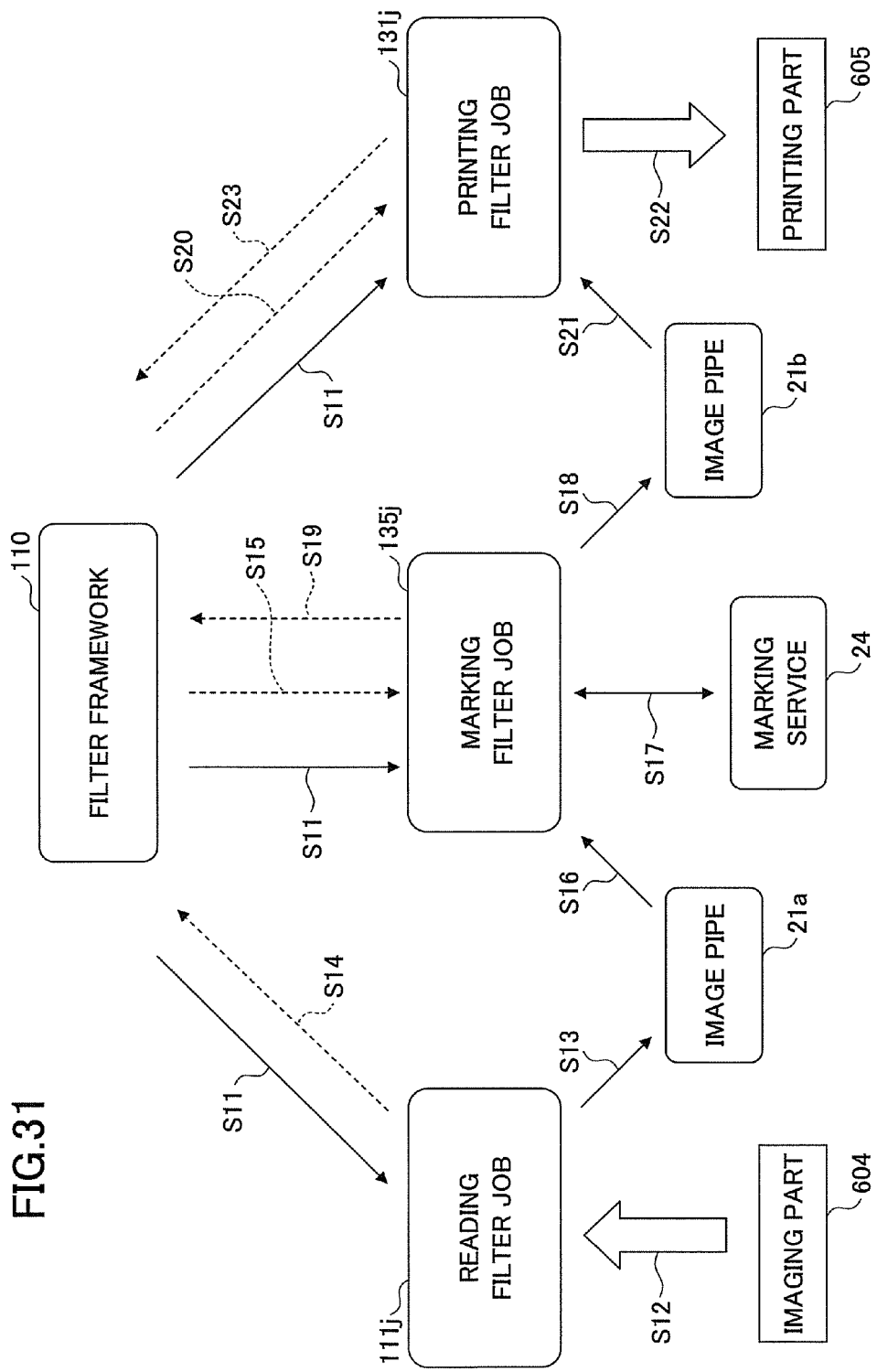
FIG. 31 is a diagram for explaining the outline of the execution process of the marking job.

FIG. 31 is a diagram for explaining the outline of the execution process of a marking job. In FIG. 31, an image pipe 21*a* is the image piping part 21 which connects between the reading filter 111 and the marking filter 135. An image pipe 21*b* is the image piping part 21 which connects between the marking filter 135 and the printing filter 131. When the job to be executed is an output person detecting job, the procedure related to the printing filter job 131*j* is not performed.

First, the filter framework 110 requests the starting of the job to the job objects simultaneously (the printing filter job 111*j*, the marking filter job 135*j*, the printing filter job 131*j*) of the filters used by the job (S11). The job object of each filter to which the starting of the job was requested delays the start of processing until the processing of the preceding filter connected on the preceding stage side (the input side of image data) is completed (or until the image data is input to the image piping part 21 connected on the input side). However, the filter located at the head end of the job tree (in this embodiment, the reading filter 111) starts processing without delay.

Namely, the reading filter job 111*j* causes the imaging part 604 to perform reading of the image data from a paper document (S12), and outputs the read image data to the image piping part 21*a* (S13). The image data is output in the image format selected by the adjustment between filters.

Subsequently, the reading filter job 111*j* notifies the event (image confirmed event) which indicates completion of the outputting of the image data to the image piping part 21*a*, to the filter framework 110 (S14). The filter framework 110 notifies the image confirmed event from the reading filter job 111*j*, to the marking filter job 135*j* (S15).

The marking filter job 135*j* takes out the image data from the image piping part 21*a* in response to the notice of the event (S16). The marking service 24 is caused to perform the marking process (which is, in this embodiment, the output person detecting process or the falsification detecting process) with respect to the image data (S17). The marking filter job 135*j* outputs the image data to the image piping part 21*b*, when the image data is contained in the processing result (detection result) from the marking service 24 (S18).

In this embodiment, the case where the image data is contained in the processing result by the marking service 24 corresponds to the case where a falsification is detected by the falsification detecting job. In this case, the image data in which the marking is given to the location of the falsified part is contained in the processing result of the marking service 24.

Subsequently, the marking filter job 135*j* notifies the event (end event) which indicates completion of the image confirmed event or completion of processing (in which the image data is not output), to the filter framework 110 (S19). The filter framework 110 notifies the event (completion of the output of the image data) from the marking filter job 135*j*, to the printing filter job 131*j* (S20). The printing filter job 131*j* takes out, in response to the notice of the event, the image data from the image piping part 21*b* (S21), and causes the printing part 605 to perform printing of the image data (S22).

When the printing is completed, the printing filter job 131*j* notifies an end event to the filter framework 110 (S23).

The procedure of steps S12 to S19 or S23 is performed for every page. Each filter notifies an end event to the filter framework 110, when the processing for all the pages is completed, or when the processing is abnormally ended for a certain reason (when stopped).

For the sake of convenience, only the portion related to the marking filter job 135*j* in the processing explained in FIG. 31 is illustrated in FIG. 27.

Namely, in step S332, the filter framework 110 requests the starting of a job to the marking filter job 135*j* (which corresponds to S11 in FIG. 31).

Subsequently, when the image confirmed event is received from the reading filter job 111*j*, the filter framework 110 notifies the received image confirmed event to the marking filter job 135*j* (S341). In response to the image confirmed event, the marking filter job 135*j* takes out the image data for one page (page image) from the image piping part 21*a* (S342, S343).

Subsequently, the marking filter job 135*j* specifies as the arguments the service process conditions 2414 and the page image, which were acquired in step S331, and sends a request of execution of the marking process to the agent part 2411 (S344).

In response to the request, the marking service 24 performs the marking process according to the service process conditions 2414 (S345), and returns an execution ID to the marking filter job 135*j* (S346). This execution ID is an ID which is created by the marking service 24 when it receives a request of execution, ending or stopping of the marking process.

On the other hand, when an end event (or an event which indicates completion of reading of all the pages) is notified to the filter framework 110 from the filter job (reading filter job 111*j*) of the filter (reading filter 111) of the preceding stage of the marking filter 135, the filter framework 110 notifies the event (the end event of the preceding stage filter) which indicates the end of the preceding stage filter, to the marking filter job 135*j* (S351). In response to the end event of the preceding stage filter, the marking filter job 135*j* specifies the service process conditions 2414 as the arguments and sends a request of the ending of the marking process to the agent part 2411 (S352). In response to the request, the marking service 24 performs the end processing of the marking process based on the service process conditions 2414 (S353), and returns an execution ID to the marking filter job 135*j* (S354).

When an end event (or a stop event which indicates the stop of the processing) from the filter job (the printing filter job 131*j*) of the filter (the printing filter 131) of the following stage of the marking filter 135 is notified to the filter framework 110, the filter framework 110 notifies the event which indicates the end of the following stage filter (or the end event of the following stage filter), to the marking filter job 135*j* (S361). In response to the end event of the following stage filter, the marking filter job 135*j* specifies the service process conditions 2414 as the arguments and sends a request of the stopping of the marking process to the agent part 2411 (S362). In response to the requests the marking service 24 performs the stop processing of the marking process based on the service process conditions 2414 (S363), and returns an execution ID to the marking filter job 135*j* (S364).

Figure 32:
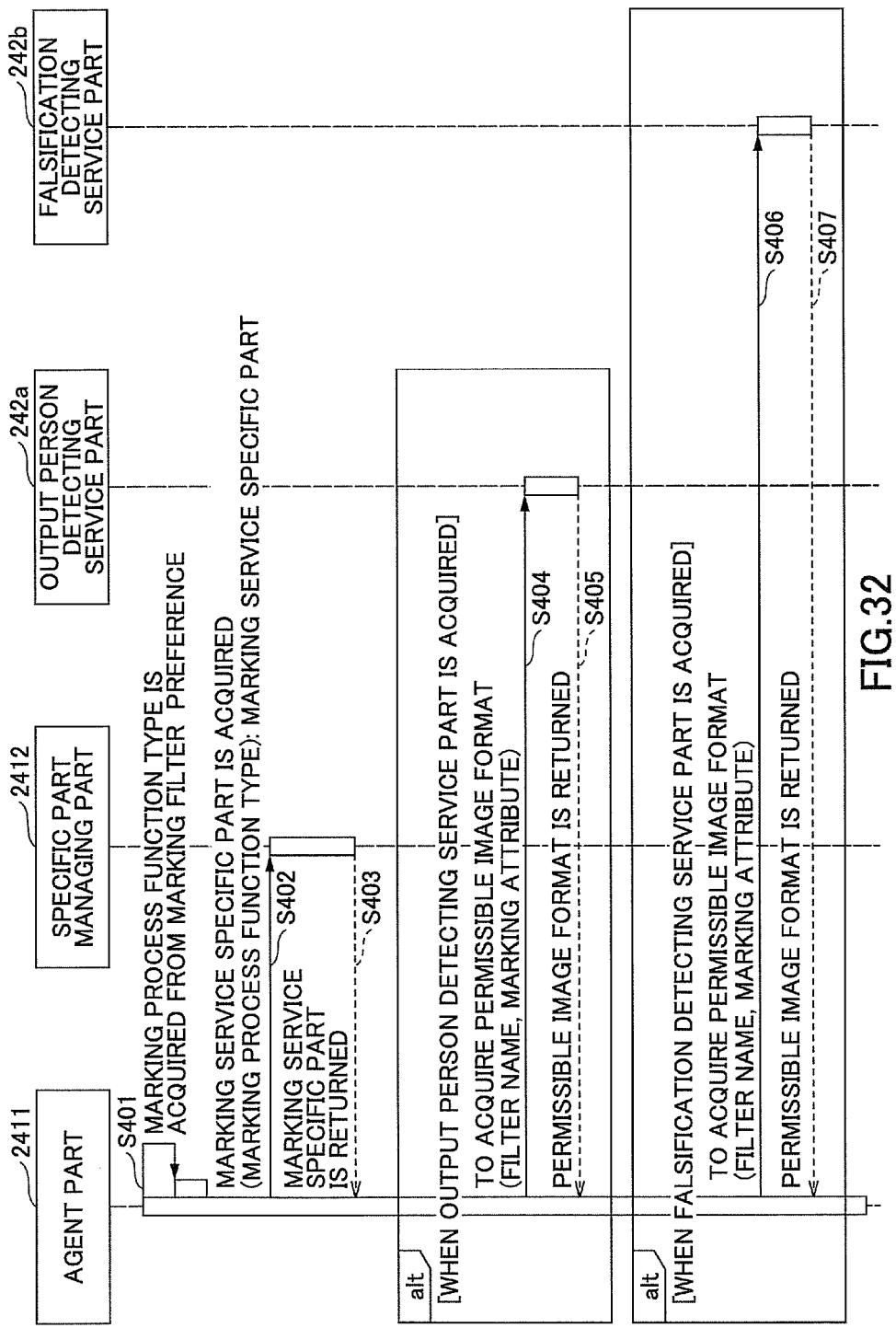
FIG. 32 is a sequence diagram for explaining acquisition processing of an image format which can be processed by the marking service.

Next, the details of step S324 will be described. FIG. 32 is a sequence diagram for explaining the acquisition process of an image format of image data which can be processed, by the marking service.

The agent part 2411 acquires the marking process function type value from the marking filter preference 135*p* specified as the argument in step S323 (S401). Subsequently, the agent part 2411 acquires the instance of the marking service specific part 1042 corresponding to the received marking process function type, from the specific part managing part 2412 (S402, S403).

Subsequently, the agent part 2411 specifies as the arguments the filter name and the marking filter preference 135*p* specified as the arguments in step S323, and asks an image format which can be processed, to the acquired the marking service specific part 104 (which is the output person detecting service part 242*a* or the falsification detecting service part 242*b*) (3404, S406).

The output person detecting service part 242*a* or the falsification detecting service part 242*b* determines an image format which can be processed based on the marking attributes stored in the filter name and the marking filter preference 135*p*, and returns the information which indicates the image format to the agent part 2411 (S405 or S407).

Figure 33:
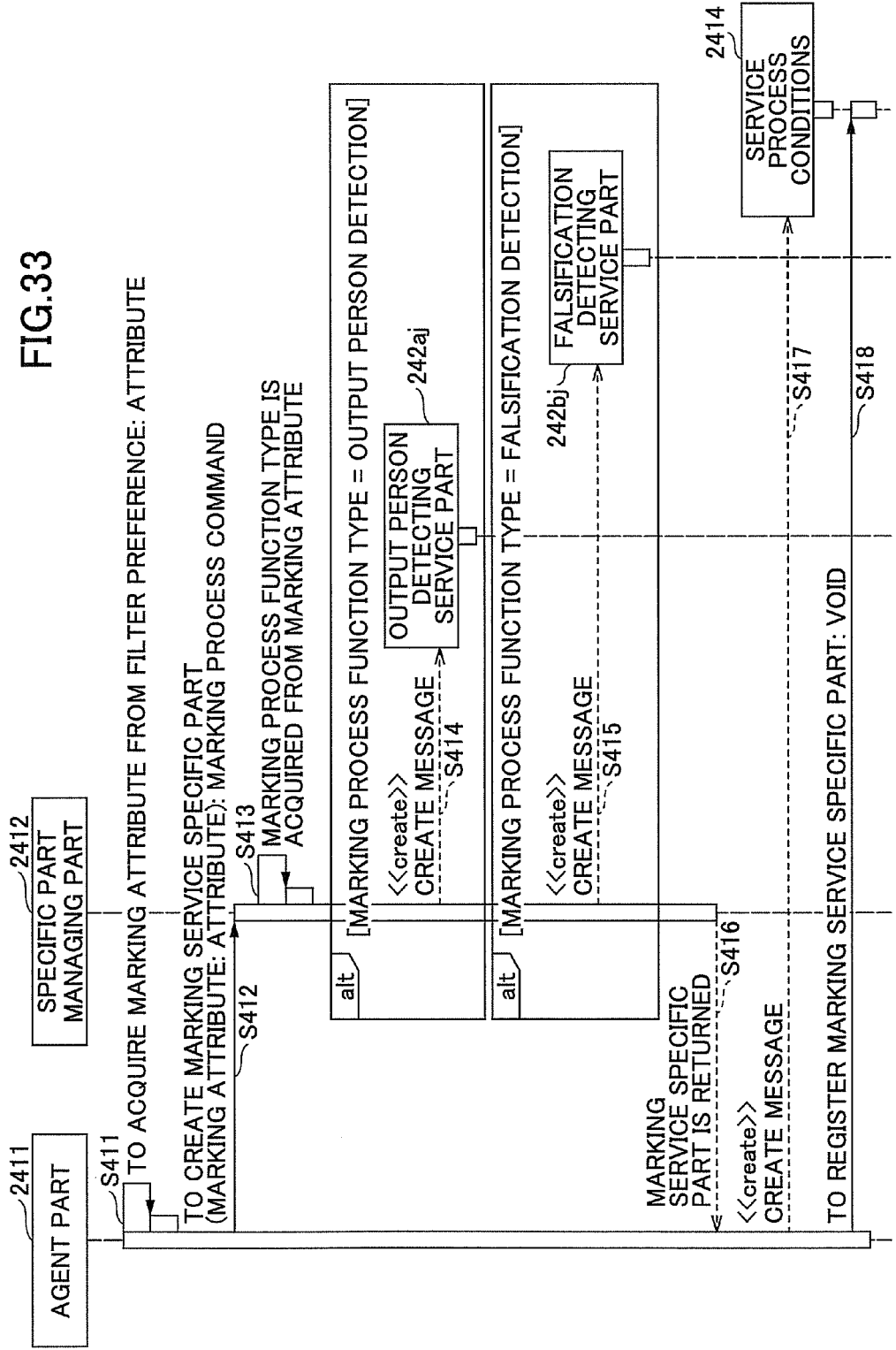
FIG. 33 is a sequence diagram for explaining the creation processing of service process conditions by the marking service.

Next, the details of step S330 of FIG. 27 will be described. FIG. 33 is a sequence diagram for explaining the creation processing of the service process conditions by the marking service.

The agent part 2411 acquires a marking attribute from the marking filter preference 135*p* specified as the argument in step S329 (S411).

Subsequently, the agent part 2411 specifies the acquired marking attribute as the argument and sends a request of creation of the instance of the marking service specific part 242 corresponding to the marking job to be executed, to the specific part managing part 2412 (S412).

The instance of the marking service specific part 242 (the output person detecting service part 242*a* or the falsification detecting service part 242*b*) which appears in the sequence diagrams prior to FIG. 33 is a permanently residing instance, and it is used in common by the respective jobs. On the other hand, the instance creation of which is requested in step S412 is specific for every job, and it is created upon starting of a corresponding job and canceled upon ending of the job. In order to clarify the distinction of the two instances, the letter "j" is added to the end of the reference numeral of the latter.

Subsequently, the specific part managing part 2412 acquires a marking process function type from the marking attribute (S413).

When the marking process function type indicates an output person detecting function, the specific part managing part 2412 creates the instance (object) of the output person detecting service part 242*aj* (S414). At this time, the specific part managing part 2412 sets the marking attribute to the output person detecting service part 242*aj*.

On the other hand, when the marking process function type indicates a falsification detecting function, the specific part managing part 2412 creates the instance (object) of the falsification detecting service part 242*bj* (S415). At this time, the specific part managing part 2412 sets the marking attribute to the falsification detecting service part 242*bj*.

Subsequently, the specific part managing part 2412 returns the created instance of the marking service specific part 242 (the output person detecting service part 242*aj* or the falsification detecting service part 242*bj*) to the agent part (S416).

Subsequently, the agent part 2411 creates the instance of the service process conditions 2414, and registers into the service process conditions 2414 the instance of the marking service specific part 242 which was created in step S414 or S415 (S418).

Figure 34:
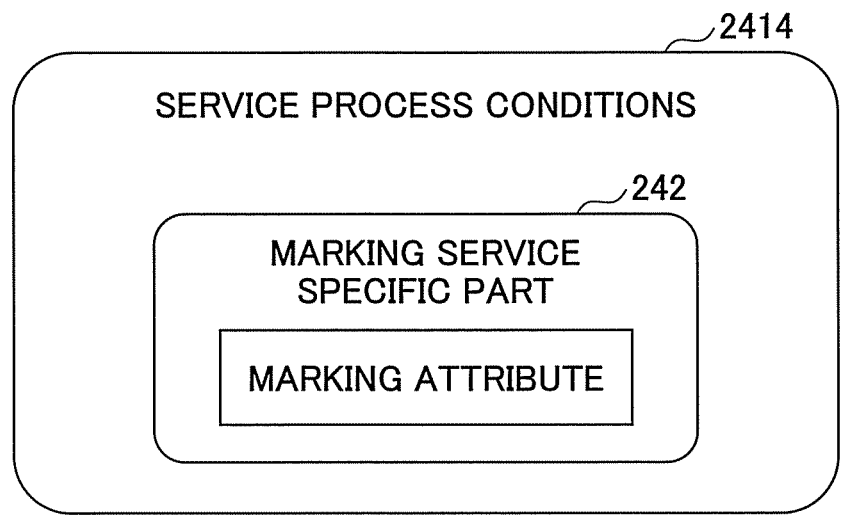
FIG. 34 is a diagram illustrating the relation between the service process conditions, the marking service specific part, and the marking attribute.

FIG. 34 is a diagram illustrating the relation between the service process conditions, the marking service specific part, and the marking attribute.

As illustrated in FIG. 34, in the service process conditions 2414, the marking service specific part 242 (output person detecting service part 242*aj* or falsification detecting service part 242*bj*) for execution is registered. The marking attribute is registered in the marking service specific part 242. Therefore, all the information (processing conditions) needed to perform the marking process corresponding to the job to be executed is registered in the service process conditions 2414.

Figure 35:
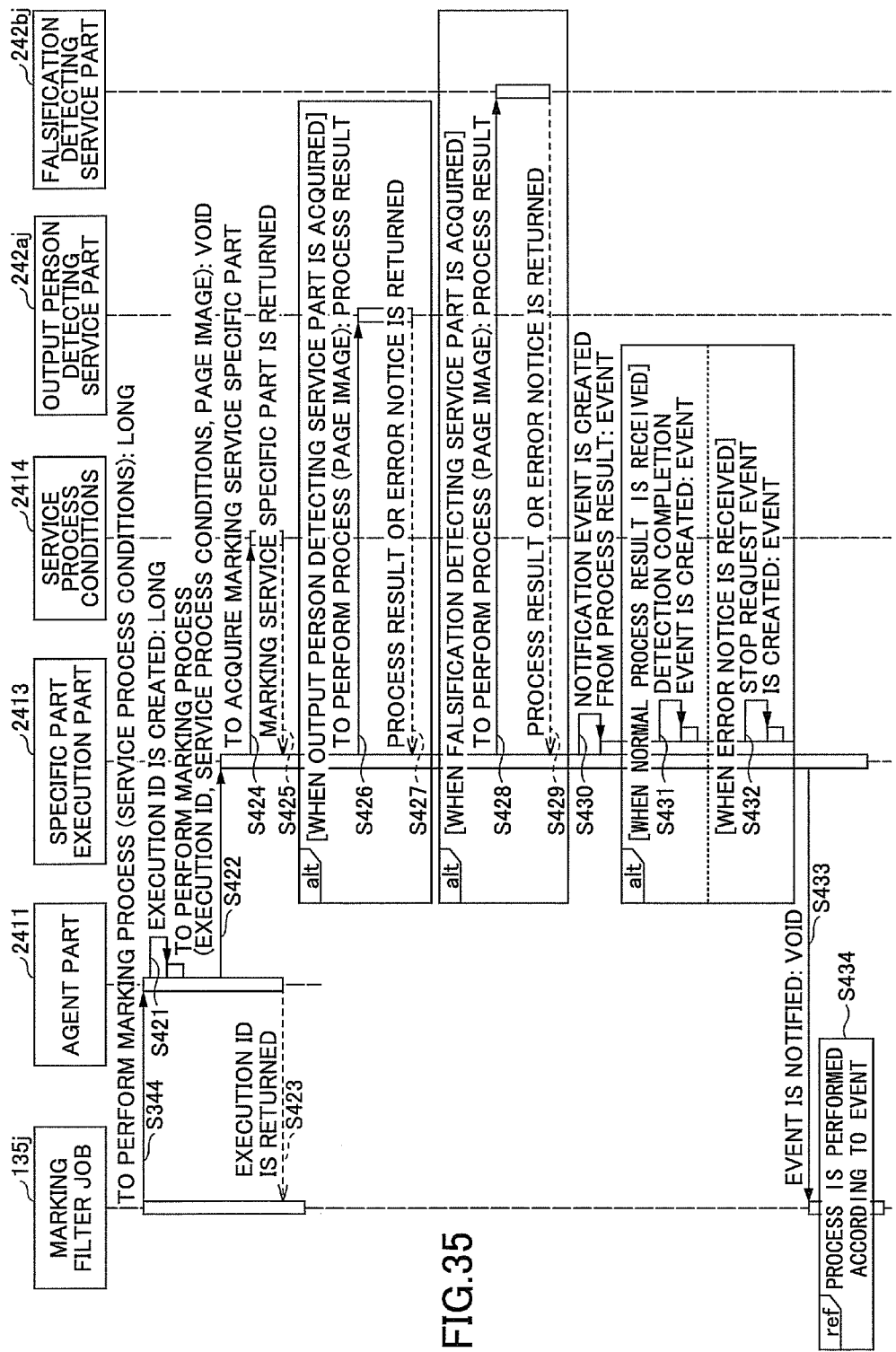
FIG. 35 is a sequence diagram for explaining the execution process of the marking process by the marking service.

Next, the details of step S345 of FIG. 27 will be described. FIG. 35 is a sequence diagram for explaining the execution process of the marking process by the marking service.

When the execution request of the marking process is received from the marking filter job 135*j* in the above step S344 (FIG. 27), the agent part 2411 creates an execution ID to the corresponding execution request (S421).

Subsequently, the agent part 2411 specifies as the arguments the execution ID, the service process conditions 2412 (refer to FIG. 34) created in the process of FIG. 33 and the page image, and sends a request of execution of the marking process to the specific part execution part 2413 (S422). After the request is sent, the agent part 2411 returns the execution ID to the marking filter job 135*j* (S423).

In response to the request of execution of the marking process, the specific part execution part 2413 acquires the instance of the marking service specific part 242 registered in the service process conditions 2414 specified as the argument (S424, S425). The specific part execution part 2413 specifies the page image as the argument to the acquired instance and inputs the execution request of the marking process.

When the acquired instance is the output person detecting service part 242*aj*, the corresponding execution request is input into the output person detecting service part 242*aj* (S426). Based on the marking attribute set in the output person detecting service part 242*aj*, the output person detecting service part 242*aj* performs the output person detecting processing to the page image, and returns the processing result (detection result) to the specific part execution part 2413 (S427).

When the output person detecting processing is performed normally, the information which identifies an output person (such as an output person name) is included in the corresponding detection result. When the output person detecting processing is abnormally ended, an error message is sent.

On the other hand, when the acquired instance is the falsification detecting service part 242*bj*, the corresponding execution request is input into the falsification detecting service part 242*bj* (S428). Based on the marking attribute set in the falsification detecting service part 242*bj*, the falsification detecting service part 242*bj* performs the falsification detecting processing to the page image, and returns the processing result (detection result) to the specific part execution part 2413 (S429). When the falsification detecting processing is performed normally, the detection result contains the existence of a falsification and the page image (detection result image) in which a marking is given to the location of a falsified part if a falsification is detected. When the falsification detecting processing is abnormally ended, an error message is sent.

Subsequently, the specific part execution part 2413 performs creation processing of an event which indicates the detection result (S430). Namely, when the marking process is performed normally, the detection completion event is created (S431), and when the marking process is abnormally ended, the stop request event is created (S432). The detection result is included in the detection completion event.

Subsequently, the specific part execution part 2413 notifies the created event to the marking filter job 135*j* (S433). In response to the notice of the event, the marking filter job 135*j* performs the processing according to the notified event (S434). The details of step S434 will be described later.

Figure 36:
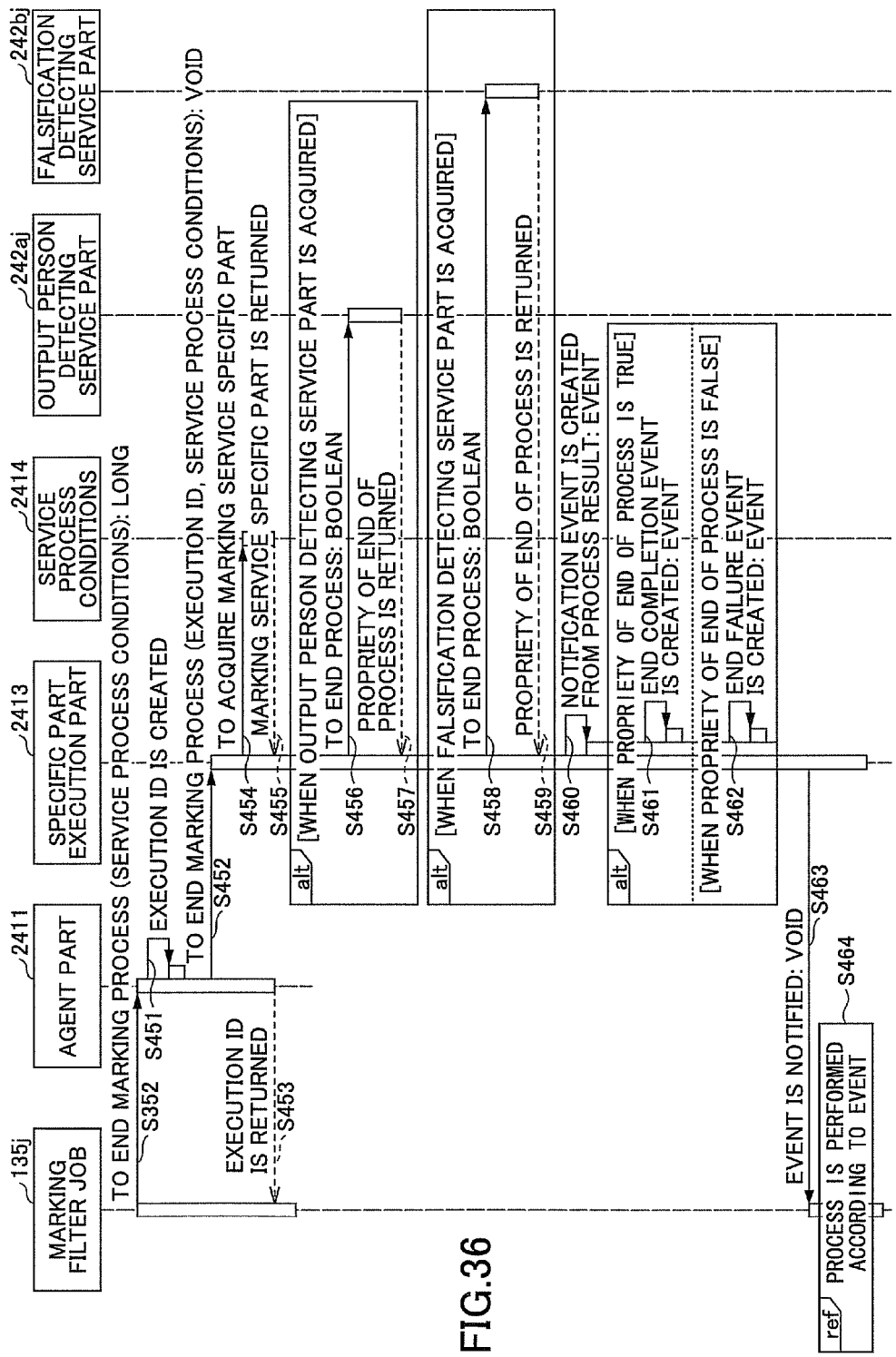
FIG. 36 is a sequence diagram for explaining the end process of the marking process by the marking service.

Next, the details of step S353 of FIG. 27 will be described. FIG. 36 is a sequence diagram for explaining the end process of the marking process by the marking service.

When the end request of the marking process is received from the marking filter job 135*j* in the step S352 (FIG. 27), the agent part 2411 creates an execution ID to the corresponding end request (S451).

Subsequently, the agent part 2411 specifies as the arguments the execution ID and the service process conditions 2412 (refer to FIG. 34) created in the process of FIG. 33, and sends a request of the end of the marking process to the specific part execution part 2413 (S452). After the request is sent, the agent part 2411 returns the execution ID to the marking filter job 135*j* (S453).

In response to the execution request of the marking process, the specific part execution part 2413 acquires the instance of the marking service specific part 242 registered in the service process conditions 2414 specified as the argument (S454, 8455), and inputs the end request of the marking process into the acquired instance.

When the acquired instance is the output person detecting service part 242*aj*, the end request is input into the output person detecting service part 242*aj* (S456). The output person detecting service part 242*aj* checks the propriety of the end of the processing based on the marking attribute set in the output person detecting service part 242*aj*, the executed situation of the present output person detecting processing, etc., and when the end of the processing is possible, the output person detecting processing is terminated. The output person detecting service part 242*aj* returns the detection result of the propriety of the end of the processing to the specific part execution part 2413 (S457).

On the other hand, when the acquired instance is the falsification detecting service part 242*bj*, the end request is input into the falsification detecting service part 242*bj* (S458). The falsification detecting service part 242*bj* checks the propriety of the end of the processing based on the marking attribute set to the part 242*bj*, the executed situation of the present falsification detecting processing, etc., and when the end of the processing is possible, the falsification detecting processing is terminated. The falsification detecting service part 242*bj* returns the detection result of the propriety of the end of the processing to the specific part execution part 2413 (S459).

Subsequently, the specific part execution part 2413 performs creation processing of an event which indicates the detection result of the end of the processing (S460). Namely, when the end of the processing is possible, an end completion event is created (S461), and when the end of processing is impossible, an end failure event is created (S462).

Subsequently, the specific part execution part 2413 notifies the created event to the marking filter job 135*j* (S463). In response to the notice of the event, the marking filter job 135*j* performs processing according to the notified event (S464). The details of step S464 will be described later.

Figure 37:
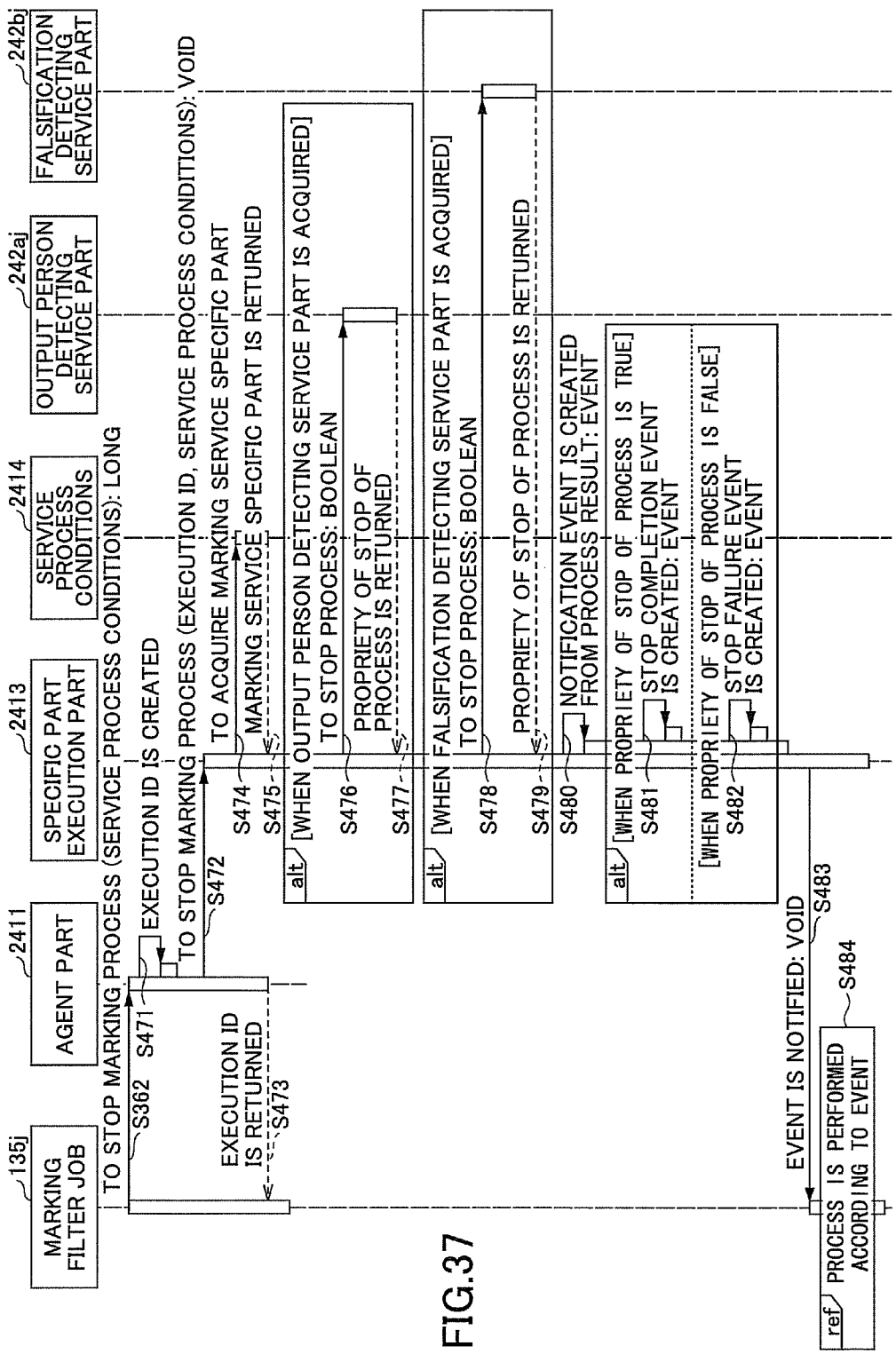
FIG. 37 is a sequence diagram for explaining the stop process of the marking process by the marking service.

Next, the details of step S363 of FIG. 27 will be described. FIG. 37 is a sequence diagram for explaining the stop process of the marking process by the marking service.

When the request of the stopping of the marking process is received from the marking filter job 135*j* in the step S362 (FIG. 27), the agent part 2411 creates an execution ID corresponding to the stop request (S471).

Subsequently, the agent part 2411 specifies as the arguments the execution ID and the service process conditions 2412 (refer to FIG. 34) created by the process of FIG. 33, and sends a request of stopping of the marking process to the specific part execution part 2413 (S472). After the request is sent, the agent part 2411 returns the execution ID to the marking filter job 135*j* (S473).

On the other hand, in response to the request of execution of the marking process, the specific part execution part 2413 acquires the instance of the marking service specific part 242 registered into the service process conditions 2414 specified as the arguments (S474, S475), and inputs the stop request of the marking process into the acquired instance.

Therefore, when the acquired instance is the output person detecting service part 242*aj*, the stop request is input into the output person detecting service part 242*aj* (S476). The output person detecting service part 242*aj* checks the propriety of a stop of the processing based on the marking attribute set to the part 242*aj*, the executed situation of the present output person detecting processing, etc., and when the stop of the processing is possible, the output person detecting processing is stopped. The output person detecting service part 242*aj* returns the detection result of the propriety of the stop of the processing to the specific part execution part 2413 (S477).

On the other hand, when the acquired instance is the falsification detecting service part 242*bj*, the stop request is input into the falsification detecting service part 242*bj* (S478). The falsification detecting service part 242*bj* checks the propriety of a stop of the processing based on the marking attribute set to the part 242*bj*, the executed situation of the present falsification detecting processing, etc., and when the stop of the processing is possible, the falsification detecting processing is stopped. The falsification detecting service part 242*bj* returns the detection result of the propriety of the stop of processing to the specific part execution part 2413 (S479).

Subsequently, the specific part execution part 2413 performs creation processing of an event which indicates the detection result of the stop of the processing (S480). Namely, when the stop of the processing is possible, a stop completion event is created (S481), and when the stop of the processing is impossible, a stop failure event is created (S482).

Subsequently, the specific part execution part 2413 notifies the created event to the marking filter job 135*j* (S483). In response to the notice of the event, the marking filter job 135*j* performs the processing according to the notified event (S484). The details of step S484 will be described later.

Figure 38:
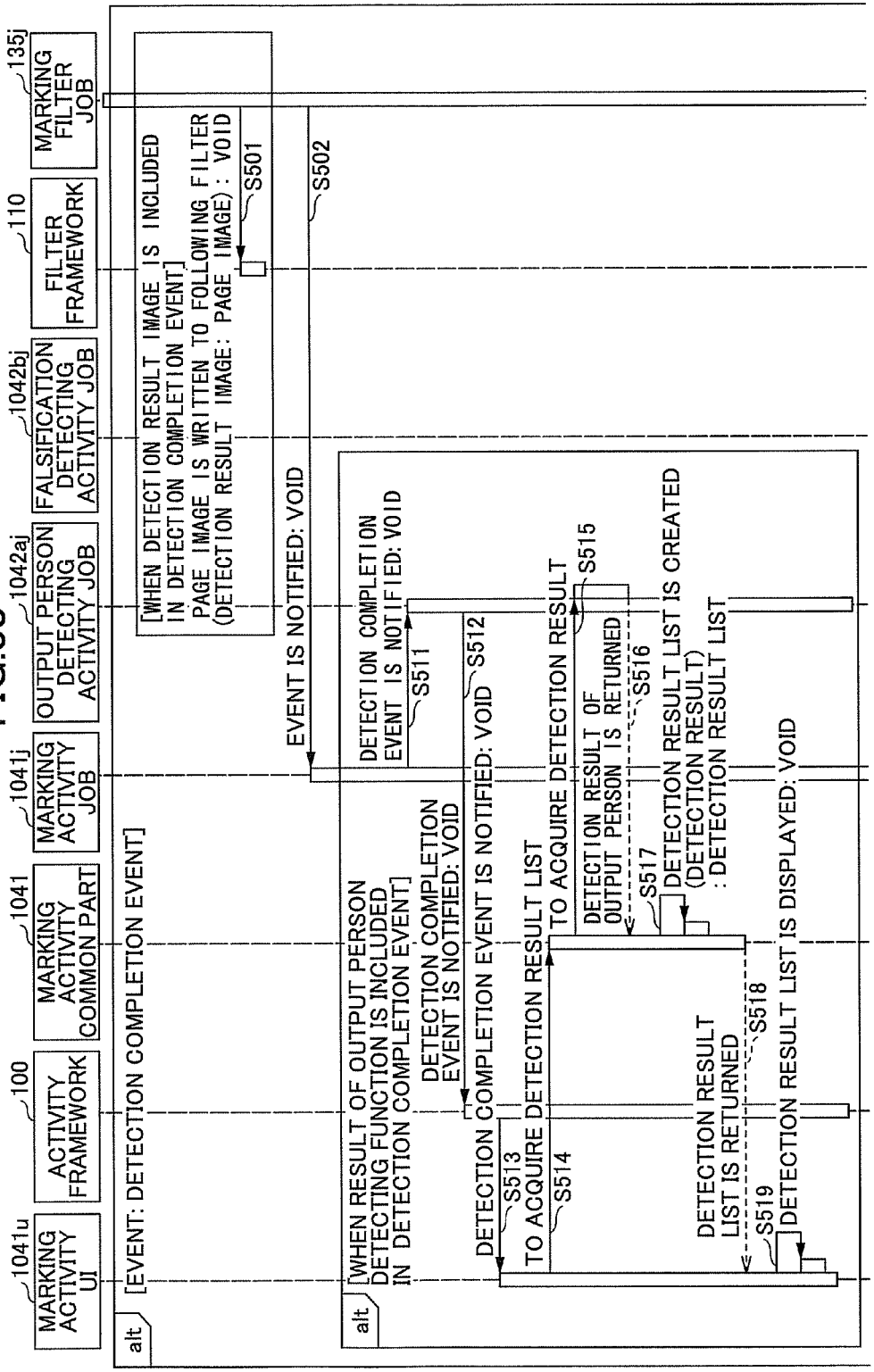
FIG. 38 is a sequence diagram for explaining the processing performed when a detection completion event is notified from the marking service.
Figure 39:
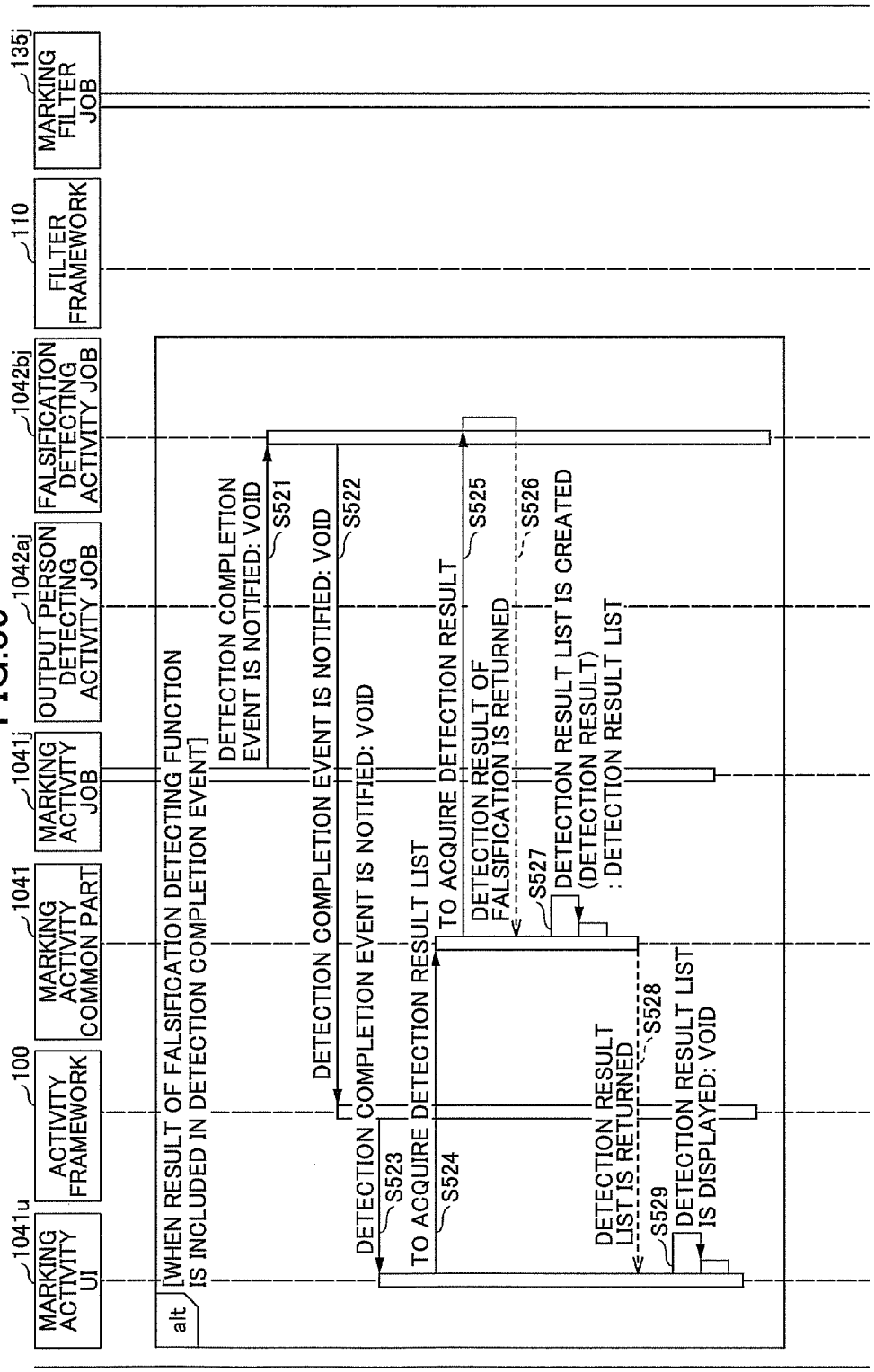
FIG. 39 is a sequence diagram for explaining the processing performed when a detection completion event is notified from the marking service.

Next, the details of step S434 (FIG. 35) will be described. FIGS. 38 and 39 are sequence diagrams for explaining the processing performed when the detection completion event is notified from the marking service.

When the event notified from the marking service 24 is the completion event of detection, the marking filter job 135*j* determines whether the detection result image (image data in which a marking is given to the location of a falsified part) is contained in the detection completion event. When it is contained in the detection completion event, the detection result image is output to the image piping part 21*b* (refer to FIG. 31) (S501).

Subsequently, the marking filter job 135*j* notifies the detection completion event to the marking activity job 1041*j* (S502). Subsequently, the marking activity notifies the detection completion event to the job object of the marking activity specific part 1042 set in step S308 of FIG. 26.

Therefore, when the detection completion event contains the detection result of the output person detecting function, the detection completion event is notified to the output person detecting activity job 1042*aj* (S511). The output person detecting activity job 1042*aj* notifies the detection completion event to the activity framework 100 (S512). The activity framework 100 notifies the detection completion event to the marking activity UI 1041*u* (S513).

Subsequently, the marking activity UI 1041*u* sends a request of acquisition of the list-form data (which is called a "detection result list") in which the detection results are arranged in the list form, to the marking activity common part 1041 (S514). In response to the request, the marking activity common part 1041 sends a request of acquisition of a detection result to the output person detecting activity job 1042*aj* (S515). By analyzing the detection completion event, the output person detecting activity job 1042*aj* takes out the detection result (output person detection result), and returns the corresponding output person detection result to the marking activity common part 1041 (S516). This output person detection result is the information containing an output person's identification information (for example, an output person name).

Subsequently, the marking activity common part 1041 creates the detection result list of output persons based on the output person detection result (S517), and returns the corresponding detection result list to the marking activity UI 1041*u* (S518). The marking activity UI 1041*u* displays on the operation panel 602 the screen (output person detection result screen) in which the detection result list of output persons is displayed (S519).

FIG. 40 is a diagram illustrating an example of an output person detection result screen displayed. As illustrated in FIG. 40, an output person's identification information ("○○○○", "ΔΔΔΔ", "xxxx", etc. in FIG. 40) for every page is displayed in the output person detection result screen 550. When the information identifying an output person for a certain page cannot be extracted, a message indicating that the output person identification information for the page cannot be extracted is displayed.

On the other hand, when the detection completion event contains the detection result of the falsification detecting function, the detection completion event is notified to the falsification detecting activity job 1042bj (S521 in FIG. 39). The falsification detecting activity job 1042bj notifies the detection completion event to the activity framework 100 (S522). The activity framework 100 notifies the detection completion event to the marking activity UI 1041u (S523).

Subsequently, the marking activity UI 1041u sends a request of acquisition of a detection result list to the marking activity common part 1041 (S524). In response to the request, the marking activity common part 1041 requests acquisition of the detection result from the falsification detecting activity job 1042bj (S525) By analyzing the detection completion event, the falsification detecting activity job 1042bj takes out the detection result (falsification detection result) and returns the falsification detection result to the marking activity common part 1041 (S526). This falsification detection result is the information which indicates the existence of a falsification.

Subsequently, the marking activity common part 1041 creates a list of falsification detection results based on the falsification detection result (S527), and returns the corresponding detection result list to the marking activity UI 1041u (S528). The marking activity UI 1041u displays on the operation panel 602 the screen (falsification detection result screen) containing the falsification detection result list (S529).

FIG. 41 is a diagram illustrating an example of a falsification detection result screen displayed. As illustrated in FIG. 41, a message which indicates the existence of a falsification for every page is displayed in the falsification detection result screen 560. For a page in which any falsification was not detected, a message which indicates that falsification is not detected is displayed.

Figure 42:
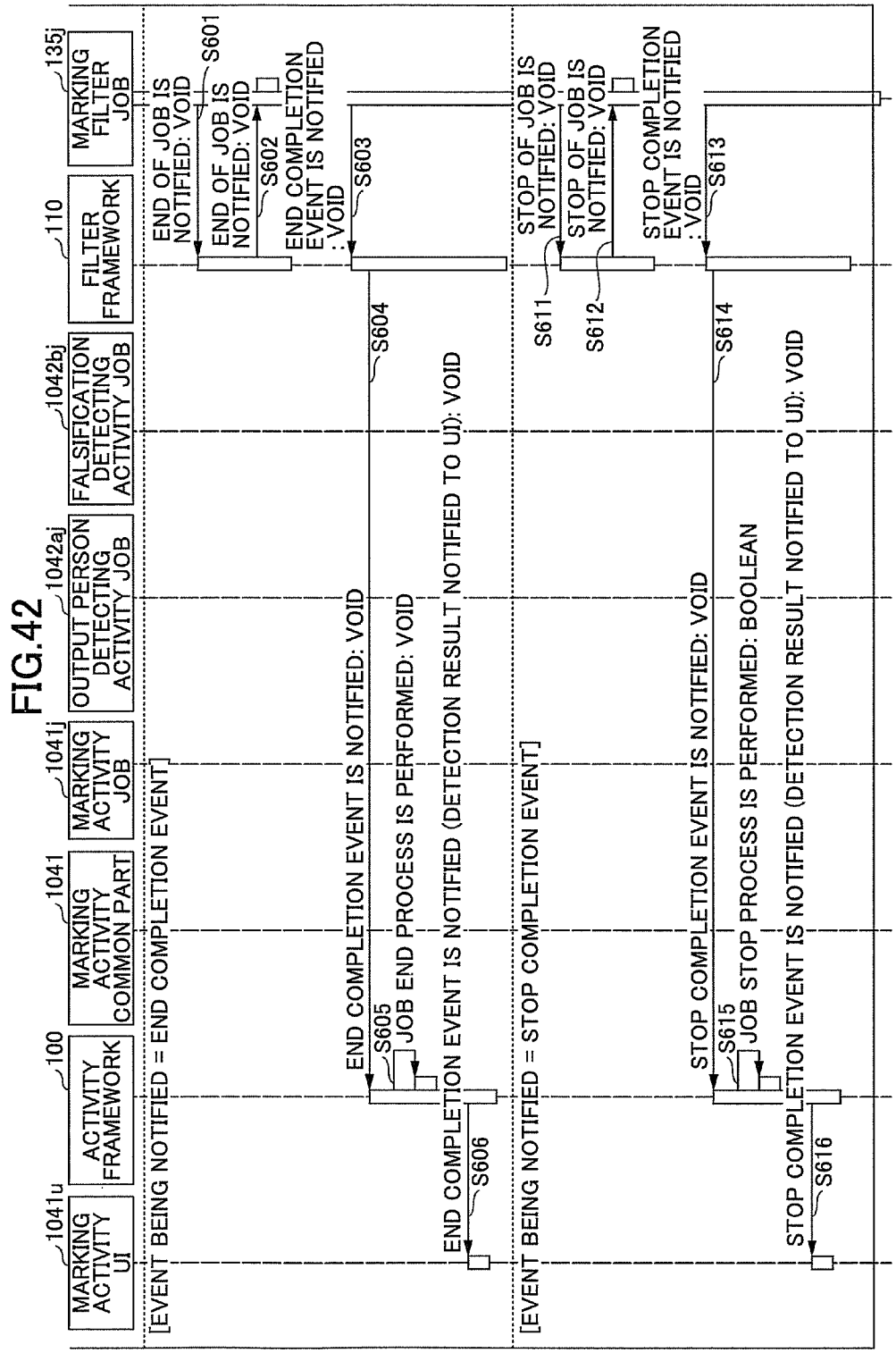
FIG. 42 is a sequence diagram for explaining the processing performed when the end completion event or the stop completion event is notified from the marking service.

Next, the details of step S464 (FIG. 36) or step S484 (FIG. 37) will be described. FIG. 42 is a sequence diagram for explaining the processing performed when the end completion event or the stop completion event is notified from the marking service.

When the event notified from the marking service 24 is the end completion event, the marking filter job 135j notifies the end of the job to the filter framework 110 (S601). The filter framework 110 notifies the end of the job to the job object of each filter used by the marking job (S602). For the sake of convenience, the end of the job is notified only to the marking filter job 135j in FIG. 42.

Subsequently, the marking filter job 135j notifies the end completion event to the filter framework 110 (S603). The filter framework 110 notifies the end completion event to the activity framework 100 (S604). The activity framework 100 performs the end process of the job (S605), and notifies the end completion event to the marking activity UI 1041u (S606). In response to the notice of the end completion event, the marking activity UI 1041u causes the display screen to change to the state in which the job is ended.

On the other hand, when the event notified from the marking service 24 is the stop completion event, the marking filter job 135j notifies the stop of the job to the filter framework 110 (S611). The filter framework 110 notifies the stop of the job to the job object of each of the filters used by the marking job (S612). For the sake of convenience, in the sequence diagram of FIG. 42, the stop of the job is notified only to the marking filter job 135j.

Subsequently, the marking filter job 135j notifies the stop completion event to the filter framework 110 (S613). The filter framework 110 notifies the stop completion event to the activity framework 100 (S614). The activity framework 100 performs the stop processing of the job (S615), and notifies the stop completion event to the marking activity UI 1041u (S616).

In response to the notice of the stop completion event, the marking activity UI 1041u causes the display screen to change to the state in which the job is stopped.

The portions of the above-described execution processes of the marking job in FIGS. 26, 27, 38, 39 and 42 in which the implementation specific to each of the marking process functions is needed are only the processing related to the output person detecting activity job 1042aj or the falsification detecting activity job 1042bj. Such portions in FIGS. 32, 33, 35, 36 and 37 are only the processing related to the output person detecting service 242a (242aj) or the falsification detecting service part 242b (242bj).

On the other hand, if the MFP 1 is not provided with the marking framework, the portions of the above-described execution processes of the marking job in FIGS. 26, 27, 38, 39 and 42 in which the implementation specific to each of the marking process functions is needed include the processing related to the marking activity common part 1041, the marking activity job 1041j, the marking activity preference 1041p, the marking filter 135, and the marking filter job 135j. Such portions in FIGS. 32, 33, 35, 36 and 37 include the processing related to the agent part 2411 and the specific part managing part 2412.

It is to be noted that, by the use of the marking framework, the portions in which the implementation of the execution process of the marking job specific to each of the marking process functions is needed are remarkably reduced.

As described above, according to the MFP 1 of this embodiment, the processing control of the marking process functions using the relation between the activity and the filter, the relation between filters, the relation between the filter and the service mechanism 20, etc. is carried out by the marking framework. Therefore, when a new marking process function is added, the implementation (new marking activity specific part 1042) to the interface determined by the marking activity common part 1041 is created. What is necessary is just to create the implementation (the new marking service specific part. 242) to the interface (the specific part interface 2415) determined by the marking service common part 214. Namely, the developer of a marking process function can only implement the new marking activity specific part 1042 to the predetermined interface without taking into consideration the relation between the new marking activity specific part 1042 and other software components. Therefore, even if the developer has no special knowledge on the software architecture of the MFP 1, a new marking process function can be easily implemented.

In the above-described embodiments, the procedure of the information extracting function (the output person detecting function and the falsification detecting function) among the marking process functions is performed. Similarly, the information embedding function (an output person detection information embedding function, a falsification detecting information embedding function, etc.) may be implemented on the marking framework in the same manner. For example, when an output person detection information embedding function is added, an output person detection information embedding activity part as the marking activity specific part is implemented, and an output person detection information embedding service part as the marking service specific part 242 is implemented. The output person detection information embedding activity part may be configured to perform the processing that is essentially the same as that of the output person detecting activity part 1042a. The output person detection information embedding service part may be configured to embed an output person's identification information (for example, a user name of a user who has logged in the MFP 1) in the format of a ground tint or a bar code on a page image input as an object to be processed. The same procedure may be applied also to the falsification detection information embedding function.

In the above-described embodiment (FIGS. 8 and 9), the marking framework of all the software components in the three layers, including the marking activity 104, the marking filter 135 and the marking service 24, has been described. However, even if the framework portion of either the marking activity 104 or the marking service 24 is not included, it is possible to improve the customizability of the marking process functions.

Figure 43:
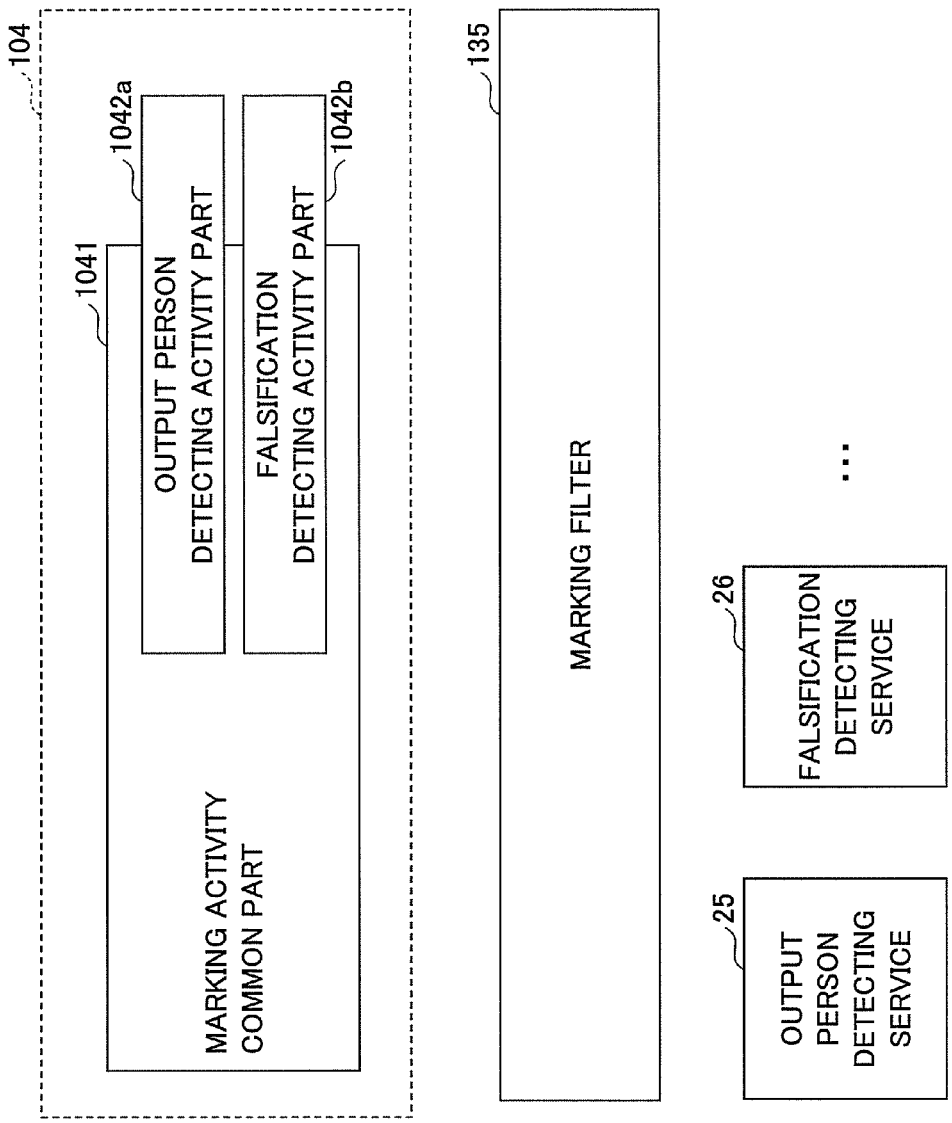
FIG. 43 is a diagram illustrating the composition in which the marking framework does not include a marking service common part.

For example, FIG. 43 is a diagram illustrating the composition in which the marking framework does not include a marking service common part. In FIG. 43, the elements which are the same as corresponding elements in FIG. 9 are designated by the same reference numerals, and a description thereof will be omitted.

When the marking common part 241 is not included in the marking framework, it is necessary to create the marking service 24 for every marking process function. In the composition of FIG. 43, an output person detecting service 25 and a falsification detecting service 26 are included as examples of the marking service 24 which are created for every marking process function. In this case, for both the output person detecting service 25 and the falsification detecting service 26, it is necessary to implement the processing which is performed by the marking common part 241 (namely, the processing which is performed by the agent part 2411, the specific part managing part 2412, and the specific part execution part 2413 as in the sequence diagram). Therefore, when compared with the composition of FIG. 9, creation of the marking service 24 becomes complicated. However, what is needed for the marking activity 104 is to implement only the marking activity specific part 1042, and it is possible to improve the customizability of the marking process functions.

Figure 44:
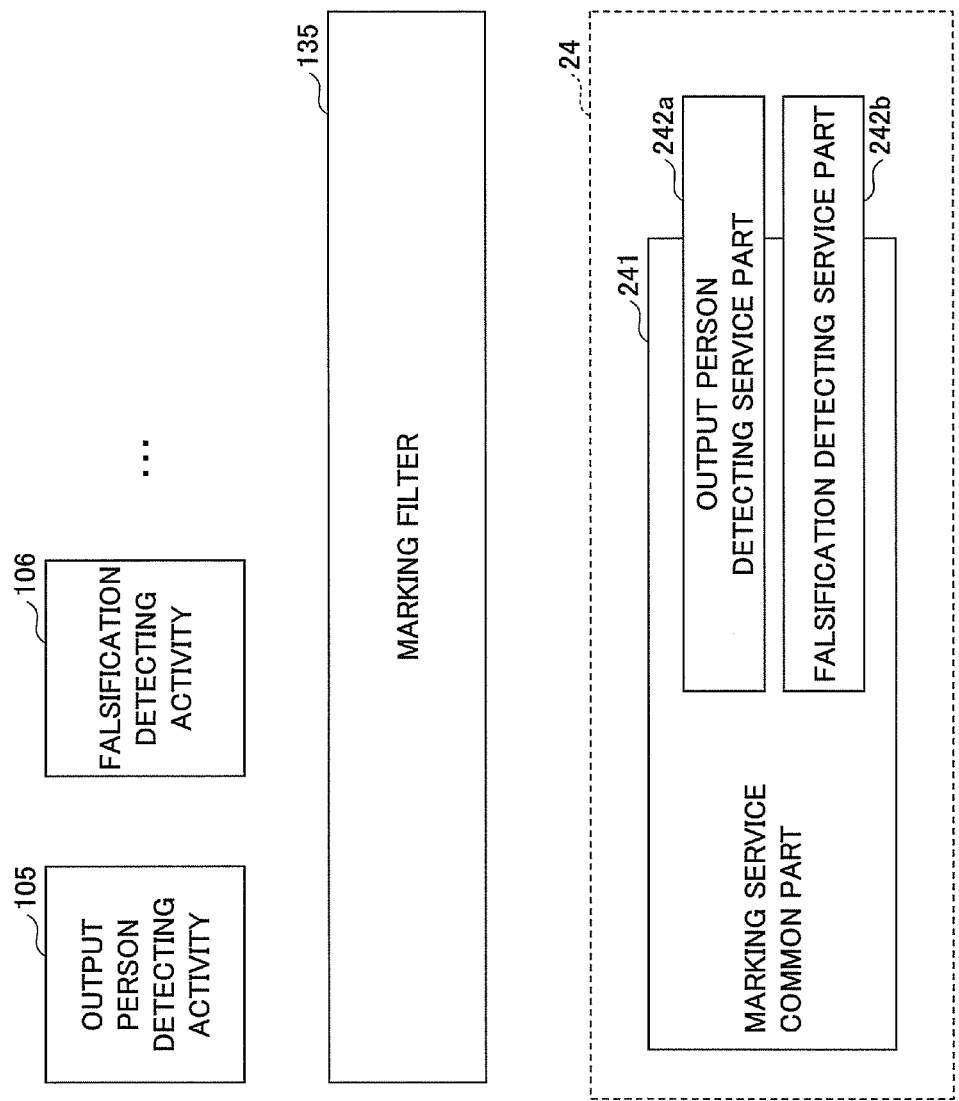
FIG. 44 is a diagram illustrating the composition in which the marking framework does not include a marking activity common part.

FIG. 44 is a diagram illustrating the composition in which the marking framework does not include a marking activity common part. In FIG. 44, the elements which are the same as corresponding elements in FIG. 9 are designated by the same reference numerals, and a description thereof will be omitted.

When the marking activity common part 1041 is not included in the marking framework, it is necessary to create the marking activity 104 for every marking process function. In the composition of FIG. 44, an output person detecting activity 105 and a falsification detecting activity 106 are illustrated as examples of the marking activity 104 created for every marking process function. In this case, for both the output person detecting activity 105 and the falsification detecting activity 106, it is necessary to implement the processing which is performed by the marking activity common part 1041 (namely, the processing which is performed by the marking activity common part 1041, the marking activity preference 1041p, and the marking activity job 1041j as in the sequence diagram). Therefore, when compared with the composition of FIG. 9, creation of the marking activity 104 becomes complicated. However, what is needed for the marking service 24 is to implement only the marking service specific part 242, and it is possible to improve the customizability of the marking process functions.

According to this invention, it is possible to provide an image forming device and a computer-readable storage medium which are able to improve the customizability of the information processing functions of information embedded in image data.

The present invention is not limited to the specifically disclosed embodiments, and variations and modifications may be made without departing from the scope of the present invention.

The present application is based on Japanese patent application No. 2008-238628, filed on Sep. 17, 2008, the contents of which are incorporated herein by reference in their entirety.

What is claimed is:

1. An image printing device in which software components, each configured to execute a process constituting a part of a job with respect to image data, are connectable to each other and the job is performed by connecting the software components,
the image printing device comprising an embedded information job control part configured to connect the software components and control execution of an embedded information job for an image printed on a recording medium, said embedded information job control part controlling extracting information that is printed on the recording medium along with image data as embedded information from the image data by scanning the embedded information that is printed on the recording medium separately from a drawing element of the image data or controlling the embedded information job according to the embedded information that is extracted by scanning the embedded information that is printed on the recording medium, the embedded information job control part comprising:
a common part configured to perform a first process of the embedded information job that is common to respective kinds of the embedded information job; and
a specific part configured to perform a second process of the embedded information job that is specific to a kind of the embedded information job,
wherein the specific kind of the embedded information job that corresponds to the specific part differs according to which program is selected among programs to function as the specific part to be installed in the image printing device,
wherein the specific part determines a connecting relation of the software components so as to connect the software components in a predetermined order to perform the second process of the embedded information job according to the kind of the embedded information job, and
wherein the image printing device further comprises a central processing unit which executes the connected software components.

2. The image printing device according to claim 1, wherein the specific part generates a request to acquire, in response to a request from the common part, configuration information containing a setting item related to a process to be executed by a corresponding one of the software components, from each of the software components contained in the connecting relation, and transfers the configuration information to the common part, wherein the common part displays, on a display device, a setting window where an operator selects a value of the setting item, based on the transferred configuration information.

3. The image printing device according to claim 2, wherein the common part transfers the value of the setting item selected through the display device, to the specific part, and the specific part sets up the value of the setting item received from the common part, in the corresponding one of the software components for the setting item.

4. The image printing device according to claim 3, further comprising a software component control part configured to cause each of the software components to execute a corresponding process, based on a combination of the software components,
wherein the specific part transfers a result of the corresponding process executed by the software components, to the common part, and the common part displays on the display device the result of the corresponding process received from the specific part.

5. The image printing device according to claim 4, further comprising an embedded information service part configured to embed information in the image data or extract the embedded information from the image data, in response to a request from the software components to which a request of execution of an embedded information job is transferred by the software component control part,
wherein the software components acquire the configuration information from the embedded information service part in response to a request of acquisition of the configuration information of the setting item received from the specific part.

6. The image printing device according to claim 5, wherein the software components set up the value of the setting item in the embedded information service part in accordance with the value of the setting item received from the specific part.

7. The image printing device according to claim 5, wherein the embedded information service part comprises:
a service common part configured to perform a third process that is common to the respective kinds of the embedded information job; and
a service specific part configured to perform a fourth process that is specific to the kind of the embedded information job.

8. An embedded information job control method which is performed by an image printing device in which software components, each configured to execute a process constituting a part of a job with respect to image data, are connectable to each other and the job is performed by connecting the software components, the embedded information job control method connecting the software components and controlling execution of an embedded information job for an image printed on a recording medium, said embedded information job control method controlling extracting information that is printed on the recording medium along with image data as embedded information from the image data by scanning the embedded information that is printed on the recording medium separately from a drawing element of the image data or controlling the embedded information job according to the embedded information that is extracted by scanning the embedded information that is printed on the recording medium, by an embedded information job control part of the image printing device, the embedded information job control method comprising:
performing, by a common part of the embedded information job control part, a first process of the embedded information job that is common to respective kinds of the embedded information job; and
performing, by a specific part of the embedded information job control part, a second process of the embedded information job that is specific to a kind of the embedded information job,
wherein the specific kind of the embedded information job that corresponds to the specific part differs according to which program is selected among programs to function as the specific part to be installed in the image printing device, and
wherein the specific part determines a connecting relation of the software components so as to connect the software components connected in a predetermined order to perform the second process of the embedded information job according to the kind of the embedded information job.

9. The embedded information job control method according to claim 8, further comprising:
generating a request to acquire, by the specific part, in response to a request from the common part, configuration information containing a setting item related to a process to be executed by a corresponding one of the software components, from each of the software components contained in the connecting relation;
transferring, by the specific part, the configuration information to the common part; and
displaying, by the common part, on a display device, a setting window where an operator selects a value of the setting item, based on the transferred configuration information.

10. The embedded information job control method according to claim 9, further comprising:
transferring, by the common part, the value of the setting item selected through the display device, to the specific part; and
setting up, by the specific part, the value of the setting item received from the common part, in the corresponding one of the software components for the setting item.

11. The embedded information job control method according to claim 10, further comprising:
causing, by a software component control part of the image printing device, each of the software components to execute a corresponding process, based on a combination of the software components;
transferring, by the specific part, a result of the corresponding process executed by the software components, to the common part; and
displaying, by the common part, on the display device the result of the corresponding process received from the specific part.

12. The embedded information job control method according to claim 11, further comprising:
embedding information in the image data or extracting the embedded information from the image data, by an embedded information service part of the image printing device, in response to a request from the software components to which a request of execution of an embedded information job is transferred by the software component control part,
wherein the software components acquire the configuration information from the embedded information service part in response to a request of acquisition of the configuration information of the setting item received from the specific part.

13. The embedded information job control method according to claim 12, wherein the software components set up the value of the setting item in the embedded information service part in accordance with the value of the setting item received from the specific part.

14. The embedded information job control method according to claim 12, wherein the embedding the information in the image data or extracting the embedded information from the image data comprises:

performing, by a service common part of the embedded information service part, a third process that is common to the respective kinds of the embedded information job; and performing, by a service specific part of the embedded information service part, a fourth process that is specific to the kind of the embedded information job.

15. A non-transitory computer-readable storage medium storing a computer-readable program which, when executed by a computer of an image printing device in which software components, each configured to execute a process constituting a part of a job with respect to image data, are connectable each other and the job is performed by connecting the software components, causes the computer to perform an embedded information job control method, the embedded information job control method connecting the software components and controlling execution of an embedded information job for an image printed on a recording medium, said embedded information job control method controlling extracting information that is printed on the recording medium along with image data as embedded information from the image data by scanning the embedded information that is printed on the recording medium separately from a drawing element of the image data or controlling the embedded information job according to the embedded information that is extracted by scanning the embedded information that is printed on the recording medium, by an embedded information job control part of the image printing device, the method comprising:

performing, by a common part of the embedded information job control part, a first process of the embedded information job that is common to respective kinds of the embedded information job; and performing, by a specific part of the embedded information job control part, a second process of the embedded information job that is specific to a kind of the embedded information job, wherein the specific kind of the embedded information job that corresponds to the specific part differs according to which program is selected among programs for functioning as the specific part to be installed in the image printing device, and wherein the specific part determines a connecting relation of the software components so as to connect the software components connected in a predetermined order to perform the second process of the embedded information job according to the kind of the embedded information job.

16. The non-transitory computer-readable storage medium according to claim 15, wherein the embedded information job control method further comprises:

generating a request to acquire, by the specific part, in response to a request from the common part, configuration information containing a setting item related to a process to be executed by a corresponding one of the software components, from each of the software components contained in the connecting relation;

transferring, by the specific part, the configuration information to the common part; and displaying, by the common part, a setting window where an operator selects a value of the setting item, based on the transferred configuration information.

17. The non-transitory computer-readable storage medium according to claim 16, wherein the embedded information job control method further comprises:

transferring, by the common part, the value of the setting item selected through the setting window, to the specific part; and setting up, by the specific part, the value of the setting item received from the common part, in the corresponding one of the software components for the setting item.

18. The non-transitory computer-readable storage medium according to claim 17, wherein the embedded information job control method further comprises:

causing, by a software component control part of the image printing device, each of the software components to execute a corresponding process, based on a combination of the software components;

transferring, by the specific part, a result of the corresponding process executed by the software components, to the common part; and displaying, by the common part, on the setting window the result of the corresponding process received from the specific part.

19. The non-transitory computer-readable storage medium according to claim 18, wherein the embedded information job control method further comprises:

embedding information in the image data or extracting the embedded information from the image data, by an embedded information service part of the image printing device, in response to a request from the software components to which a request of execution of the embedded information job is transferred by the software component control part, wherein the software components acquire the configuration information from the embedded information service part in response to a request of acquisition of the configuration information of the setting item received from the specific part.

20. The non-transitory computer-readable storage medium according to claim 19, wherein the software components set up the value of the setting item in the embedded information service part in accordance with the value of the setting item received from the specific part.

* * * * *